(12) United States Patent
Lee et al.

(10) Patent No.: US 11,097,660 B2
(45) Date of Patent: Aug. 24, 2021

(54) DRIVER ASSISTANCE APPARATUS AND CONTROL METHOD FOR THE SAME

(71) Applicant: LG Electronics Inc., Seoul (KR)

(72) Inventors: Jinkyo Lee, Seoul (KR); Nami Oh, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/538,312

(22) Filed: Aug. 12, 2019

(65) Prior Publication Data

US 2019/0359133 A1  Nov. 28, 2019

Related U.S. Application Data

(63) Continuation of application No. 15/073,133, filed on Mar. 17, 2016, now Pat. No. 10,377,309.

(30) Foreign Application Priority Data

Jun. 9, 2015 (KR) .................. 10-2015-0081497

(51) Int. Cl.
*G06K 9/00* (2006.01)
*B60R 1/00* (2006.01)

(52) U.S. Cl.
CPC ............ *B60R 1/00* (2013.01); *G06K 9/00798* (2013.01); *G06K 9/00805* (2013.01); *G06K 9/00825* (2013.01); *B60R 2300/105* (2013.01); *B60R 2300/302* (2013.01); *B60R 2300/303* (2013.01); *B60R 2300/50* (2013.01); *B60R 2300/802* (2013.01); *B60R 2300/8093* (2013.01)

(58) Field of Classification Search
None
See application file for complete search history.

(56) References Cited

U.S. PATENT DOCUMENTS

| 7,432,799 | B2* | 10/2008 | Tsuboi | B60Q 9/005 |
| | | | | 340/425.5 |
| 2005/0165550 | A1* | 7/2005 | Okada | G08G 1/166 |
| | | | | 701/301 |
| 2006/0069478 | A1* | 3/2006 | Iwama | B62D 15/027 |
| | | | | 701/36 |

(Continued)

FOREIGN PATENT DOCUMENTS

| DE | 102012213132 | 5/2014 |
| JP | 2007164549 | 6/2007 |

(Continued)

OTHER PUBLICATIONS

United States Office Action in U.S. Appl. No. 15/073,133, dated Sep. 12, 2018, 33 pages.

*Primary Examiner* — Kate H Luo
(74) *Attorney, Agent, or Firm* — Fish & Richardson P.C.

(57) ABSTRACT

Disclosed are a driver assistance apparatus and a control method for the same. The driver assistance apparatus includes at least one camera configured to generate a main image by capturing an image of a periphery of a vehicle, a communication unit configured to receive a plurality of sub images generated by at least one other vehicle, and a processor configured to: select at least one of the sub images based on a predetermined condition or user input; and to generate an expanded image using the main image and the selected sub image.

20 Claims, 52 Drawing Sheets

(56) References Cited

U.S. PATENT DOCUMENTS

| | | | |
|---|---|---|---|
| 2007/0021904 A1* | 1/2007 | Kawamata | G08G 1/161 701/532 |
| 2007/0038772 A1* | 2/2007 | Obata | G08G 1/161 709/232 |
| 2007/0139523 A1* | 6/2007 | Nishida | H04N 7/181 348/148 |
| 2011/0115615 A1* | 5/2011 | Luo | H04N 13/239 340/436 |
| 2013/0243247 A1* | 9/2013 | Sakaue | G06K 9/00805 382/103 |
| 2013/0325284 A1* | 12/2013 | Sato | G08G 1/0104 701/96 |
| 2013/0338854 A1* | 12/2013 | Yamamoto | G05D 1/0022 701/2 |
| 2014/0036063 A1* | 2/2014 | Kim | G07C 5/0866 348/118 |
| 2014/0063197 A1* | 3/2014 | Yamamoto | G06T 15/205 348/46 |
| 2014/0085466 A1* | 3/2014 | Moriyama | G08G 1/165 348/148 |
| 2014/0100770 A1* | 4/2014 | Chiang | B60Q 9/008 701/301 |
| 2014/0118551 A1* | 5/2014 | Ikeda | G06K 9/00805 348/148 |
| 2014/0145933 A1* | 5/2014 | Chae | B60K 37/06 345/156 |
| 2014/0341434 A1 | 11/2014 | Lin et al. | |
| 2015/0042800 A1* | 2/2015 | Choi | B60R 1/00 348/148 |
| 2015/0103173 A1* | 4/2015 | Takaki | B60R 1/00 348/148 |
| 2015/0177007 A1* | 6/2015 | Su | B60W 30/12 701/25 |
| 2015/0217692 A1* | 8/2015 | Yanagawa | B60R 1/00 348/118 |
| 2015/0228194 A1* | 8/2015 | Nomura | G08G 1/16 348/118 |
| 2015/0364043 A1* | 12/2015 | Lee | G08G 1/168 348/118 |
| 2016/0277601 A1* | 9/2016 | Seymour | B60R 1/00 |
| 2017/0011539 A1* | 1/2017 | Oshima | G03B 37/04 |

FOREIGN PATENT DOCUMENTS

| | | |
|---|---|---|
| JP | 2008299676 | 12/2008 |
| JP | 2009173122 | 8/2009 |
| KR | 1020100020054 | 2/2010 |
| KR | 1020130055967 | 5/2013 |
| KR | 1020150017095 | 2/2015 |

* cited by examiner

<TOP-VIEW>

<TOP-VIEW>

<TOP-VIEW>

<TOP-VIEW>

<TOP-VIEW>

<TOP-VIEW>

<TOP-VIEW>

<TOP-VIEW>

<SIDE-VIEW>

<PERSPECTIVE-VIEW>

<TOP-VIEW>

<TOP-VIEW>

DRIVER ASSISTANCE APPARATUS AND CONTROL METHOD FOR THE SAME

CROSS-REFERENCE TO RELATED APPLICATION

This application is a continuation of U.S. application Ser. No. 15/073,133, filed on Mar. 17, 2016, now allowed, which claims the priority benefit of Korean Patent Application No. 10-2015-0081497, filed on Jun. 9, 2015, the disclosures of which are incorporated herein by reference.

BACKGROUND OF THE INVENTION

1. Field of the Invention

The present invention relates to a driver assistance apparatus and a control method for the same and, more particularly, to a driver assistance apparatus which provides a vehicle driver with images of blind spot areas and a control method for the same.

2. Description of the Related Art

A vehicle is an apparatus that transports, for example, people or cargo from one place to another place via driving of wheels. Examples of vehicles include two-wheeled cars such as motorcycles, four-wheeled cars such as sedans, and trains.

In recent years, in order to increase the safety and convenience of a user who uses the vehicle, technology to equip vehicles with, for example, a variety of sensors and electronic devices is being aggressively developed. In particular, for example, various apparatuses for user driving convenience are being developed.

Among these, an Around-view Monitoring (AVM) system is configured to generate a plurality of images by capturing an image of the periphery of a vehicle over 360 degrees using a plurality of cameras and to compose the generated images, thereby displaying a so-called around-view screen that seems to capture an image of the vehicle from above.

The driver can receive assistance operating the vehicle when viewing the around-view screen. However, due to the fact that the space that can be included in the around-view screen is very limited, the utilization of the around-view screen is limited to a few situations such as, for example, parking or slow speed driving (below approx. 20 km/h).

Therefore, there is a requirement for technologies to provide a vehicle with an image of a wider area than the area, an image of which can be captured by cameras mounted to the corresponding vehicle, through the use of images generated by other vehicles.

SUMMARY OF THE INVENTION

Therefore, the present invention is made to solve the problems as described above and an object of the present invention is to provide a driver assistance apparatus which generates an expanded image using different traveling images generated by other vehicles, thereby providing an image of an area which cannot be captured by cameras mounted to a vehicle occupied by a driver and a control method for the same.

Objects of the present invention should not be limited to the aforementioned object and other not-mentioned objects will be clearly understood by those skilled in the art from the following description.

In accordance with one embodiment of the present invention, the above and other objects can be accomplished by the provision of a driver assistance apparatus including at least one camera configured to generate a main image by capturing an image of a periphery of a vehicle, a communication unit configured to receive a plurality of sub images generated by at least one other vehicle, and a processor configured to select at least one of the sub images based on a predetermined condition or user input and to generate an expanded image using the main image and the selected sub image. Details of other embodiments are included in the following description and the drawings.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
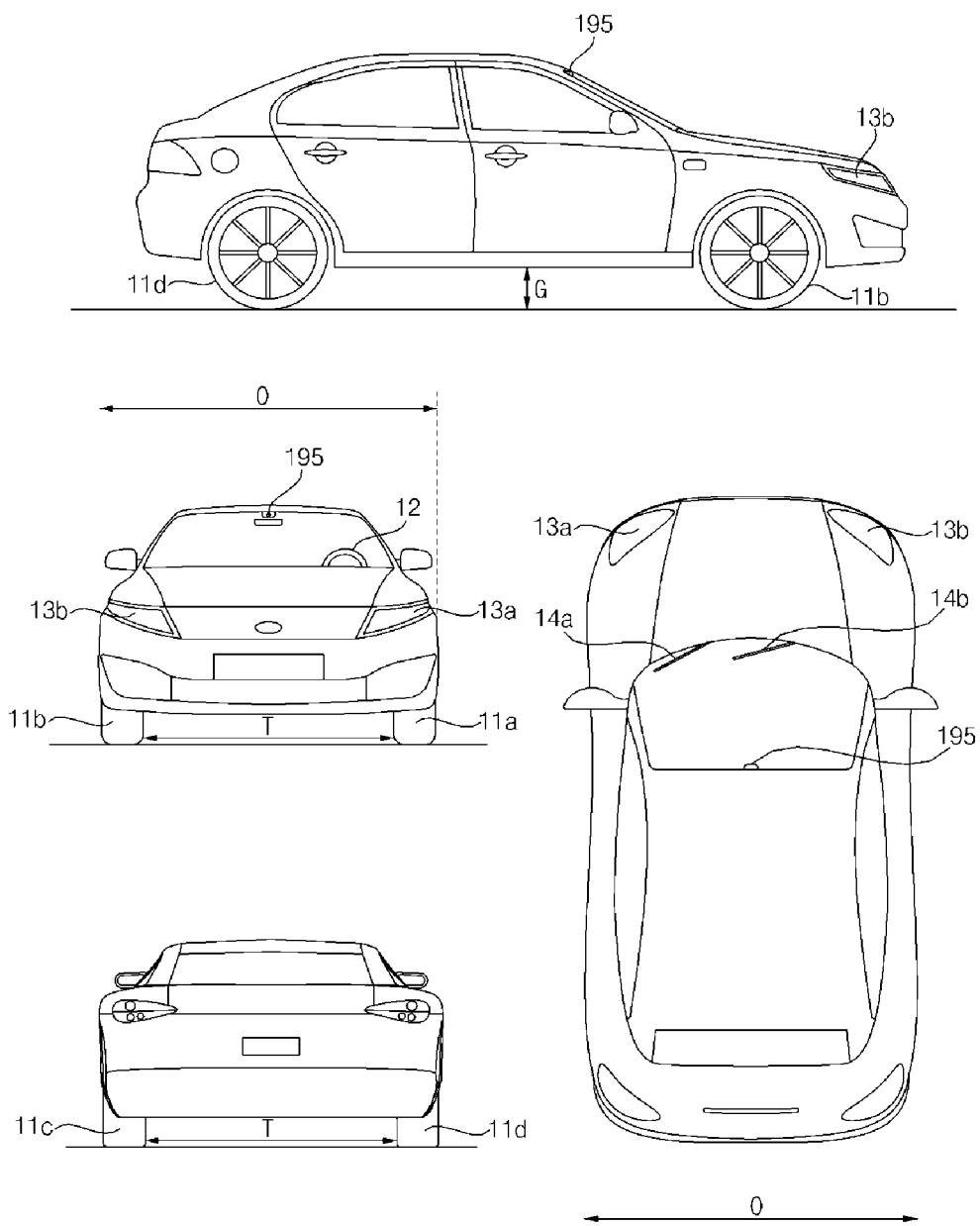
FIG. 1 is a view illustrating an outer appearance of a vehicle provided with a driver assistance apparatus according to an embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, suffixes "module" and "unit" are given or mingled with each other only in consideration of ease in the preparation of the specification, and do not have or serve as different meanings. Accordingly, the suffixes "module" and "unit" may be mingled with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions included in the scope and sprit of the present invention.

It will be understood that although the terms first, second, etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present. In addition, it will be understood that when a component is referred to as "controlling" another component, it may directly control another component, or may also control another component via the mediation of a third component. In addition, it will be understood that when a component is referred to as "providing" another component with information and signals, it may directly provide another component with the same and may also provide another component the same via the mediation of a third component.

As used herein, the singular form is intended to include the plural forms as well, unless the context clearly indicates otherwise.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include all of an internal combustion engine vehicle including an engine as a power source, a hybrid vehicle including both an engine and an electric motor as a power source, and an electric vehicle including an electric motor as a power source.

FIG. 1 is a view illustrating the outer appearance of a vehicle 1 according to one embodiment of the present invention. For convenience of description, the vehicle 1 is assumed as being a four-wheeled car.

Referring to FIG. 1, the vehicle 1 may include tires 11a to 11d which are rotated by a power source, a steering wheel 12 to adjust the direction of travel of the vehicle 1, head lamps 13a and 13b, wipers 14a and 14b, and a driver assistance apparatus 100 that will be described below.

The driver assistance apparatus 100 according to the embodiment of the present invention may serve to generate a surround-view image of the vehicle 1, to detect information from the generated surround-view image, and to output a control signal to adjust, for example, the direction of travel of the vehicle 1. At this time, the control signal may be provided to a controller (770 in FIG. 7), and the controller (770 in FIG. 7) may control, for example, a steering apparatus based on the control signal.

Figure 3A:
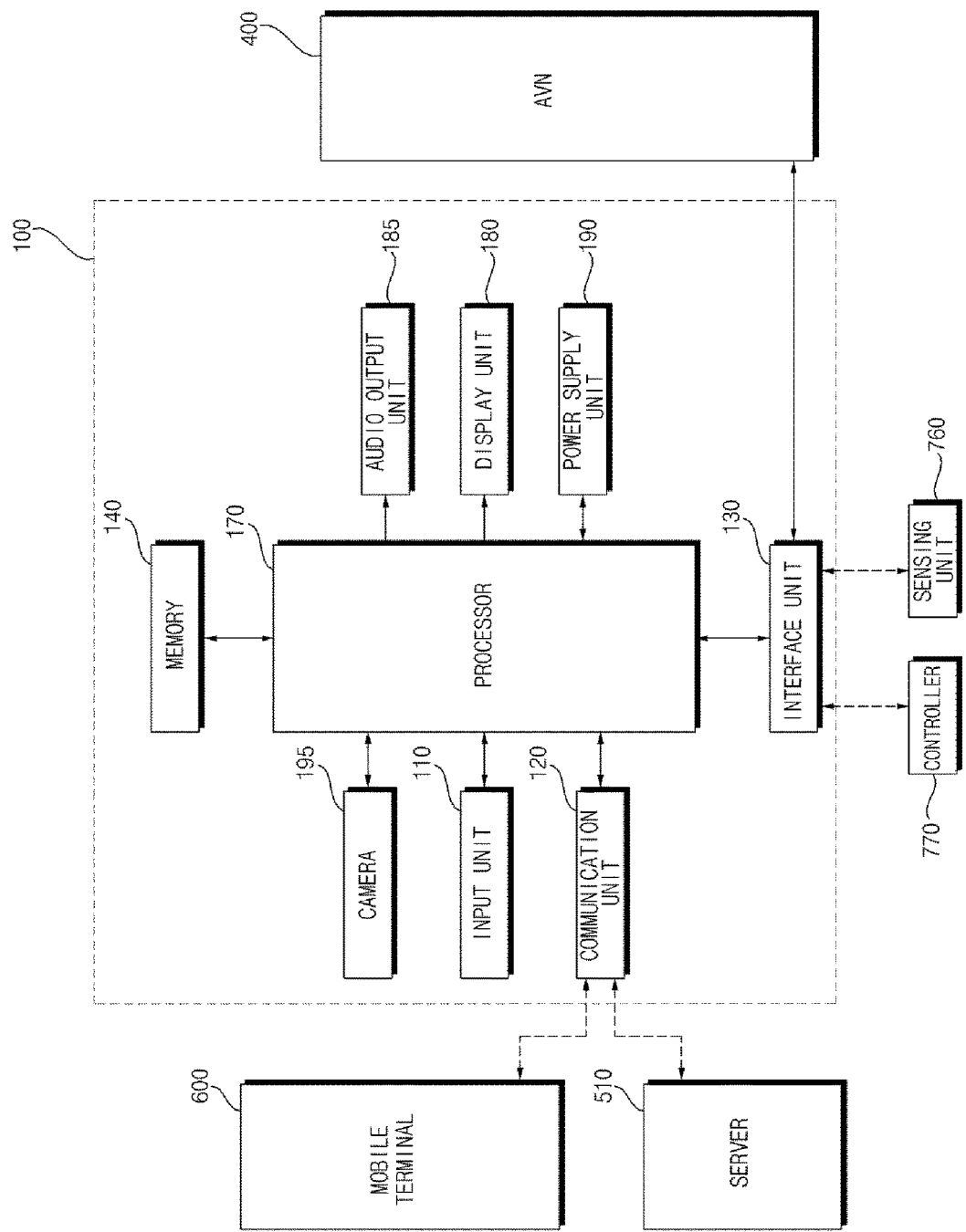
FIGS. 3A to 3C are various exemplary internal block diagrams illustrating the driver assistance apparatus according to various embodiments of the present invention.
Figure 3B:
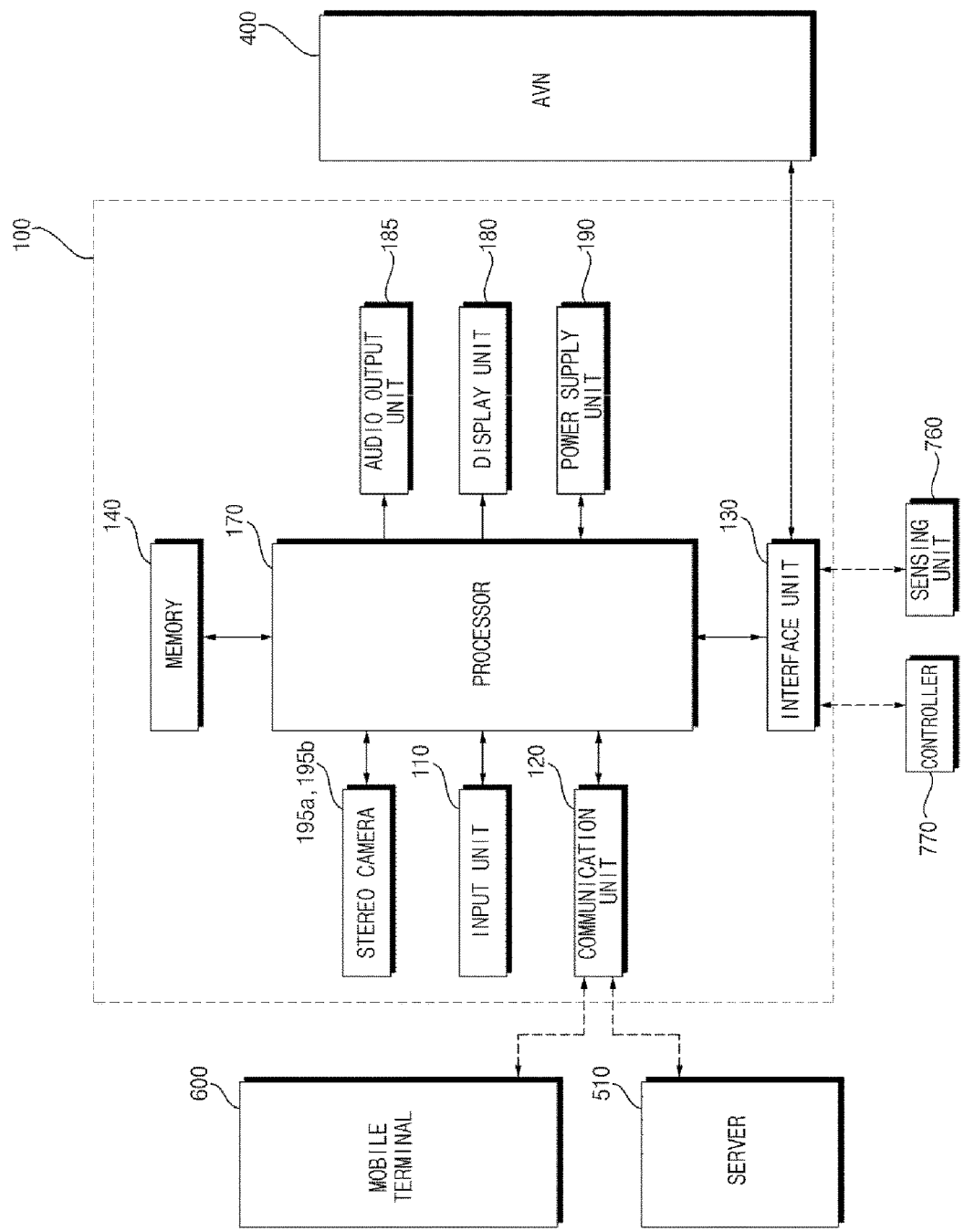

The driver assistance apparatus 100 may include at least one camera, and an image acquired by the camera may be signal-processed in a processor (170 in FIGS. 3A and 3B). For example, as illustrated, a camera 195 may be mounted to the upper end of a windshield of the vehicle 1 to capture an image of the view in front of the vehicle 1.

Meanwhile, the lowermost point of the body of the vehicle 1 and the road surface may be spaced apart from each other by the minimum ground clearance G. This may prevent damage to the vehicle body due to any object having a lower height than the minimum ground clearance G.

In addition, the distance between the front left and right tires 11a and 11b and the distance between the rear left and right tires 11c and 11d of the vehicle 1 are assumed as being equal to each other. Hereinafter, the distance between the inner side of the front-wheel left tire 11a and the inner side of the front-wheel right tire 11b and the distance between the inner side of the rear-wheel left tire 11c and the inner side of the rear-wheel right tire 11d are assumed as having the same value T.

In addition, the full width O of the vehicle 1 is defined as the maximum distance from the leftmost point to the rightmost point of the body of the vehicle 1 excluding side-view mirrors.

Meanwhile, the vehicle 1 illustrated in FIG. 1 may include the driver assistance apparatus 100 that will be described below.

Figure 2A:
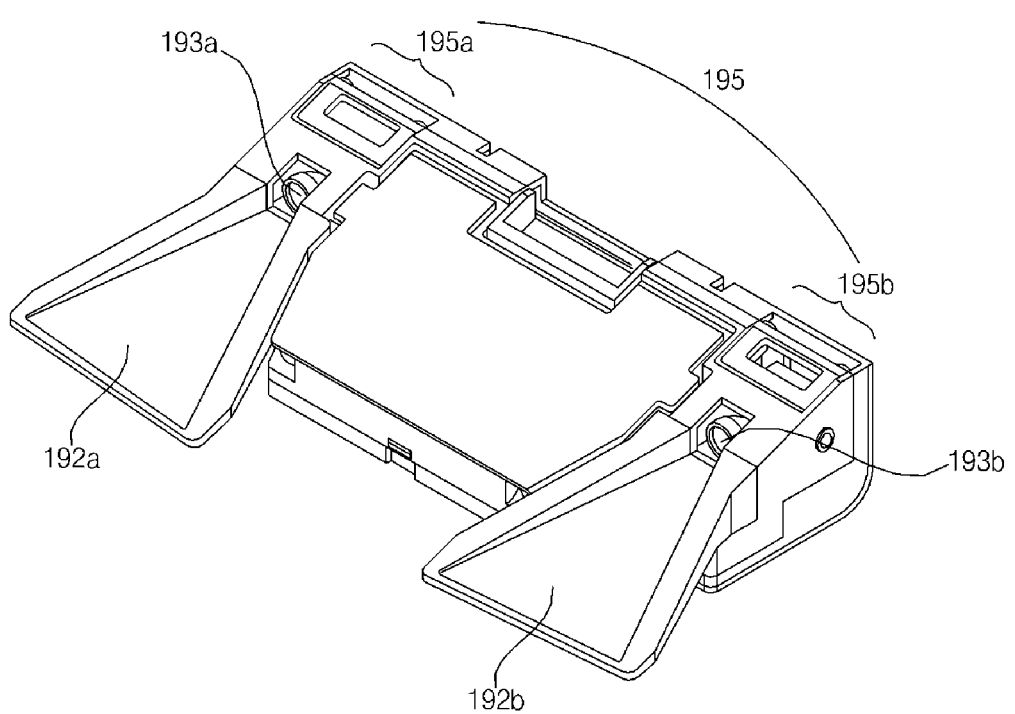
FIGS. 2A to 2C are views referenced to explain cameras attached to the vehicle of FIG. 1 according to the embodiment of the present invention.
Figure 2B:
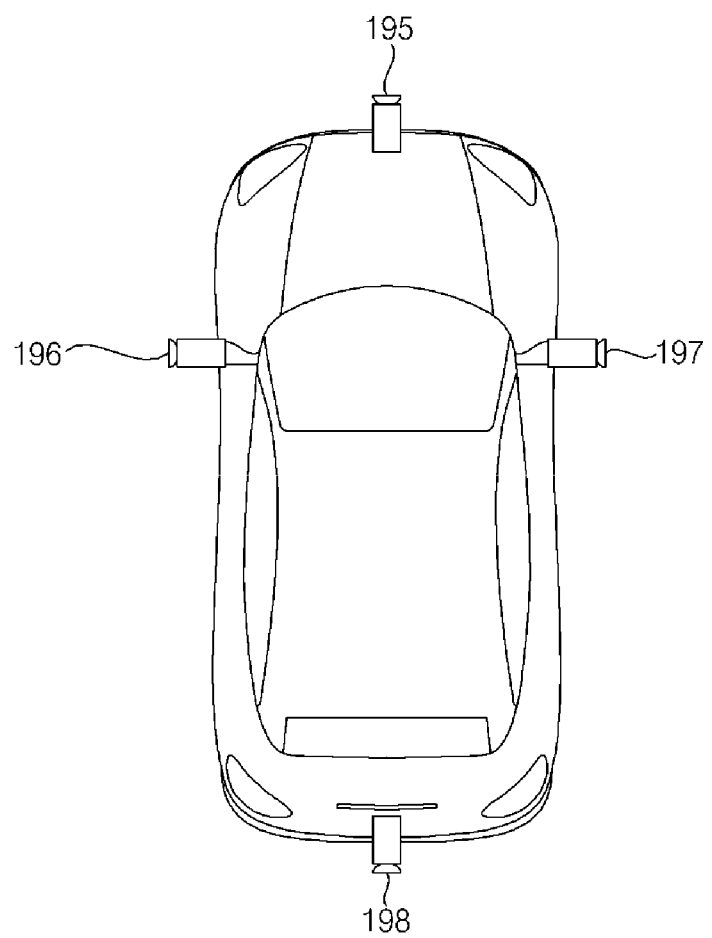
Figure 2C:
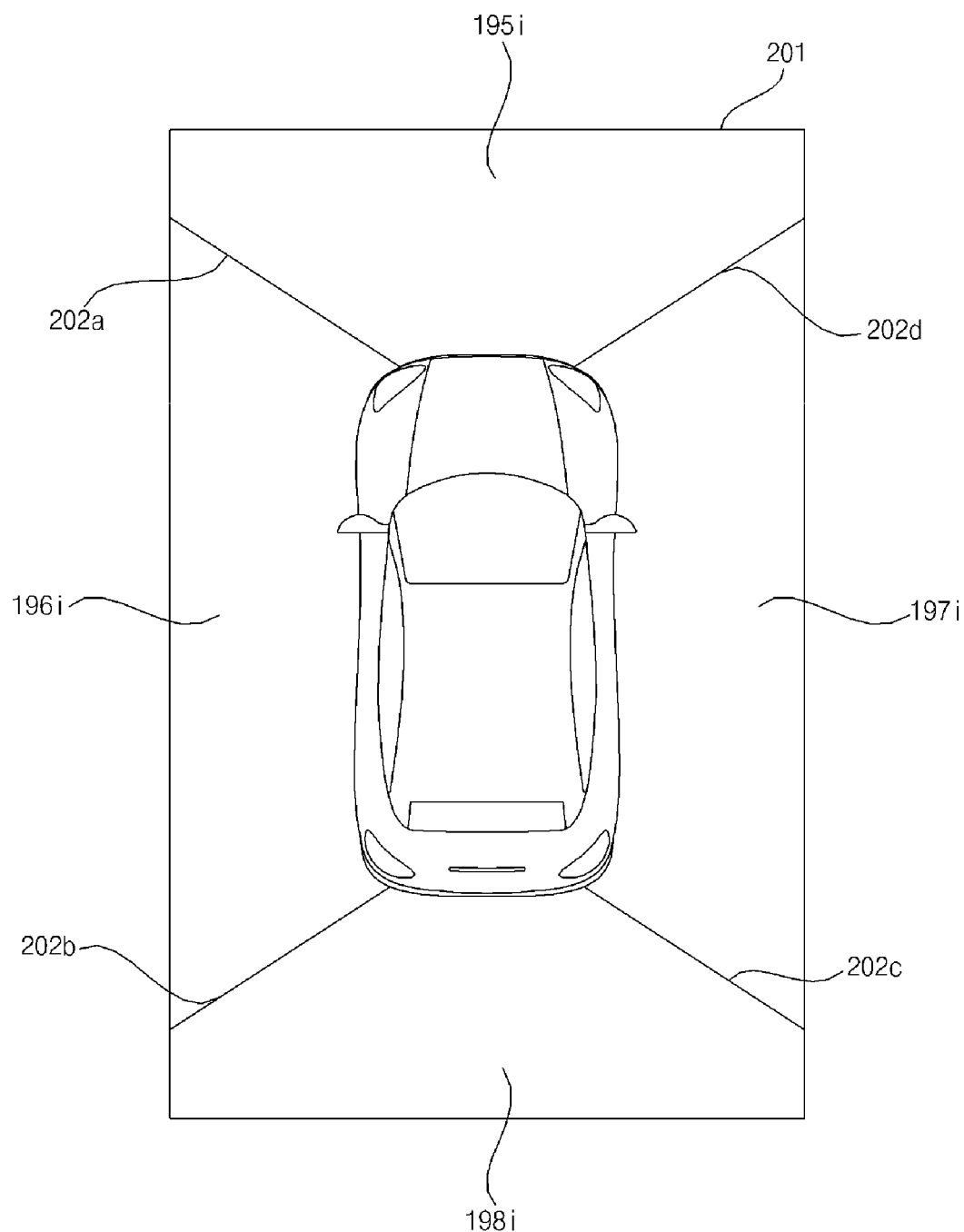

FIGS. 2A to 2C are views referenced to explain cameras attached to the vehicle 1 of FIG. 1 according to the embodiment of the present invention.

The driver assistance apparatus 100 including cameras 195a and 195b to capture an image of the view in front of the vehicle 1 will be described below with reference to FIG. 2A.

Although FIG. 2A illustrates the driver assistance apparatus 100 as including the two cameras 195a and 195b, note that the present invention is not limited as to the number of cameras.

Referring to FIG. 2A, the driver assistance apparatus 100 may include a first camera 195a having a first lens 193a and a second camera 195b having a second lens 193b. In this case, these cameras 195 may be referred to as stereo cameras.

Meanwhile, the driver assistance apparatus 100 may further include a first light shield 192a and a second light shield 192b, which shield light introduced to the first lens 193a and the second lens 193b respectively.

The driver assistance apparatus 100 of FIG. 2A may have a structure for attachment or detachment to or from the indoor or outdoor position (e.g., the ceiling or windshield) of the vehicle 1.

The driver assistance apparatus 100 as described above may acquire stereo images of the view in front of the vehicle 1 from the first and second cameras 195a and 195b. In addition, the driver assistance apparatus 100 may perform binocular disparity detection based on the stereo images and then perform object detection for at least one stereo image based on the binocular disparity information. After the object detection, the driver assistance apparatus 100 may continuously track the movement of an object.

The driver assistance apparatus 100 including cameras 195, 196, 197 and 198 to acquire a surround-view image of the vehicle 1 will be described below with reference to FIGS. 2B and 2C.

Although FIGS. 2B and 2C illustrate the driver assistance apparatus 100 as including four cameras, note that the present invention is not limited as to the number of cameras.

Referring to FIGS. 2B and 2C, the driver assistance apparatus 100 may include the cameras 195, 196, 197 and 198. In this case, these cameras 195, 196, 197 and 198 may be referred to as so-called around-view cameras.

The cameras 195, 196, 197 and 198 may be located respectively on the front side, the left side, the right side, and the rear side of the vehicle 1.

The left camera 196 may be located inside a case enclosing a left side-view mirror. Alternatively, the left camera 196 may be located at the exterior of the case enclosing the left side-view mirror. Yet alternatively, the left camera 196 may be located at a region of the exterior of a left front door, a left rear door, or a left fender.

The right camera 197 may be located inside a case enclosing a right side-view mirror. Alternatively, the right camera 197 may be located at the exterior of the case enclosing the right side-view mirror. Yet alternatively, the right camera 197 may be located at a region at the exterior of a right front door, a right rear door, or a right fender.

Meanwhile, the rear camera 198 may be located near a rear license plate or a trunk switch.

The front camera 195 may be located near a windshield, near an emblem, or near a radiator grill.

Respective images captured by the cameras 195 to 198 may be transmitted to the processor 170, and the processor 170 may compose the respective images to generate a surround-view image of the vehicle 1.

FIG. 2C illustrates one example of the surround-view image of the vehicle 1. The surround-view image 201 may include a first image region 196i captured by the left camera 196, a second image region 198i captured by the rear camera 198, a third image region 197i captured by the right camera 197, and a fourth image region 195i captured by the front camera 195.

Meanwhile, upon the generation of the surround-view image (hereinafter also referred to as so-called "around-view image") from the cameras, boundaries are generated between the respective image regions. These boundaries may be subjected to image blending, for natural display thereof.

Meanwhile, boundary lines 202a, 202b, 202c and 202d may be displayed at the boundaries between the respective image regions. In addition, the surround-view image 201 may include a vehicle image at the center thereof. Here, the vehicle image may be an image generated by the processor 170. In addition, the surround-view image 201 of the vehicle 1 may be displayed via a display unit 741 of the vehicle 1 or a display unit 180 of the driver assistance apparatus 100.

Figure 3C:
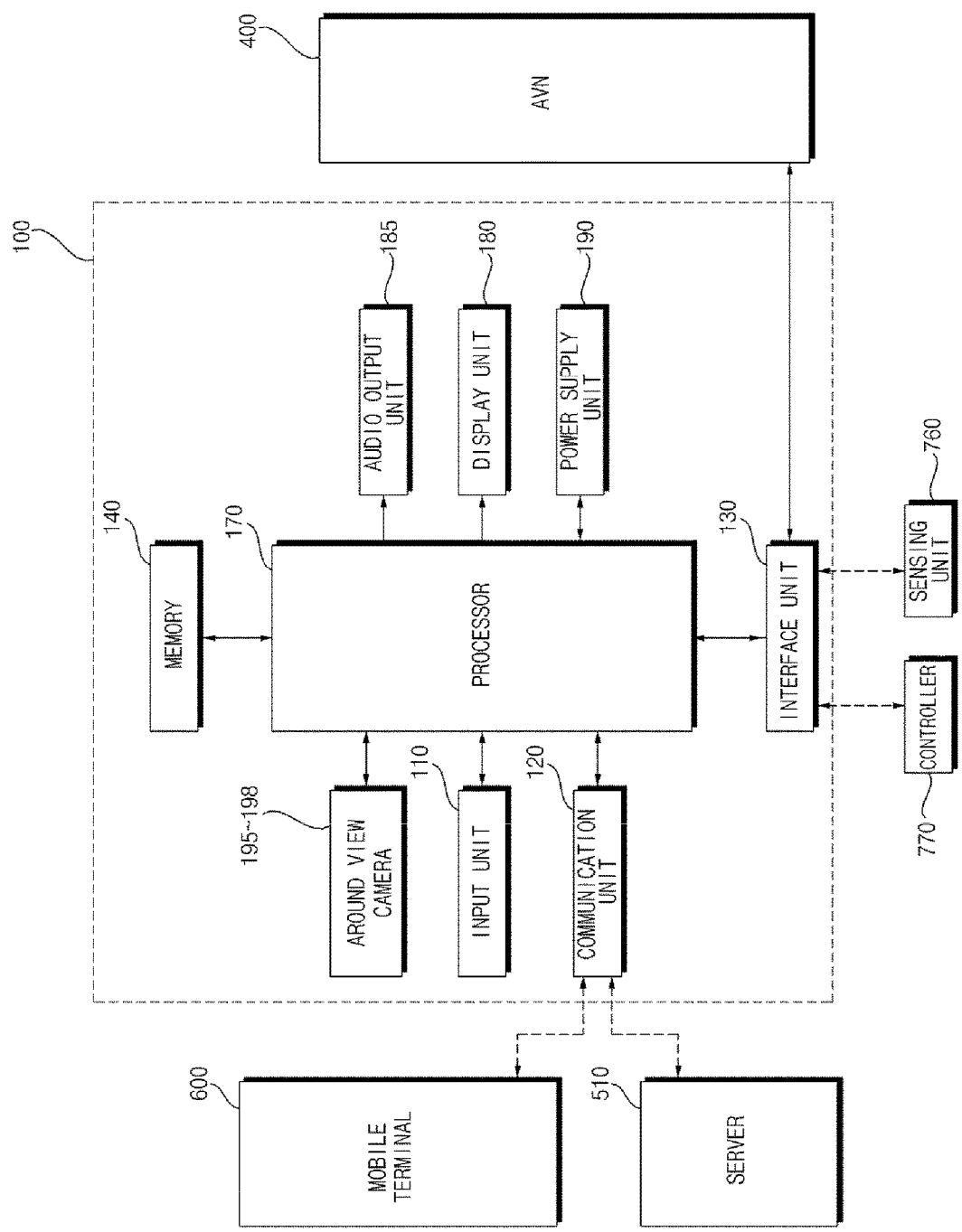

FIGS. 3A to 3C are various exemplary internal block diagrams illustrating the driver assistance apparatus 100 according to various embodiments of the present invention.

The driver assistance apparatus 100 of FIGS. 3A and 3B may generate vehicle associated information via computer vision based signal processing of an image received from the camera 195. Here, the vehicle associated information may include vehicle control information for the direct control of a vehicle or vehicle traveling assistance information to guide a vehicle driver during traveling.

Here, the camera 195 may be a monocular camera. Alternatively, the camera 195 may be the stereo cameras 195a and 195b which capture an image of the view in front of the vehicle (hereinafter referred to as a "forward image" of the vehicle). Yet alternatively, the camera 195 may be included in the around-view cameras 195 to 198 which capture a surround-view image of the vehicle.

FIG. 3A is an internal block diagram of the driver assistance apparatus 100 according to the embodiment of the present invention.

Referring to FIG. 3A, the driver assistance apparatus 100 may include an input unit 110, a communication unit 120, an interface unit 130, a memory 140, a processor 170, a power supply unit 190, a camera 195, a display unit 180, and an audio output unit 185.

The input unit 110 is used to receive various inputs from the driver. For example, the input unit 110 may include a plurality of buttons or a touchscreen attached to the cameras 195 to 198. The driver may turn on the driver assistance apparatus 100 to operate the same using the buttons or the touchscreen. In addition, the input unit 110 may be used for implementation of various other input operations.

The communication unit 120 may exchange data with, for example, a mobile terminal 600, a server 510, or other external appliances of other vehicles in a wireless manner. In particular, the communication unit 120 may exchange data with the mobile terminal 600 of the driver in a wireless manner. Various wireless data communication protocols such as, for example, Bluetooth, Wi-Fi, Wi-Fi direct, APiX, and NFC may be used.

The communication unit 120 may receive weather information and road traffic state information such as, for example, Transport Protocol Expert Group (TPEG) information, from the mobile terminal 600 or the server 500. Meanwhile, the communication unit 120 may transmit real-time information, acquired by the driver assistance apparatus 100, to the mobile terminal 600 or the server 510.

Meanwhile, when a user gets into the vehicle, the mobile terminal 600 of the user may pair with the driver assistance apparatus 100 automatically or as the user executes a pairing application.

The communication unit 120 may receive traffic light change information from the external server 510. Here, the external server 510 may be a server located in a traffic control center.

The interface unit 130 may receive vehicle associated data, or externally transmit signals processed or generated by the processor 170. To this end, the interface unit 130 may perform data communication with, for example, the controller 770 inside the vehicle, an Audio Video Navigation (AVN) apparatus 400, and a sensing unit 760 in a wired or wireless communication manner.

The interface unit 130 may receive navigation information via data communication with the controller 770, the AVN apparatus 400, or a separate navigation apparatus. Here, the navigation information may include set destination information, destination based routing information, map information related to vehicle traveling, and vehicle's current location information. Meanwhile, the navigation information may include information regarding a vehicle's location on a road.

Meanwhile, the interface unit 130 may receive sensor information from the controller 770 or the sensing unit 760.

Here, the sensor information may include at least one selected from among vehicle traveling direction information, vehicle location information (GPS information), vehicle angle information, vehicle speed information, vehicle acceleration information, vehicle tilt information, vehicle forward/backward movement information, battery information, fuel information, tire information, vehicle lamp information, vehicle interior temperature information, vehicle interior humidity information, and object information.

The sensor information may be acquired from, for example, a heading sensor, a yaw sensor, a gyro sensor, a position module, a vehicle forward/backward movement sensor, a wheel sensor, a vehicle speed sensor, a vehicle body gradient sensor, a battery sensor, a fuel sensor, a tire sensor, a steering sensor based on the rotation of a steering wheel, a vehicle interior temperature sensor, a vehicle interior humidity sensor, and an object sensor (e.g., a radar, Lidar, or ultrasonic sensor). Meanwhile, the position module may include a GPS module to receive GPS information.

Meanwhile, of the above-specified sensor information, for example, vehicle travel direction information, vehicle location information, vehicle angle information, vehicle speed information, and vehicle tilt information, which are related to vehicle traveling, may be referred to as vehicle traveling information.

The interface unit 130 may receive turn-signal information. Here, the turn-signal information may be a turn-on signal of a turn signal light for left-turn or right-turn input by the user. When an input to turn on a left or right turn signal light is received via a user input unit (724 in FIG. 7) of the vehicle, the interface unit 130 may receive turn-signal information for left-turn or right-turn.

The interface unit 130 may receive vehicle speed information, steering wheel rotation angle information, or gearshift information. The interface unit 130 may receive vehicle speed information, steering wheel rotation angle information, or gearshift information sensed via the sensing unit 760 of the vehicle. Alternatively, the interface unit 130 may receive vehicle speed information, steering wheel rotation angle information, or gearshift information from the controller 770 of the vehicle. Meanwhile, here, gearshift information may be information regarding the current gear position of the vehicle. For example, gearshift information may be information regarding whether the gearshift is in any one of Park (P), Reverse (R), Neutral (N), and Drive (D), or numbered gears.

The interface unit 130 may receive user input via the user input unit 724 of the vehicle 1. The interface unit 130 may receive user input from the input unit 720 of the vehicle 1, or may receive user input by way of the controller 770.

The interface unit 130 may receive information acquired from the external server 510. The external server 510 may be a server located in a traffic control center. For example, when traffic light change information is received from the external server 510 via a communication unit 710 of the vehicle, the interface unit 130 may receive the traffic light change information from the controller (770 of FIG. 7). The memory 140 may store various data for the overall operation of the driver assistance apparatus 100 such as, for example, programs for the processing or control of the processor 170.

The memory 140 may store data for object verification. For example, when a prescribed object is detected from an image captured by the camera 195, the memory 140 may store data to verify, using a prescribed algorithm, what does the object correspond to.

The memory 140 may store data related to traffic information. For example, when prescribed traffic information is detected from an image captured by the camera 195, the memory 140 may store data to verify, using a prescribed algorithm, what does the traffic information correspond to.

Meanwhile, the memory 140 may be any one of various hardware storage devices such as, for example, a ROM, a RAM, an EPROM, a flash drive, and a hard drive.

The processor 170 controls the overall operation of each unit inside the driver assistance apparatus 100.

The processor 170 may process a forward image or a surround-view image of the vehicle acquired by the camera 195. In particular, the processor 170 implements computer vision based signal processing. As such, the processor 170 may acquire a forward image or a surround-view image of the vehicle from the camera 195 and perform object detection and object tracking based on the image. In particular, the processor 170 may perform, for example, Lane Detection (LD), Vehicle Detection (VD), Pedestrian Detection (PD), Bright-spot Detection (BD), Traffic Sign Recognition (TSR), and road surface detection during object detection.

Meanwhile, a traffic sign may mean prescribed information that may be transmitted to the driver of the vehicle 1. The traffic sign may be transmitted to the driver via a traffic light, a traffic sign, or a road surface. For example, the traffic sign may be a go signal or a stop signal for a vehicle or a pedestrian, which is output from a traffic light. For example, the traffic sign may be various symbols or text marked on a traffic sign. For example, the traffic sign may be various symbols or text marked on the road surface.

The processor 170 may detect information from a surround-view image of the vehicle acquired by the camera 195.

The information may be vehicle traveling situation information. For example, the information may include vehicle traveling road information, traffic rule information, adjacent vehicle information, vehicle or pedestrian traffic light information, roadwork information, traffic state information, parking lot information, and lane information.

The information may be traffic information. The processor 170 may detect traffic information from any one of a traffic light, a traffic sign, and a road surface included in an image captured by the camera 195. For example, the processor 170 may detect a go signal or a stop signal for a vehicle or a pedestrian from a traffic light included in an image. For example, the processor 170 may detect various symbols or text from a traffic sign included in an image. For example, the processor 170 may detect various symbols or text from a road surface included in an image.

The processor 170 may verify information by comparing detected information with information stored in the memory 140. For example, the processor 170 detects a symbol or text indicating a ramp from an object included in an acquired image. Here, the object may be a traffic sign or a road surface. The processor 170 may verify ramp information by comparing the detected symbol or text with traffic information stored in the memory 140.

For example, the processor 170 detects a symbol or text indicating vehicle or pedestrian stop from an object included in an acquired image. Here, the object may be a traffic sign or a road surface. The processor 170 may verify stop information by comparing the detected symbol or text with traffic information stored in the memory 140. Alternatively, the processor 170 detects a stop line from a road surface included in an acquired image. The processor 170 may verify stop information by comparing the detected stop line with traffic information stored in the memory 140.

For example, the processor 170 may detect whether a traffic lane marker is present from an object included in an acquired image. Here, the object may be a road surface. The processor 170 may check the color of a detected traffic lane marker. The processor 170 may check whether the detected traffic lane marker is for a travel lane or a left-turn lane.

For example, the processor 170 may detect vehicle go or stop information from an object included in an acquired image. Here, the object may be a vehicle traffic light. Here, the vehicle go information may be a signal to instruct the vehicle to go straight or to turn to the left or right. The vehicle stop information may be a signal to instruct the vehicle to stop. The vehicle go information may be displayed in green and the vehicle stop information may be displayed in red.

For example, the processor 170 may detect pedestrian go or stop information from an object included in an acquired image. Here, the object may be a pedestrian traffic light. Here, the pedestrian go information may be a signal to instruct a pedestrian to cross the street at a crosswalk. The pedestrian stop information may be a signal to instruct a pedestrian to stop at a crosswalk.

Meanwhile, the processor 170 may control the zoom of the camera 195. For example, the processor 170 may control the zoom of the camera 195 based on an object detection result. When a traffic sign is detected, but content written on the traffic sign is not detected, the processor 170 may control the camera 195 to zoom in.

Meanwhile, the processor 170 may receive weather information and road traffic state information, for example, Transport Protocol Expert Group (TPEG) information via the communication unit 120.

Meanwhile, the processor 170 may recognize, in real time, traffic state information around the vehicle, which has been recognized, based on stereo images, by the driver assistance apparatus 100.

Meanwhile, the processor 170 may receive, for example, navigation information from the AVN apparatus 400 or a separate navigation apparatus (not illustrated) via the interface unit 130.

Meanwhile, the processor 170 may receive sensor information from the controller 770 or the sensing unit 760 via the interface unit 130. Here, the sensor information may include at least one selected from among vehicle traveling direction information, vehicle location information (GPS information), vehicle angle information, vehicle speed information, vehicle acceleration information, vehicle tilt information, vehicle forward/backward movement information, battery information, fuel information, tire information, vehicle lamp information, vehicle interior temperature information, vehicle interior humidity information, and steering wheel rotation information.

Meanwhile, the processor 170 may receive navigation information from the controller 770, the AVN apparatus 400 or a separate navigation apparatus (not illustrated) via the interface unit 130.

Meanwhile, the processor 170 may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for implementation of other functions.

The processor 170 may be controlled by the controller 770.

The display unit 180 may display various pieces of information processed in the processor 170. The display unit 180 may display an image related to the operation of the driver assistance apparatus 100. To display such an image, the display unit 180 may include a cluster or a Head Up Display (HUD) mounted at the front of the interior of the vehicle. Meanwhile, when the display unit 180 is a HUD, the display unit 180 may include a projector module to project an image to the windshield of the vehicle 1.

The audio output unit 185 may externally output sound based on an audio signal processed in the processor 170. To this end, the audio output unit 185 may include at least one speaker.

An audio input unit (not illustrated) may receive user voice. To this end, the audio input unit may include a microphone. The received voice may be converted into electrical signals by the audio input unit to thereby be transmitted to the processor 170.

The power supply unit 190 may supply power required to operate the respective components under the control of the processor 170. In particular, the power supply unit 190 may receive power from, for example, a battery inside the vehicle.

The camera 195 acquires a forward image or a surround-view image of the vehicle. The camera 195 may be a monocular camera or the stereo cameras 195*a* and 195*b* to capture a forward image of the vehicle. Alternatively, the camera 195 may be included in the around-view cameras 195, 196, 197 and 198 to capture a surround-view image of the vehicle.

The camera 195 may include an image sensor (e.g., a CMOS or a CCD) and an image processing module.

The camera 195 may process a still image or a moving image acquired by the image sensor. The image processing module may process the still image or the moving image acquired by the image sensor. Meanwhile, in some embodiments, the image processing module may be separate from or integrated with the processor 170.

The camera 195 may acquire an image capturing at least one of a traffic light, a traffic sign, and a road surface.

The camera 195 may be set to zoom in/out under the control of the processor 170. For example, under the control of the processor 170, a zoom barrel (not illustrated) included in the camera 195 may be moved to zoom in/out.

The camera 195 may be focused under the control of the processor 170. For example, under the control of the processor 170, a focus barrel (not illustrated) included in the camera 195 may be moved to set a focus. The focus may be automatically set based on zoom in/out setting.

Meanwhile, the processor 170 may automatically control the focus to correspond to the zoom control of the camera 195.

FIG. 3B is an internal block diagram of the driver assistance apparatus 100 according to another embodiment of the present invention.

Referring to FIG. 3B, the driver assistance apparatus 100 has a difference in that it includes the stereo cameras 195*a* and 195*b* as compared to the driver assistance apparatus 100 of FIG. 3A. The following description will focus on this difference.

The driver assistance apparatus 100 may include first and second cameras 195*a* and 195*b*. Here, the first and second cameras 195*a* and 195*b* may be referred to as stereo cameras.

The stereo cameras 195*a* and 195*b* may be configured to be detachably attached to the ceiling or windshield of the vehicle 1. The stereo cameras 195*a* and 195*b* may respectively include the first lens 193*a* and the second lens 193*b*.

Meanwhile, the stereo cameras 195*a* and 195*b* may respectively include the first light shield 192*a* and the second light shield 192*b*, which shield light to be introduced to the first lens 193*a* and the second lens 193*b*.

The first camera 195*a* captures a first forward image of the vehicle. The second camera 195*b* captures a second forward image of the vehicle. The second camera 195*b* is spaced apart from the first camera 195*a* by a prescribed distance. As the first and second cameras 195*a* and 195*b* are spaced apart from each other by a prescribed distance, binocular disparity is generated, which enables the detection of the distance to an object based on binocular disparity.

Meanwhile, when the driver assistance apparatus 100 includes the stereo cameras 195*a* and 195*b*, the processor 170 may implement computer vision based signal processing. As such, the processor 170 may acquire stereo images of the view in front of the vehicle from the stereo cameras 195*a* and 195*b* and perform binocular disparity calculation for the view in front of the vehicle based on the stereo images. Then, the processor 170 may perform object detection for at least one of the stereo images based on the calculated binocular disparity information and, after the object detection, continuously track the movement of an object. Here, the stereo images are based on the first forward image received from the first camera 195*a* and the second forward image received from the second camera 195*b*.

In particular, the processor 170 may perform, for example, Lane Detection (LD), Vehicle Detection (VD), Pedestrian Detection (PD), Bright-spot Detection (BD), Traffic Sign Recognition (TSR), and road surface detection during object detection.

In addition, the processor 170 may perform, for example, calculation of the distance to a detected adjacent vehicle, calculation of the speed of the detected adjacent vehicle, and calculation of the speed difference with the detected adjacent vehicle.

The processor 170 may control the zoom of the first and second cameras 195*a* and 195*b* individually. The processor 170 may periodically change the zoom magnification of the second camera 195*b* while fixing the zoom of the first camera 195*a*. The processor 170 may periodically change the zoom magnification of the first camera 195*a* while fixing the zoom of the second camera 195*b*.

The processor 170 may control the first or second camera 195*a* or 195*b* to zoom in or zoom out at a prescribed period.

The processor 170 may set the zoom of the first camera 195*a* to a high magnification so as to be advantageous for object detection at a long distance. In addition, the processor 170 may set the zoom of the second camera 195*b* to a low magnification so as to be advantageous for object detection at a short distance. At this time, the processor 170 may control the first camera 195*a* to zoom in and the second camera 195*b* to zoom out.

Conversely, the processor 170 may set the zoom of the first camera 195*a* to a low magnification so as to be advantageous for object detection at a short distance. In addition, the processor 170 may set the zoom of the second camera 195*b* to a high magnification so as to be advantageous for object detection at a long distance. At this time, the processor 170 may control the first camera 195*a* to zoom out and the second camera 195*b* to zoom in.

For example, the processor 170 may control the zoom of the first camera 195*a* or the second camera 195*b* according to an object detection result. For example, when a traffic sign is detected, but content written on the traffic sign is not detected, the processor 170 may control the first camera 195*a* or the second camera 195*b* to zoom in.

Meanwhile, the processor 170 may automatically control a focus to correspond to the zoom control of the camera 195.

FIG. 3C is an internal block diagram of the driver assistance apparatus 100 according to a still another embodiment of the present invention.

Referring to FIG. 3C, the driver assistance apparatus 100 has a difference in that it includes the around-view cameras 195 to 198 as compared to the driver assistance apparatus 100 of FIG. 3A. The following description will focus on this difference.

The driver assistance apparatus 100 may include the around-view cameras 195 to 198.

Each of the around-view cameras 195 to 198 may include a lens and a light shield configured to shield light to be introduced to the lens.

The around-view cameras may include the left camera 195, the rear camera 198, the right camera 197 and the front camera 195.

The front camera 195 captures a forward image of the vehicle. The left camera 196 captures a leftward image of the vehicle. The right camera 197 captures a rightward image of the vehicle. The rear camera 198 captures a rearward image of the vehicle.

The respective images captured by the around-view cameras 195 to 198 are transmitted to the processor 170.

The processor 170 may generate a surround-view image of the vehicle by composing the leftward image, the rearward image, the rightward image and the forward image of the vehicle. At this time, the surround-view image of the vehicle may be a top view image or a bird's eye view image. The processor 170 may receive each of the leftward image, the rearward image, the rightward image and the forward image of the vehicle, compose the received images, and convert the composed image into a top view image, thereby generating a surround-view image of the vehicle.

Meanwhile, the processor 170 may detect an object based on the surround-view image of the vehicle. In particular, the processor 170 may perform, for example, Lane Detection (LD), Vehicle Detection (VD), Pedestrian Detection (PD), Bright-spot Detection (BD), Traffic Sign Recognition (TSR), and road surface detection during object detection.

Meanwhile, the processor 170 may control the zoom of the around-view cameras 195 to 198 individually. The zoom control of the processor 170 may be equal to that of the stereo cameras as described above with reference to FIG. 3B.

Some of the components illustrated in FIGS. 3A to 3C may not be necessary in order to implement the driver assistance apparatus 100. Thus, the driver assistance apparatus 100 described in the present specification may include a greater or smaller number of components than those mentioned above. For example, the driver assistance apparatus 100 may include only the processor 170 and the camera 195.

Figure 4A:
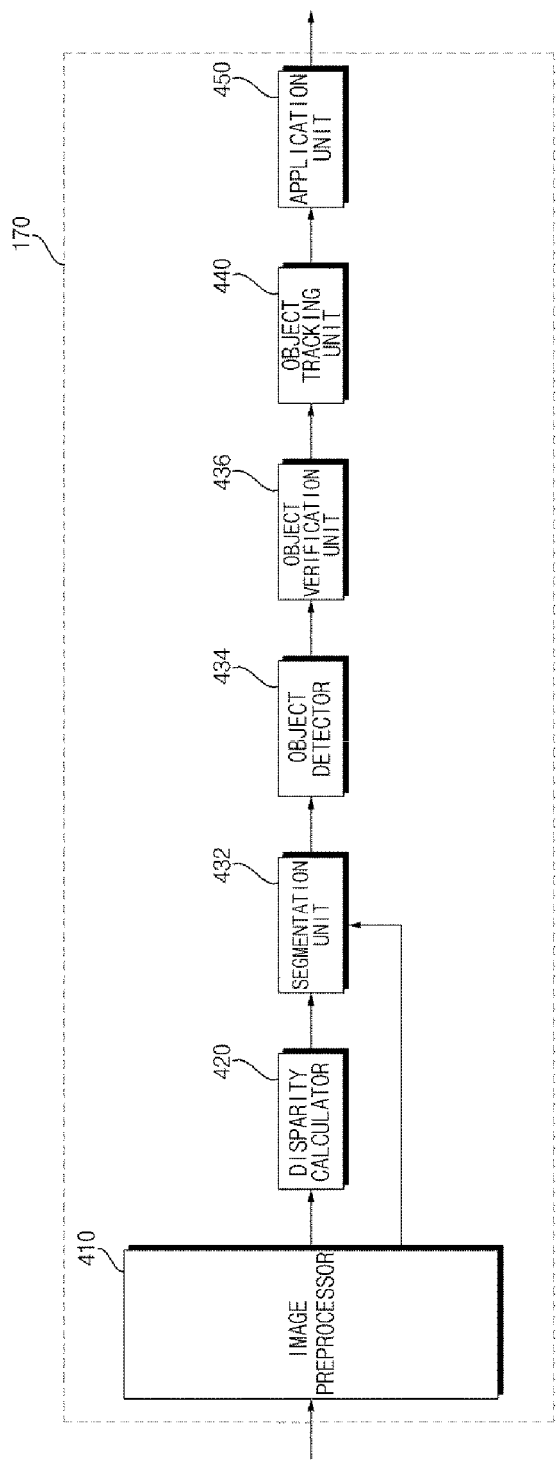
FIGS. 4A and 4B are various exemplary internal block diagrams illustrating a processor of FIGS. 3A and 3B.
Figure 4B:
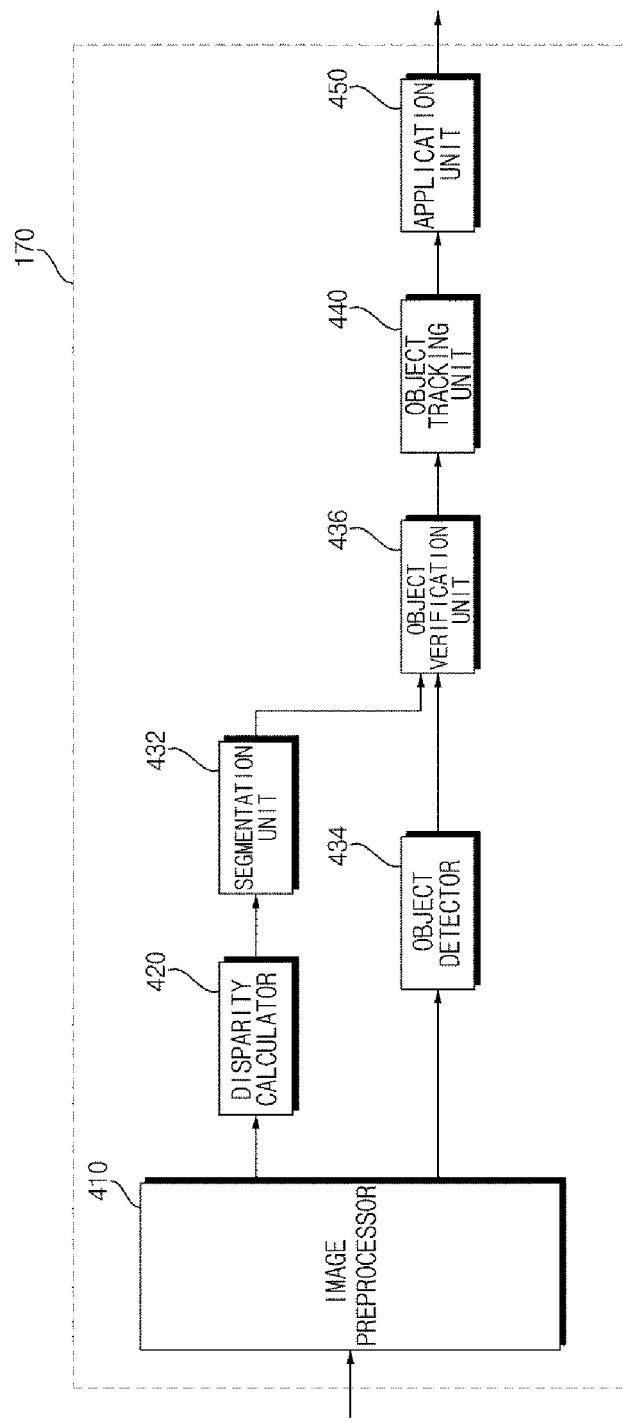

FIGS. 4A and 4B are various exemplary internal block diagrams illustrating the processor of FIGS. 3A and 3B, and FIGS. 5A and 5B are views referenced to explain the operation of the processor of FIGS. 4A and 4B.

First, referring to FIG. 4A illustrating one example of the processor 170 in internal block diagram, the processor 170 included in the driver assistance apparatus 100 may include an image preprocessor 410, a disparity calculator 420, a segmentation unit 432, an object detector 434, an object verification unit 436, an object tracking unit 440, and an application unit 450.

The image preprocessor 410 may receive an image from the camera 195 and preprocess the received image.

Specifically, the image preprocessor 410 may perform, for example, noise reduction, rectification, calibration, color enhancement, Color Space Conversion (CSC), interpolation, and camera gain control for the image. As such, the image preprocessor 410 may acquire an image more vivid than stereo images captured by the camera 195.

The disparity calculator 420 may receive images signal-processed by the image preprocessor 410, perform stereo matching for the received images, and acquire a binocular disparity map based on the stereo matching. That is, the disparity calculator 420 may acquire binocular disparity information related to the stereo images for a view in front of the vehicle.

At this time, the stereo matching may be performed on a per pixel basis or on a per prescribed block basis of the stereo images. Meanwhile, the binocular disparity map may mean a map in which binocular parallax information between stereo images, i.e. left and right images are represented by numerical values.

The segmentation unit 432 may perform segmentation and clustering on at least one of the stereo images based on the binocular disparity information from the disparity calculator 420.

Specifically, the segmentation unit 432 may segment at least one of the stereo images into a background and a foreground based on the binocular disparity information.

For example, the segmentation unit 432 may calculate a region of the disparity map, in which the binocular disparity information is a predetermined value or less, as a background and exclude the corresponding region. In this way, a foreground may be relatively separated.

In another example, the segmentation unit 432 may calculate a region of the disparity map, in which the binocular disparity information is a predetermined value or more, as a foreground and extract the corresponding region. In this way, the foreground may be separated.

As described above, when the image is segmented into the foreground and the background based on the binocular disparity information extracted based on the stereo images, it is possible to reduce a signal processing speed and a signal processing amount during subsequent object detection.

Subsequently, the object detector 434 may detect an object based on image segment by the segmentation unit 432.

That is, the object detector 434 may detect an object for at least one of the stereo images based on the binocular disparity information.

Specifically, the object detector 434 may detect an object for at least one of the stereo images. For example, the object detector 434 may detect an object from the foreground separated by image segment.

Subsequently, the object verification unit 436 may classify and verify the separated object.

To this end, the object verification unit 436 may use, for example, an identification method using a neural network, a Support Vector Machine (SVM) method, an AdaBoost identification method using a Harr-like feature, or a Histograms of Oriented Gradients (HOG) method.

Meanwhile, the object verification unit 436 may compare the detected object with objects stored in the memory 140 to verify the detected object.

For example, the object verification unit 436 may verify an adjacent vehicle, a traffic lane marker, a road surface, a traffic sign, a dangerous zone, and a tunnel, which are located around the vehicle.

The object tracking unit 440 may track the verified object. For example, the object tracking unit 440 may verify an object included in sequentially acquired stereo images, calculate the motion or motion vector of the verified object, and track, for example, the movement of the corresponding object based on the calculated motion or motion vector. As such, the object tracking unit 440 may track, for example, an adjacent vehicle, a traffic lane marker, a road surface, a traffic sign, a dangerous zone, and a tunnel, which are located around the vehicle.

Subsequently, the application unit 450 may calculate, for example, the accident risk of the vehicle 1 based on various objects located around the vehicle, for example, other vehicles, traffic lane markers, road surface, and traffic signs. In addition, the application unit 450 may calculate the possibility of front-end collision with a front vehicle and whether or not loss of traction occurs.

In addition, the application unit 450 may output, for example, a message to notify a user of driver assistance information such as, for example, the calculated risk, collision possibility, or traction loss. Alternatively, the application unit 450 may generate a control signal, as vehicle control information, for the attitude control or traveling control of the vehicle 1.

Meanwhile, the image preprocessor 410, the disparity calculator 420, the segmentation unit 432, the object detector 434, the object verification unit 436, the object tracking unit 440, and the application unit 450 may be internal components of an image processing unit 810 included in the processor 170 that will be described below with reference to FIG. 7 and the following drawings.

Meanwhile, in some embodiments, the processor 170 may include only some of the image preprocessor 410, the disparity calculator 420, the segmentation unit 432, the object detector 434, the object verification unit 436, the object tracking unit 440, and the application unit 450. For example, when the camera 195 is a monocular camera or around-view cameras, the disparity calculator 420 may be excluded. In addition, in some embodiments, the segmentation unit 432 may be excluded.

FIG. 4B is an internal block diagram illustrating another example of the processor.

Referring to FIG. 4B, the processor 170 includes the same internal units as those of the processor 170 of FIG. 4A, but has a signal processing sequence different from that of the processor 170 of FIG. 4A. The following description will focus on this difference.

The object detector 434 may receive stereo images and detect an object for at least one of the stereo images. Differently from FIG. 4A, the object detector 434 may not detect an object for a segmented image based on the binocular disparity information, but directly detect an object from the stereo images.

Subsequently, the object verification unit 436 classifies and verifies the detected and separated object based on image segment from the segmentation unit 432 and the object detected by the object detector 434.

To this end, the object verification unit 436 may use an identification method using a neural network, a SVM method, an AdaBoost identification method using a Haar-like feature, or a HOG method.

Figure 5A:
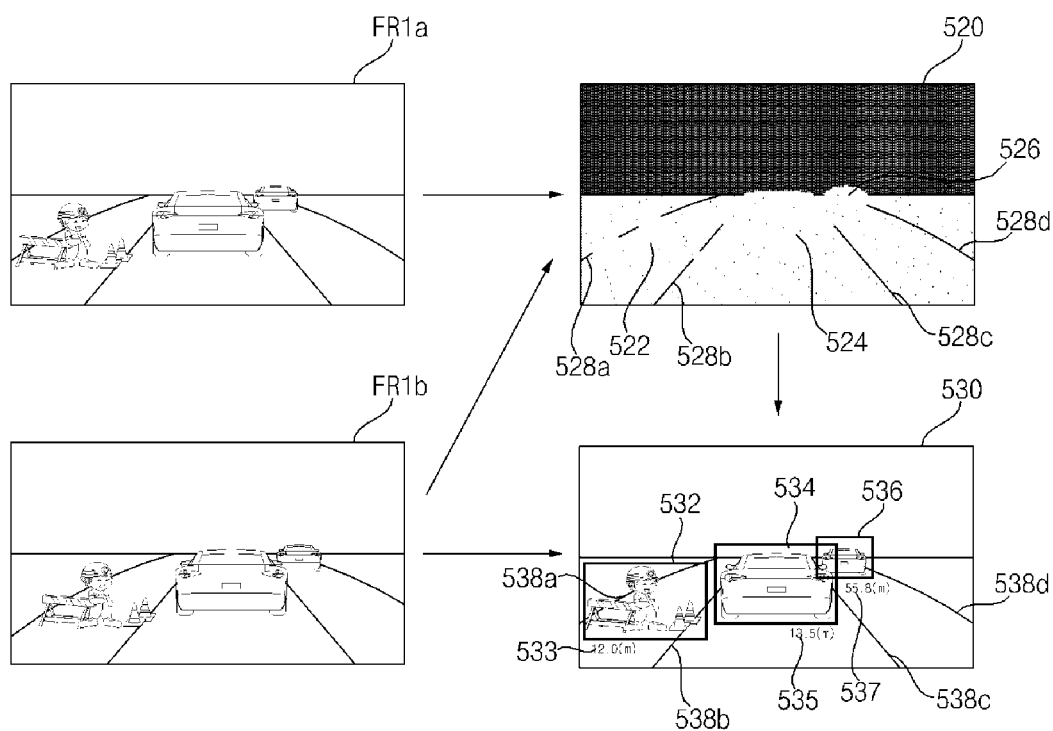
FIGS. 5A and 5B are views referenced to explain operation of the processor of FIGS. 4A and 4B.
Figure 5B:
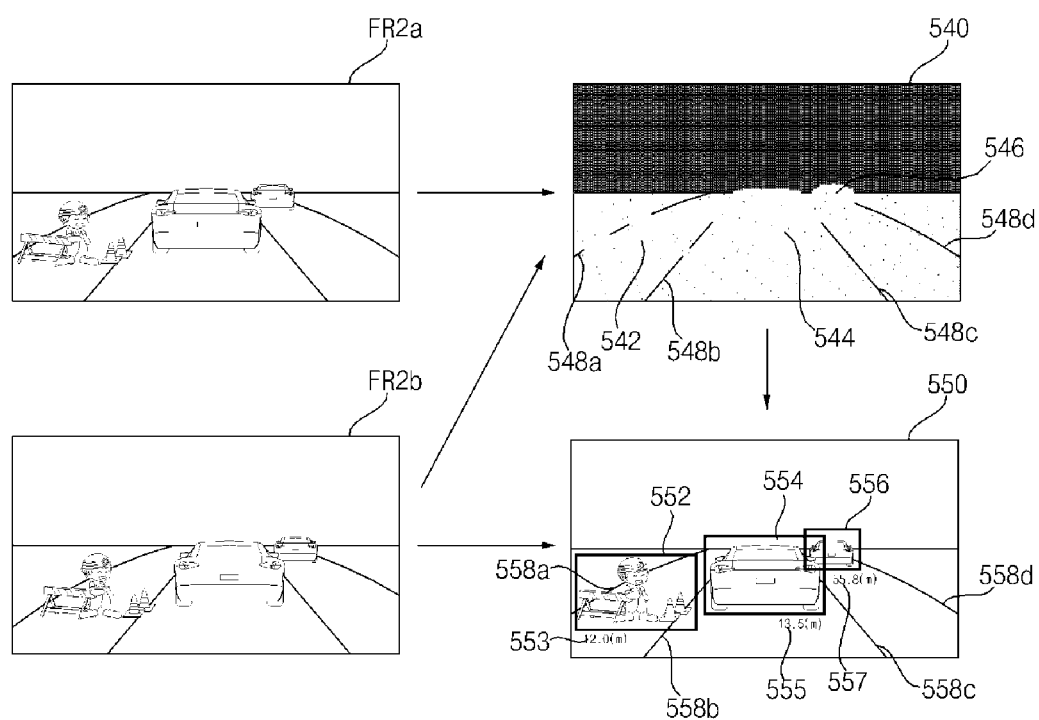

FIGS. 5A and 5B are views referenced to explain an operation method of the processor 170 illustrated in FIG. 4A based on stereo images acquired respectively from first and second frame periods.

Referring first to FIG. 5A, the stereo cameras 195a and 195b acquire stereo images during a first frame period.

The disparity calculator 420 included in the processor 170 receives stereo images FR1a and FR1b signal-processed by the image preprocessor 410 and performs stereo matching for the received stereo images FR1a and FR1b to acquire a disparity map 520.

The disparity map 520 shows a binocular disparity between the stereo images FR1a and FR1b as levels. As the disparity level is higher, the distance to the vehicle may be calculated as being shorter. As the disparity level is lower, the distance to the vehicle may be calculated as being longer.

Meanwhile, when the disparity map is displayed, the disparity map may be displayed with higher brightness as the disparity level is higher and displayed with lower brightness as the disparity level is lower.

FIG. 5A shows, by way of example, that, in the disparity map 520, first to fourth traffic lane markers 528a, 528b, 528c, and 528d have their own disparity levels and a roadwork zone 522, a first preceding vehicle 524, and a second preceding vehicle 526 have their own disparity levels.

The segmentation unit 432, the object detector 434, and the object verification unit 436 respectively perform segmentation, object detection, and object verification for at least one of the stereo images FR1a and FR1b based on the disparity map 520.

FIG. 5A shows, by way of example, that object detection and object verification for the second stereo image FR1b are performed using the disparity map 520.

That is, object detection and object verification for first to fourth traffic lane markers 538a, 538b, 538c, and 538d, a roadwork zone 532, a first preceding vehicle 534, and a second preceding vehicle 536 in an image 530 may be performed.

Next, referring to FIG. 5B, the stereo cameras 195a and 195b acquire stereo images during a second frame period.

The disparity calculator 420 included in the processor 170 receives stereo images FR2a and FR2b signal-processed by the image preprocessor 410 and performs stereo matching for the received stereo images FR2a and FR2b to acquire a disparity map 540.

FIG. 5B shows, by way of example, that, in the disparity map 540, first to fourth traffic lane markers 548a, 548b, 548c, and 548d have their own disparity levels and a roadwork zone 542, a first preceding vehicle 544, and a second preceding vehicle 546 have their own disparity levels.

The segmentation unit 432, the object detector 434, and the object verification unit 436 respectively perform segmentation, object detection, and object verification for at least one of the stereo images FR2a and FR2b based on the disparity map 540.

FIG. 5B shows, by way of example, that object detection and object verification for the second stereo image FR2b are performed using the disparity map 540.

That is, object detection and object verification for first to fourth traffic lane markers 558a, 558b, 558c, and 558d, a roadwork zone 552, a first preceding vehicle 554, and a second preceding vehicle 556 in an image 550 may be performed.

Meanwhile, the object tracking unit 440 may track verified objects by comparing FIGS. 5A and 5B with each other.

Specifically, the object tracking unit 440 may track movement of an object based on the motion or motion vectors of respective objects verified from FIGS. 5A and 5B. As such, the object tracking unit 440 may track, for example, traffic lane markers, a roadwork zone, a first preceding vehicle and a second preceding vehicle, which are located around the vehicle.

Figure 6A:
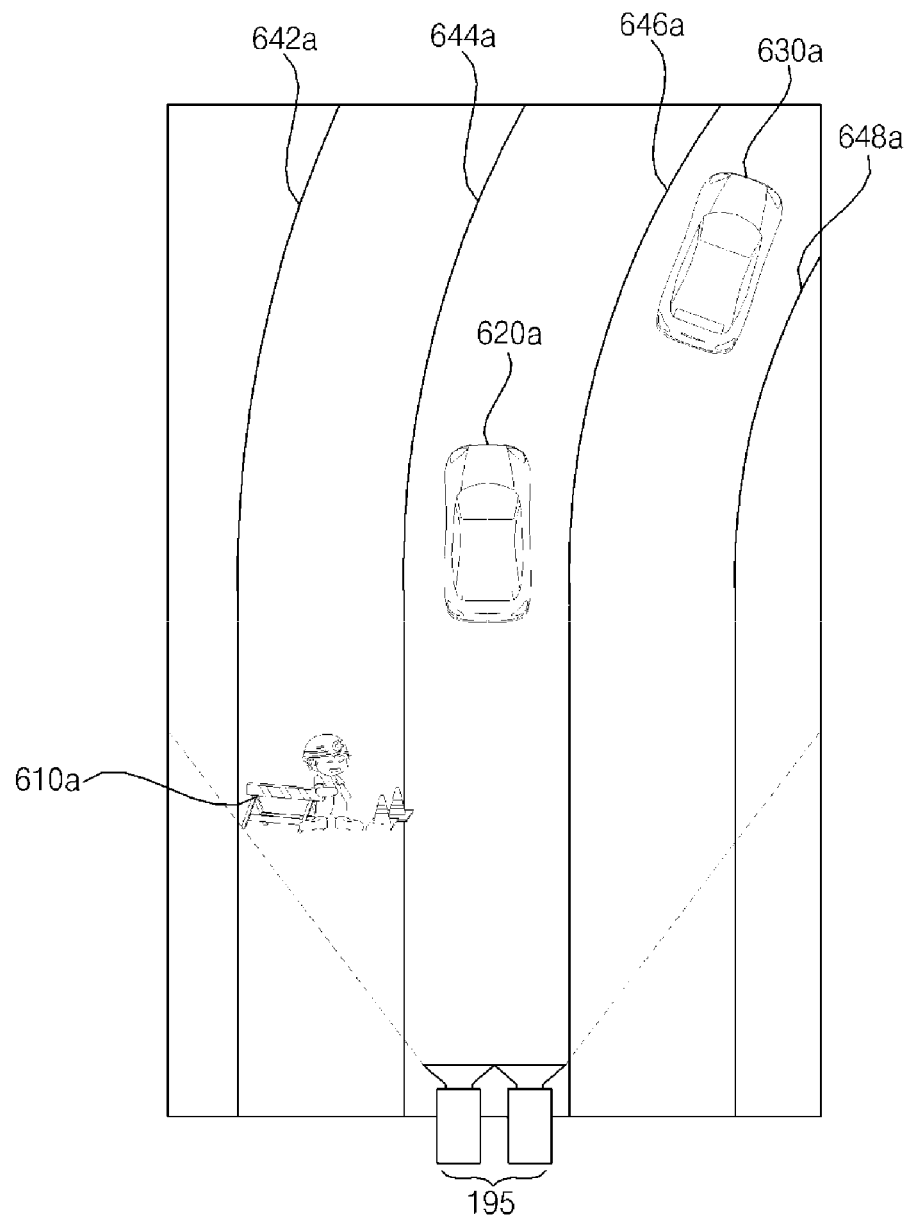
FIGS. 6A and 6B are views referenced to explain operation of the driver assistance apparatus of FIGS. 3A to 3C.
Figure 6B:
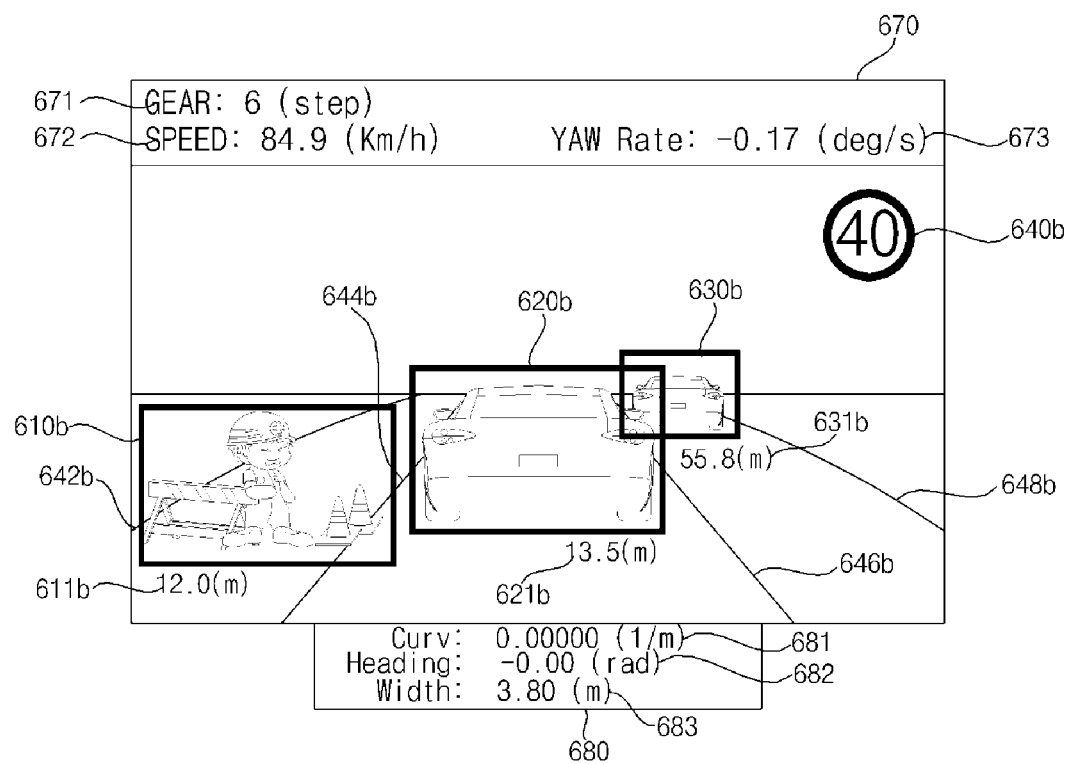

FIGS. 6A and 6B are views referenced to explain operation of the driver assistance apparatus of FIGS. 3A to 3C.

First, FIG. 6A is a view illustrating the view in front of the vehicle captured by the stereo cameras 195a and 195b mounted in the vehicle. In particular, FIG. 6A illustrates the view in front of the vehicle in a bird's eye view form.

Referring to FIG. 6A, a first traffic lane marker 642a, a second traffic lane marker 644a, a third traffic lane marker 646a, and a fourth traffic lane marker 648a are arranged from the left to the right, a roadwork zone 610a is located between the first traffic lane marker 642a and the second traffic lane marker 644a, a first preceding vehicle 620a is located between the second traffic lane marker 644a and the third traffic lane marker 646a, and a second preceding vehicle 630a is located between the third traffic lane marker 646a and the fourth traffic lane marker 648a.

Next, FIG. 6B illustrates the view in front of the vehicle recognized by the driver assistance apparatus 100 along with various pieces of information. In particular, an image as illustrated in FIG. 6B may be displayed on the display unit 180 provided in the driver assistance apparatus 100, the AVN apparatus 400, or the display unit 741.

Differently from FIG. 6A, FIG. 6B illustrates the display of information based on images captured by the stereo cameras 195a and 195b.

Referring to FIG. 6B, a first traffic lane marker 642b, a second traffic lane marker 644b, a third traffic lane marker 646b, and a fourth traffic lane marker 648b are arranged from the left to the right, a roadwork zone 610b is located between the first traffic lane marker 642b and the second traffic lane marker 644b, a first preceding vehicle 620b is located between the second traffic lane marker 644b and the third traffic lane marker 646b, and a second preceding vehicle 630b is located between the third traffic lane marker 646b and the fourth traffic lane marker 648b.

The driver assistance apparatus 100 may verify objects for the roadwork zone 610b, the first preceding vehicle 620b, and the second preceding vehicle 630b by signal processing stereo images captured by the stereo cameras 195a and 195b. In addition, the driver assistance apparatus 100 may verify the first traffic lane marker 642b, the second traffic lane marker 644b, the third traffic lane marker 646b, and the fourth traffic lane marker 648b.

Meanwhile, in FIG. 6B, in order to represent object verification for the roadwork zone 610b, the first preceding vehicle 620b, and the second preceding vehicle 630b, the roadwork zone 610b, the first preceding vehicle 620b, and the second preceding vehicle 630b are highlighted in black boxes.

Meanwhile, the driver assistance apparatus 100 may calculate distance information regarding the roadwork zone 610b, the first preceding vehicle 620b, and the second preceding vehicle 630b based on the stereo images captured by the stereo cameras 195a and 195b.

FIG. 6B illustrates the display of calculated first distance information 611b, second distance information 621b, and third distance information 631b, which correspond respectively to the roadwork zone 610b, the first preceding vehicle 620b, and the second preceding vehicle 630b.

Meanwhile, the driver assistance apparatus 100 may receive vehicle sensor information from the controller 770 or the sensing unit 760. In particular, the driver assistance apparatus 100 may receive vehicle speed information, gear information, yaw rate information that represents the change rate of a rotation angle (yaw) of the vehicle, and vehicle angle information and display the aforementioned information.

Although FIG. 6B illustrates that vehicle speed information 672, gear information 671, and yaw rate information 673 are displayed in an upper portion 670 of a forward image of the vehicle and vehicle angle information 682 is displayed in a lower portion 680 of the forward image of the vehicle, various other examples are possible. In addition, vehicle width information 683 and road curvature information 681 may be displayed along with the vehicle angle information 682.

Meanwhile, the driver assistance apparatus 100 may receive speed limit information for a road on which the vehicle 700 is traveling via the communication unit 120 or the interface unit 130. FIG. 6B illustrates display of speed limit information 640b.

Although the driver assistance apparatus 100 may display various pieces of information illustrated in FIG. 6B via, for example, the display unit 180, alternatively, the driver assistance apparatus 100 may store various pieces of information without displaying the same. In addition, the driver assistance apparatus 100 may utilize the information in a variety of applications.

Figure 7:
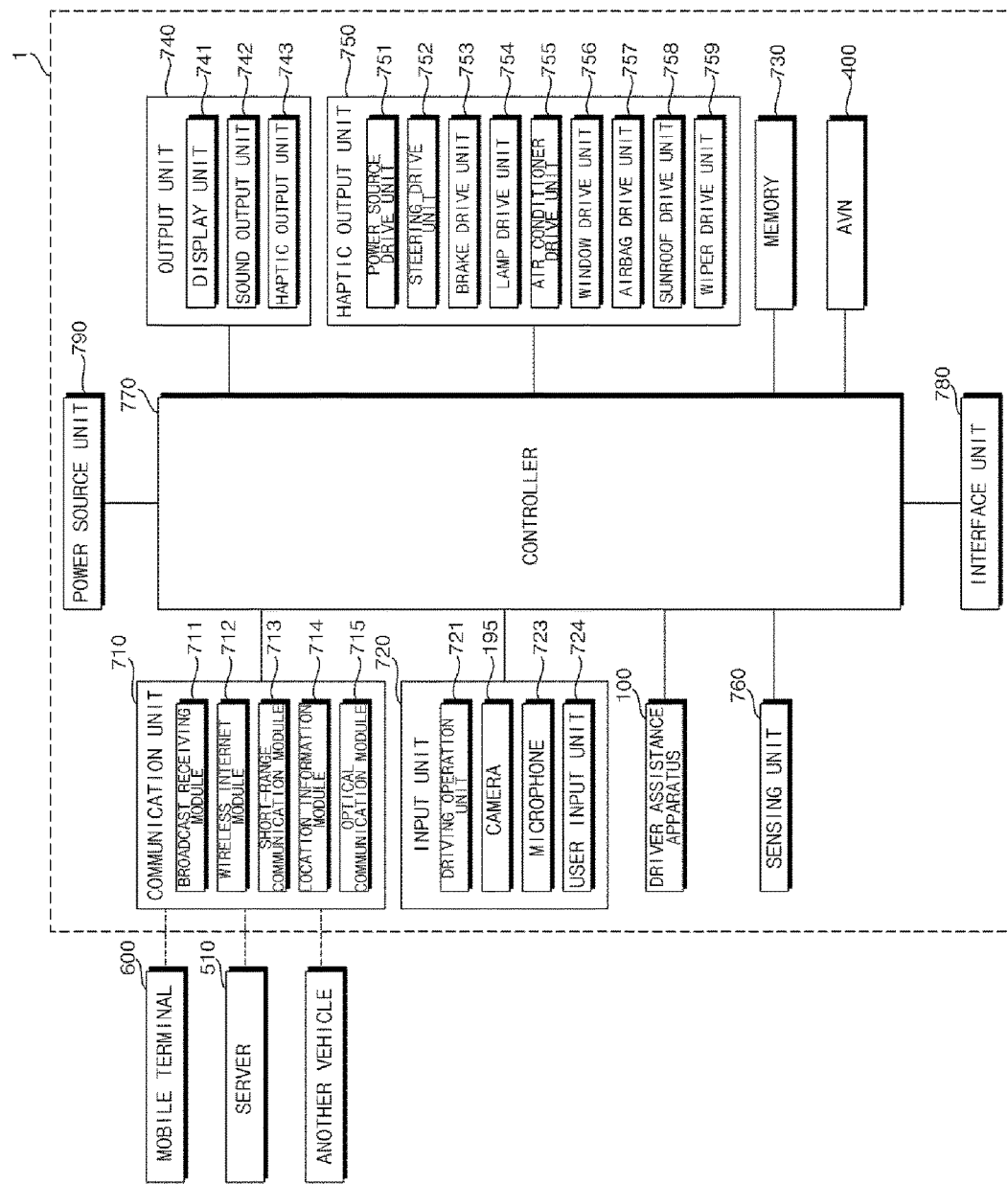
FIG. 7 is an internal block diagram illustrating one example of the vehicle of FIG. 1.

FIG. 7 is a block diagram illustrating one example of the vehicle 1 of FIG. 1.

The vehicle 1 may include the communication unit 710, the input unit 720, the sensing unit 760, an output unit 740, a vehicle drive unit 750, a memory 730, an interface unit 780, the controller 770, the power source unit 790, the driver assistance apparatus 100, and the AVN apparatus 400.

The communication unit 710 may include one or more modules to enable the wireless communication between the vehicle 1 and the mobile terminal 600, between the vehicle 1 and the external server 510, or between the vehicle 1 and another vehicle. In addition, the communication unit 710 may include one or more modules to connect the vehicle 1 to one or more networks.

The communication unit 710 may include a broadcast receiving module 711, a wireless Internet module 712, a short-range communication module 713, a location information module 714, and an optical communication module 715.

The broadcast receiving module 711 is configured to receive a broadcast signal or broadcast associated information from an external broadcast managing server via a broadcast channel. Here, broadcast includes radio broadcast or TV broadcast.

The wireless Internet module 712 is a module for wireless Internet access. The wireless Internet module 712 may be internally or externally coupled to the vehicle 1. The wireless Internet module 712 may transmit or receive wireless signals via communication networks according to wireless Internet technologies.

Examples of such wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), and LTE-A (Long Term Evolution-Advanced). The wireless Internet module 712 may transmit and receive data according to one or more of such wireless Internet technologies, and other Internet technologies as well. For example, the wireless Internet module 712 may exchange data with the external server 510 in a wireless manner. The wireless Internet module 712 may receive weather information and road traffic state information (e.g., Transport Protocol Expert Group (TPEG) information) from the external server 510.

The short-range communication module 713 may assist short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication module 713 forms wireless area networks to perform the short-range communication between the vehicle 1 and at least one external device. For example, the short-range communication module 713 may exchange data with the mobile terminal 600 in a wireless manner. The short-range communication module 713 may receive weather information and road traffic state information (e.g., Transport Protocol Expert Group (TPEG) information) from the mobile terminal 600. When the user gets into the vehicle 1, the mobile terminal 600 of the user and the vehicle 1 may pair with each other automatically or as the user executes a pairing application.

The location information module 714 is a module to acquire a location of the vehicle 1. A representative example of the location information module 714 includes a Global Position System (GPS) module. For example, when the vehicle utilizes a GPS module, a location of the vehicle may be acquired using signals transmitted from GPS satellites.

The optical communication module 715 may include a light emitting unit and a light receiving unit.

The light receiving unit may convert light into electrical signals to receive information. The light receiving unit may include Photo Diodes (PDPs) to receive light. The photo diodes may convert light into electrical signals. For example, the light receiving unit may receive information regarding a preceding vehicle via light emitted from a light source included in the preceding vehicle.

The light emitting unit may include at least one light emitting element to convert electrical signals into light. Here, the light emitting element may be a Light Emitting Diode (LED). The light emitting unit converts electrical signals into light to thereby emit the light. For example, the light emitting unit may externally emit light via flickering of the light emitting element corresponding to a prescribed frequency. In some embodiments, the light emitting unit may include an array of a plurality of light emitting elements. In some embodiments, the light emitting unit may be integrated with a lamp provided in the vehicle 1. For example, the light emitting unit may be at least one selected from among a headlight, a taillight, a brake light, a turn signal light, and a sidelight. For example, the optical communication module 715 may exchange data with another vehicle 520 via optical communication.

The input unit 720 may include a driving operation unit 721, the camera 195, a microphone 723, and the user input unit 724.

The driving operation unit 721 is configured to receive user input for the driving of the vehicle 1. The driving operation unit 721 may include the steering input unit 721a, a shift input unit 721b, an acceleration input unit 721c, and a brake input unit 721d.

The steering input unit 721a is configured to receive user input with regard to the direction of travel of the vehicle 1. The steering input unit 721a may take the form of the steering wheel 12 as illustrated in FIG. 1. In some embodiments, the steering input unit 721a may be configured as a touchscreen, a touch pad, or a button.

The shift input unit 721b is configured to receive input for selecting one of Park (P), Drive (D), Neutral (N) and Reverse (R) gears of the vehicle 1 from the user. The shift input unit 721b may have a lever form. In some embodiments, the shift input unit 721b may be configured as a touchscreen, a touch pad, or a button.

The acceleration input unit 721c is configured to receive user input for the acceleration of the vehicle 1. The brake input unit 721d is configured to receive user input for the speed reduction of the vehicle 1. Each of the acceleration input unit 721c and the brake input unit 721d may have a pedal form. In some embodiments, the acceleration input unit 721c or the brake input unit 721d may be configured as a touchscreen, a touch pad, or a button.

The camera 195 may include an image sensor and an image processing module. The camera 195 may process a still image or a moving image acquired by the image sensor (e.g., a CMOS or a CCD). The image processing module may extract required information by processing a still image or a moving image acquired via the image sensor and, then, may transmit the extracted information to the controller 770. Meanwhile, the vehicle 1 may include the camera 195 to capture a forward image or a surround-view image of the vehicle and an internal camera 199 to capture an image of the interior of the vehicle.

The internal camera 199 may capture an image of a passenger. The internal camera 199 may capture an image of biometrics of the passenger.

Meanwhile, although FIG. 7 illustrates the camera 195 as being included in the input unit 720, the camera 195 may be described as being a component of the driver assistance apparatus 100 as described above with reference to FIGS. 2 to 6.

The microphone 723 may process external sound signals into electrical data. The processed data may be utilized in various ways according to a function that the vehicle 1 is performing. The microphone 723 may convert a user voice command into electrical data. The converted electrical data may be transmitted to the controller 770.

Meanwhile, in some embodiments, the camera 195 or the microphone 723 may be components of the sensing unit 760, other than components of the input unit 720.

The user input unit 724 is configured to receive information from the user. When information is input via the user input unit 724, the controller 770 may control the operation of the vehicle 1 to correspond to the input information. The user input unit 724 may include a touch input unit or a mechanical input unit. In some embodiments, the user input unit 724 may be located in a region of the steering wheel. In this case, the driver may operate the user input unit 724 with the fingers while gripping the steering wheel.

The sensing unit 760 is configured to sense signals associated with, for example, the traveling of the vehicle 1. To this end, the sensing unit 760 may include a collision sensor, a steering sensor, a speed sensor, gradient sensor, a weight sensor, a heading sensor, a yaw sensor, a gyro sensor, a position module, a vehicle forward/backward movement sensor, a battery sensor, a fuel sensor, a tire sensor, a steering sensor based on the rotation of a steering wheel, a vehicle interior temperature sensor, a vehicle interior humidity sensor, an ultrasonic sensor, an infrared sensor, a radar, and Lidar.

As such, the sensing unit 760 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/backward movement information, battery information, fuel information, tire information, vehicle lamp information, vehicle interior temperature information, vehicle interior humidity information, and steering wheel rotation angle information. In addition, the driver assistance apparatus 100 that will be described below may generate control signals for acceleration, speed reduction, direction change and the like of the vehicle 1 based on surrounding environment information acquired by at least one of the camera, the ultrasonic sensor, the infrared sensor, the radar, and Lidar included in the vehicle 1. Here, the surrounding environment information may be information related to various objects located within a prescribed distance range from the vehicle 1 that is traveling. For example, the surrounding environment information may include the number of obstacles located within a distance of 100*m* from the vehicle 1, the distances to the obstacles, the sizes of the obstacles, the kinds of the obstacles, and the like.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 may include a biometric information sensing unit. The biometric information sensing unit is configured to sense and acquire biometric information of the passenger. The biometric information may include fingerprint information, iris-scan information, retina-scan information, hand geometry information, facial recognition information, and voice recognition information. The biometric information sensing unit may include a sensor to sense biometric information of the passenger. Here, the internal camera 199 and the microphone 723 may operate as sensors. The biometric information sensing unit may acquire hand geometry information and facial recognition information via the internal camera 199.

The output unit 740 is configured to output information processed in the controller 770. The output unit 740 may include the display unit 741, a sound output unit 742, and a haptic output unit 743.

The display unit 741 may display information processed in the controller 770. For example, the display unit 741 may display vehicle associated information. Here, the vehicle associated information may include vehicle control information for the direct control of the vehicle or driver assistance information to guide vehicle driving. In addition, the vehicle associated information may include vehicle state information that notifies a current state of the vehicle or vehicle traveling information regarding the traveling of the vehicle.

The display unit 741 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 741 may configure an inter-layer structure with a touch sensor, or may be integrally formed with the touch sensor to implement a touchscreen. The touchscreen may function as the user input unit 724 which provides an input interface between the vehicle 1 and the user and also function to provide an output interface between the vehicle 1 and the user. In this case, the display unit 741 may include a touch sensor which senses a touch to the display unit 741 so as to receive a control command in a touch manner. When a touch is input to the display unit 741 as described above, the touch sensor may sense the touch and the controller 770 may generate a control command corresponding to the touch. Content input in a touch manner may be characters or numbers, or may be, for example, instructions in various modes or menu items that may be designated.

Meanwhile, the display unit 741 may include a cluster to allow the driver to check vehicle state information or vehicle traveling information while driving the vehicle. The cluster may be located on a dashboard. In this case, the driver may check information displayed on the cluster while looking forward.

Meanwhile, in some embodiments, the display unit 741 may be implemented as a Head Up display (HUD). When the display unit 741 is implemented as a HUD, information may be output via a transparent display provided at the windshield. Alternatively, the display unit 741 may include a projector module to output information via an image projected to the windshield.

The sound output unit 742 is configured to convert electrical signals from the controller 770 into audio signals and to output the audio signals. To this end, the sound output unit 742 may include, for example, a speaker. The sound output unit 742 may output sound corresponding to the operation of the user input unit 724.

The haptic output unit 743 is configured to generate tactile output. For example, the haptic output unit 743 may operate to vibrate a steering wheel, a safety belt, or a seat so as to allow the user to recognize an output thereof.

The vehicle drive unit 750 may control the operation of various devices of the vehicle. The vehicle drive unit 750 may include at least one of a power source drive unit 751, a steering drive unit 752, a brake drive unit 753, a lamp drive unit 754, an air conditioner drive unit 755, a window drive unit 756, an airbag drive unit 757, a sunroof drive unit 758, and a wiper drive unit 759.

The power source drive unit 751 may perform electronic control for a power source inside the vehicle 1. The power source drive unit 751 may include an acceleration device to increase the speed of the vehicle 1 and a speed reduction device to reduce the speed of the vehicle 1.

For example, in the case where a fossil fuel based engine (not illustrated) is a power source, the power source drive unit 751 may perform electronic control for the engine. As such, the power source drive unit 751 may control, for example, an output torque of the engine. In the case where the power source drive unit 751 is the engine, the power source drive unit 751 may control the speed of the vehicle by controlling the output torque of the engine under the control of the controller 770.

In another example, when an electric motor (not illustrated) is a power source, the power source drive unit 751 may perform control for the motor. As such, the power source drive unit 751 may control, for example, the RPM and torque of the motor.

The steering drive unit 752 may include a steering apparatus. Thus, the steering drive unit 752 may perform electronic control for a steering apparatus inside the vehicle 1. For example, the steering drive unit 752 may include a steering torque sensor, a steering angle sensor, and a steering motor. The steering torque, applied to the steering wheel 12 by the driver, may be sensed by the steering torque sensor. The steering drive unit 752 may control steering force and a steering angle by changing the magnitude and direction of current applied to the steering motor based on, for example, the speed and the steering torque of the vehicle 1. In addition, the steering drive unit 752 may judge whether the direction of travel of the vehicle 1 is correctly being adjusted based on steering angle information acquired by the steering angle sensor. As such, the steering drive unit 752 may change the direction of travel of the vehicle 1. In addition, the steering drive unit 752 may reduce the sense of weight of the steering wheel 12 by increasing the steering force of the steering motor when the vehicle 1 travels at a low speed and may increase the sense of weight of the steering wheel 12 by reducing the steering force of the steering motor when the vehicle 1 travels at a high speed. In addition, when the autonomous driving function of the vehicle 1 is executed, the steering drive unit 752 may control the steering motor to generate appropriate steering force based on, for example, the sensing signals output from the sensing unit 760 or control signals provided by the processor 170 even in the state in which the driver operates the steering wheel 12 (i.e. in the state in which no steering torque is sensed).

The brake drive unit 753 may perform electronic control of a brake apparatus (not illustrated) inside the vehicle 1. For example, the brake drive unit 753 may reduce the speed of the vehicle 1 by controlling the operation of brakes located at wheels. In another example, the brake drive unit 753 may adjust the direction of travel of the vehicle 1 leftward or rightward by differentiating the operation of respective brakes located at left and right wheels.

The lamp drive unit 754 may turn at least one lamp arranged inside and outside the vehicle 1 on or off. The lamp drive unit 754 may include a lighting apparatus. In addition, the lamp drive unit 754 may control, for example, the intensity and direction of light of each lamp included in the lighting apparatus. For example, the lamp drive unit 754 may perform control for a turn signal lamp, a headlamp or a brake lamp.

The air conditioner drive unit 755 may perform the electronic control of an air conditioner (not illustrated) inside the vehicle 1. For example, when the interior temperature of the vehicle 1 is high, the air conditioner drive unit 755 may operate the air conditioner to supply cold air to the interior of the vehicle 1.

The window drive unit 756 may perform the electronic control of a window apparatus inside the vehicle 1. For example, the window drive unit 756 may control the opening or closing of left and right windows of the vehicle 1.

The airbag drive unit 757 may perform the electronic control of an airbag apparatus inside the vehicle 1. For example, the airbag drive unit 757 may control an airbag to be deployed in a dangerous situation.

The sunroof drive unit 758 may perform electronic control of a sunroof apparatus inside the vehicle 1. For example, the sunroof drive unit 758 may control the opening or closing of a sunroof.

The wiper drive unit 759 may perform the electronic control of the wipers 14a and 14b included in the vehicle 1. For example, the wiper drive unit 759 may perform electronic control with regard to, for example, the number of operations and the speed of operation of the wipers 14a and 14b in response to user input upon receiving the user input that directs operation of the wipers 14a and 14b through the user input unit 724. In another example, the wiper drive unit 759 may judge the amount or strength of rainwater based on sensing signals of a rain sensor included in the sensing unit 760 so as to automatically operate the wipers 14a and 14b without the user input.

Meanwhile, the vehicle drive unit 750 may further include a suspension drive unit (not illustrated). The suspension drive unit may perform the electronic control of a suspension apparatus (not illustrated) inside the vehicle 1. For example, when the road surface is uneven, the suspension drive unit may control the suspension apparatus to reduce vibration of the vehicle 1.

The memory 730 is electrically connected to the controller 770. The memory 730 may store basic data for each unit, control data for the operation control of the unit, and input/output data. The memory 730 may be various hardware storage devices such as, for example, a ROM, a RAM, an EPROM, a flash drive, and a hard drive. The memory 730 may store various data for the overall operation of the vehicle 1 such as, for example programs for the processing or control of the controller 770.

The interface unit 780 may serve as a passage for various kinds of external devices that are connected to the vehicle 1. For example, the interface unit 780 may have a port that is connectable to the mobile terminal 600 and may be connected to the mobile terminal 600 via the port. In this case, the interface unit 780 may exchange data with the mobile terminal 600.

Meanwhile, the interface unit 780 may serve as a passage for the supply of electrical energy to the connected mobile terminal 600. When the mobile terminal 600 is electrically connected to the interface unit 780, the interface unit 780 supplies electrical energy from the power source unit 790 to the mobile terminal 600 under the control of the controller 770.

The controller 770 may control the overall operation of each unit inside the vehicle 1. The controller 770 may be referred to as an Electronic Control Unit (ECU).

The controller 770 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The power source unit 790 may supply power required to operate the respective components under the control of the controller 770. In particular, the power source unit 790 may receive power from, for example, a battery (not illustrated) inside the vehicle 1.

The driver assistance apparatus 100 may exchange data with the controller 770. A control signal generated in the driver assistance apparatus 100 may be output to the controller 770. The controller 770 may control the direction of travel of the vehicle 1 based on a control signal received by the driver assistance apparatus 100.

The AVN apparatus 400 may exchange data with the controller 770. The controller 770 may receive navigation information from the AVN apparatus 400 or a separate navigation apparatus (not illustrated). Here, the navigation information may include set destination information, destination based routing information, and map information or vehicle location information related to vehicle traveling.

Meanwhile, some of the components illustrated in FIG. 7 may be not necessary to implement the vehicle 1. Accordingly, the vehicle 1 described in the present specification may include a greater or smaller number of components than those mentioned above.

Hereinafter, for convenience of description, the driver assistance apparatus 100 according to the embodiment of the present invention is assumed as being included in the vehicle 1 illustrated in FIG. 1.

Figure 8:
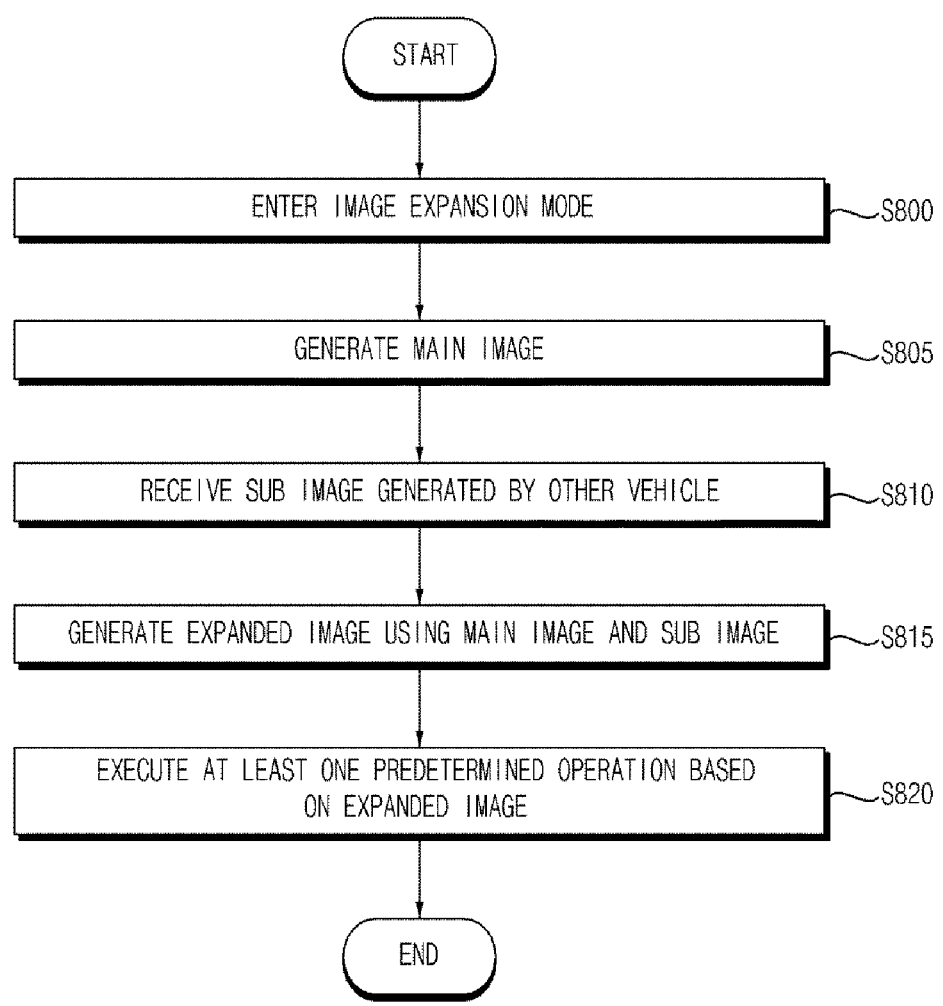
FIG. 8 is a flowchart illustrating a control method of the driver assistance apparatus according to one embodiment of the present invention.

FIG. 8 is a flowchart illustrating a control method of the driver assistance apparatus 100 according to one embodiment of the present invention.

Referring to FIG. 8, the processor 170 enters an image expansion mode (S800). In the present invention, the image expansion mode means a mode that generates an expanded image using at least a portion of a surround-view image of the vehicle 1 and at least a portion of a surround-view image of another vehicle. Hereinafter, the surround-view image of the vehicle 1 is referred to as a "main image" and the surround-view image of the other vehicle is referred to as a "sub image". Meanwhile, the main image and the sub image serve to distinguish whether the subject that generates each image is the vehicle 1 or the other vehicle and are not intended to limit the scope of the present invention.

The processor 170 may enter the image expansion mode when a predetermined condition is satisfied.

For example, the processor 170 may enter the image expansion mode when the input unit 110 receives user input that commands entry into the image expansion mode. In this case, the user input may be at least one of various forms of inputs such as, for example, touch, voice, button push, and a gesture.

In another example, the processor 170 may calculate the degree of risk based on information regarding the environment around the vehicle 1, acquired by the sensing unit 760 of the vehicle 1, thereby entering the image expansion mode when the calculated degree of risk exceeds a reference value. Upon judging, based on the information regarding the environment around the vehicle 1, that various objects such as, for example, another vehicle approach the vehicle 1 closer than a reference distance (e.g., 2 m), the processor 170 may enter the image expansion mode in consideration of a high risk of accidents.

In still another example, the processor 170 may enter the image expansion mode when the vehicle 1 slows down below a reference speed (e.g., 10 km/h).

In a further example, the processor 170 may enter the image expansion mode when the vehicle 1 begins a parking mode.

Subsequently, the processor 170 generates a main image using one or more cameras 195 to 198 (S805). For example, the processor 170 may turn on a least one of the cameras 195 to 198 illustrated in FIG. 2 when entering the image expansion mode, to generate a main image. That is, the main image may include at least one of a forward image, a leftward image, a rightward image, and a rearward image of the vehicle 1.

At this time, the main image may have any of various forms. In one example, the main image may be a still image or a moving image. In another example, the main image may have an around-view form as exemplarily illustrated in FIG. 2C. Hereinafter, for convenience of description, it is assumed that the main image is a so-called around-view image including all of the forward image, the leftward image, the rightward image and the rearward image of the vehicle 1.

Subsequently, the processor 170 receives a sub image generated by the other vehicle using the communication unit 120 or 710 (S810). That is, the communication unit 120 or 710 receives a sub image from the other vehicle under the control of the processor 170. Here, the sub image is an image generated by cameras provided at the other vehicle.

The communication unit 120 or 170 may directly receive the sub image from the other vehicle. For example, the communication unit 120 or 710 may directly receive the sub image from the other vehicle based on a vehicle-to-vehicle communication network.

Alternatively, the communication unit 120 or 710 may receive the sub image generated by the other vehicle via the mediation of at least one external device. For example, the other vehicle may transmit the sub image to an external server, and the external server may transmit the sub image received from the other vehicle to the driver assistance apparatus 100 provided at the vehicle 1.

At this time, the sub image may have any of various forms. In one example, the sub image may be a still image or a moving image. In another example, the sub image may have an around-view form as exemplarily illustrated in FIG. 2C. Hereinafter, for convenience of description, similar to the main image, it is assumed that the sub image is a so-called around-view image including all of the forward image, the leftward image, the rightward image and the rearward image of the other vehicle.

In addition, the communication unit 120 or 710 may receive sub images generated respectively by a plurality of other vehicles. That is, the communication unit 120 or 710 may receive a plurality of different sub images.

In this case, the processor 170 may select some of the sub images based on a predetermined condition or user input. For example, the processor 170 may select a sub image showing an obstacle from among the sub images. The selected sub image may be used in Step S815 that will be described below.

In addition, the processor 170 may receive only a sub image generated by a specific vehicle among a plurality of other vehicles using the communication unit 120 or 710.

For example, the processor 170 may control the communication unit 120 or 710 so as to receive only a sub image generated by another vehicle at the front of the vehicle 1 from among other vehicles at the front and the rear of the vehicle 1.

In another example, the processor 170 may control the communication unit 120 or 710 so as to receive only a sub image generated by another vehicle, which is located at a location corresponding to user input or a predetermined condition (e.g., the state of traffic or weather).

Specifically, the communication unit 120 or 710 may transmit an image request signal to another specific vehicle, and receive a sub image transmitted from the specific vehicle in response to the image request signal under the control of the processor 170.

Meanwhile, the communication unit 120 or 710 may further receive location information of the vehicle 1. Thus, the processor 170 may judge whether a caution zone is present within a predetermined distance from the vehicle 1 based on the location information received by the communication unit 120 or 710. The caution zone may include, for example, a zone in which the driver's caution is required such as, for example, an intersection, an uphill road, a downhill road, a crosswalk, a parking lot, a tunnel, a narrow road, or a curved road. The kinds of caution zones may vary according to user input. In this case, the processor 170 may control the communication unit 120 or 710 so as to transmit an image request signal to another vehicle located in the caution zone. Thereby, the communication unit 120 or 710 may receive a sub image generated by the other vehicle located in the caution zone, and the processor 170 may generate an expanded image using the sub image. This may advantageously provide the driver of the vehicle 1 with an actual image of the caution zone which is invisible to the driver.

Meanwhile, although FIG. 8 illustrates that Step S805 is followed by Step S810, this is given by way of example. Step S805 and Step S810 may be performed simultaneously, or Step S810 may be followed by Step S805.

Subsequently, the processor 170 generates an expanded image using the main image and the sub image (S815). That is, the processor 170 may generate an expanded image, which has a wider visual field of view than the main image, by combining at least a portion of the main image with at least a portion of the sub image.

In this case, the main image and the sub image, included in the expanded image, may have an overlapping portion. For example, an overlapping portion of the main image and the sub image may be present when there is a common range between the image capture range of the cameras 195 to 198 mounted to the vehicle 1 and the image capture range of cameras amounted to the other vehicle.

When the overlapping portion is present in the main image and the sub image, the processor 170 may generate an expanded image by combining the main image and the sub image with each other based on the overlapping portion.

Alternatively, the main image and the sub image, included in the expanded image, may be spaced apart from each other without any overlapping portion. For example, when the other vehicle is located outside the image capture range of the cameras 195 to 198 mounted to the vehicle 1, there is no overlapping portion of the main image and the sub image and, therefore, the resulting expanded image shows the main image and the sub image spaced apart from each other.

In this case, the processor 170 may generate an expanded image by combining the main image and the sub image with each other based on location information of the vehicle 1 and location information of the other vehicle received by the communication unit 120 or 710. In addition, upon combination of the main image and the sub image at which no overlapping portion is present, the processor 170 may generate an expanded image by combining the main image and the sub image with each other based on information regarding the direction of travel of the vehicle 1 and information regarding the direction of travel of the other vehicle. The travel direction information of the vehicle 1 may be acquired by the sensing unit 760 of the vehicle 1, and the travel direction information of the other vehicle may be received by the communication unit 120 or 710.

Meanwhile, the processor 170 may generate an expanded image, either in real time or periodically. When generating an expanded image periodically, the processor 170 may change the period, at which the expanded image is generated, based on the speed of the vehicle 1. For example, when the speed of the vehicle 1 is a first speed, the processor 170 may update the expanded image every 3 seconds. When the speed of the vehicle 1 is a second speed which is faster than the first speed, the processor 170 may update the expanded image every second.

Although there is a limit, in the related art, in that only an image (i.e. a main image) of an area within the image capture range of the cameras 195 to 198 mounted to the vehicle 1 can be provided to the user, the driver assistance apparatus 100 according to the present invention may additionally provide the user with an image (i.e. a sub image) of an area within the image capture range of cameras mounted to the other vehicle. Consequently, both the safety and convenience of the driver occupying the vehicle 1 may be simultaneously improved.

Subsequently, the processor 170 executes at least one of predetermined operations with relation to the vehicle 1 based on the expanded image (S820).

For example, the processor 170 may generate information regarding an obstacle, which is shown only in the sub image among the main image and the sub image included in the expanded image. Here, the obstacle shown only in the sub image may mean an obstacle, which does not fall within the visual field of view of the vehicle 1, but falls within the visual field of view of the other vehicle that provides the sub image. In addition, the obstacle information may include various pieces of information related to the obstacle such as, for example, the position, size, color, shape, kind, and movement of the obstacle.

In another example, the processor 170 may generate a control signal that commands change of at least one of the speed and direction of the vehicle 1 based on the obstacle information. For example, the controller 770 may control the steering drive unit 752, the power source drive unit 751, and the brake drive unit 753 based on a control signal provided by the processor 170. In this way, the risk of accident due to the obstacle may be reduced compared to the case where only the main image is provided.

In still another example, the processor 170 may generate a possible travel route of the vehicle 1 based on the expanded image. Specifically, since the expanded image has a wider visual field of view than the main image, the processor 170 may generate a route which connects the current position of the vehicle 1 to a position outside of the visual field of view of the vehicle 1 based on the positional relationship between the vehicle 1 and the other vehicle included in the expanded image.

In this case, there may be a plurality of possible travel routes of the vehicle 1 generated by the processor 170, and the processor 170 may select at least one of the routes according to user input or a predetermined order of priority. Alternatively, the processor 170 may generate a control signal that commands entry into an autonomous driving mode with regard to the selected route, and output the control signal to the controller 770 of the vehicle 1.

In yet another example, the processor 170 may generate a control signal that commands display of at least one of the expanded image and information regarding the expanded image. That is, the display unit 180 of the driver assistance apparatus 100, the display unit 741 of the vehicle 1, and/or the AVN apparatus 400 may display only the expanded image on a screen, may display only the information regarding the expanded image, or may display both the above, in response to a control signal provided from the processor 170.

At this time, the processor 170 may divide a screen of the display unit 180 of the driver assistance apparatus 100, the display unit 741 of the vehicle 1, and/or the AVN apparatus 400 into a plurality of sub screens, and may display different pieces of information on the respective sub screens. For example, the processor 170 may display the expanded image on any one of the sub screens and display the information regarding the expanded image on another one of the other sub screens.

In addition, the processor 170 may control the display unit 180 of the driver assistance apparatus 100, the display unit 741 of the vehicle 1, and/or the AVN apparatus 400, in order to provide a certain region within the expanded image, which corresponds to the actual position of the obstacle, with prescribed visual effects. For example, the processor 170 may control the display unit 180 such that the region within the expanded image, which corresponds to the actual position of the obstacle, periodically flashes in red.

In addition, the processor 170 may control the display unit 180 of the driver assistance apparatus 100, the display unit 741 of the vehicle 1, and/or the AVN apparatus 400, in order to rotate and display the expanded image by an angle corresponding to user input. As such, the driver may receive help recognizing the environment around the vehicle 1 by rotating the expanded image in the clockwise or counterclockwise direction to match the driver's taste.

In addition, the processor 170 may control the display unit 180 of the driver assistance apparatus 100, the display unit 741 of the vehicle 1, and/or the AVN apparatus 400, in order to differently display the vehicle 1 and the other vehicle in the expanded image. For example, a vehicle image included in the main image may be displayed in red on the display unit 180 and a vehicle image included in the sub image may be displayed in blue on the display unit 180.

The driver assistance apparatus 100 is assumed in the following description made with reference to FIGS. 9A to 22B as having entered the image expansion mode. In addition, the expanded image generated by the driver assistance apparatus 100 that has entered the image expansion mode and information regarding the expanded image are assumed as being displayed on a screen of the AVN apparatus 400.

FIGS. 9A to 9D are views explaining the operation of the driver assistance apparatus 100 according to one embodiment of the present invention.

Figure 9A:
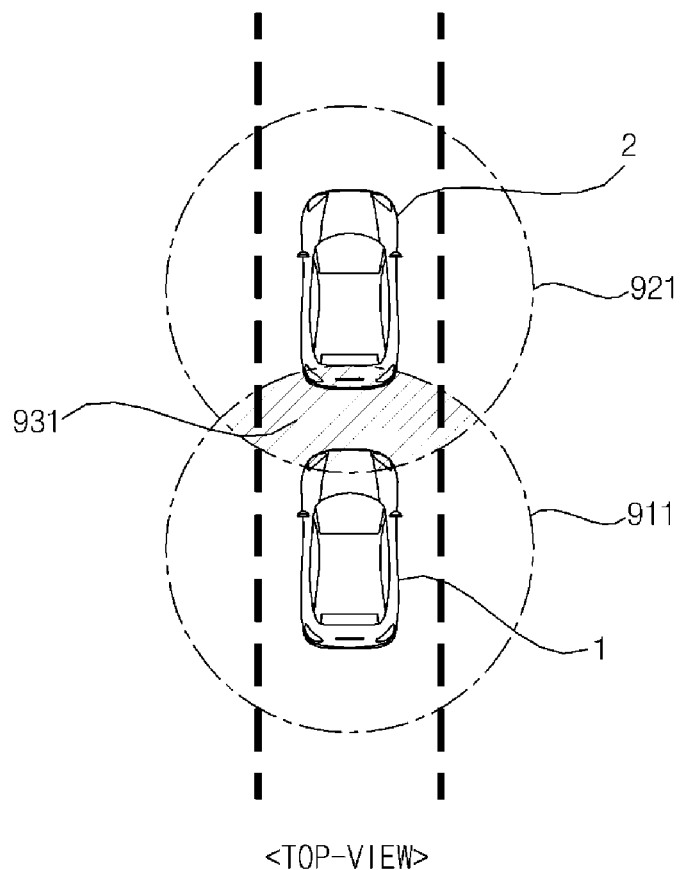
FIGS. 9A to 9D are views explaining the operation of the driver assistance apparatus according to one embodiment of the present invention.

First, FIG. 9A illustrates the top view of the state in which another vehicle 2 is in close proximity in front of the vehicle 1. It is assumed that both the vehicle and the other vehicle 2 are stationary or are traveling at the same speed in the same lane.

In FIG. 9A, the cameras 195 to 198 mounted to the vehicle 1 capture an image of a first range 911 and cameras mounted to the other vehicle 2 capture an image of a second range 921. In this case, as illustrated, there may be an overlapping area 931 where the first range 911 and the second range 921 overlap. That is, the overlapping area 931 means an area that commonly falls within the first range 911 and the second range 921 and is photographed by all of the cameras 195 to 198 mounted to the vehicle 1 and the cameras amounted to the other vehicle 2.

Figure 9B:
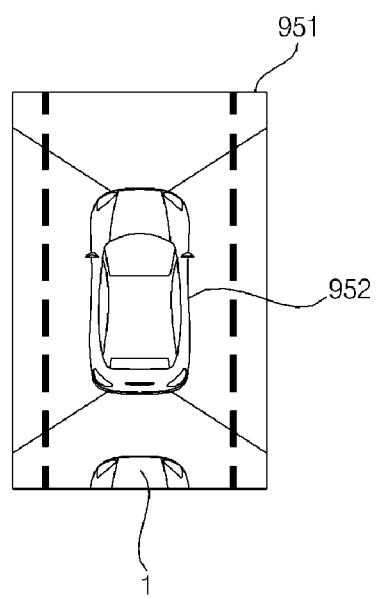

FIG. 9B illustrates a main image 941 corresponding to the first range 911 illustrated in FIG. 9A. The main image 941, as illustrated, is assumed as being an around-view image. The processor 170 may generate the main image 941 based on images of the traveling vehicle 1 (e.g., a forward image, a leftward image, a rightward image, and a rearward image) generated as the cameras 195 to 198 mounted to the vehicle 1 capture an image of the first range 911.

The processor 170 may generate the main image 941 in which an image 942 corresponding to the vehicle 1 is centrally located. The image 942 corresponding to the vehicle 1, for example, may be directly generated by the processor 170, or may be previously stored in the memory 140 of the driver assistance apparatus 100 or the memory 730 of the vehicle 1. In addition, since the overlapping area 931 is located on the front side of the first range 911 as illustrated in FIG. 9A, a rear portion of the vehicle body of the other vehicle 2 may be visible in the front portion of the main image 941.

Figure 9C:
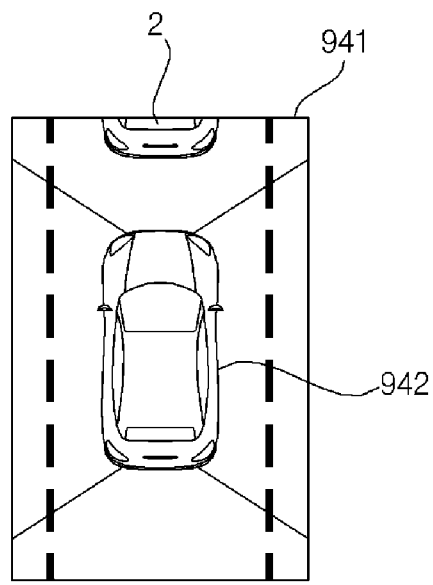

FIG. 9C illustrates a sub image 951 corresponding to the second range 921 illustrated in FIG. 9A. The sub image 951, as illustrated, is assumed as being an around-view image like the main image 941. The other vehicle 2 may generate the sub image 951 based on images of the traveling vehicle 2 (e.g., a forward image, a leftward image, a rightward image, and a rearward image) generated by capturing an image of the second range 921.

In addition, an image 952 corresponding to the other vehicle 2 may be located at the center of the sub image 951. In addition, since the overlapping area 931 is located on the rear side of the second range 921 as illustrated in FIG. 9A, a front portion of the vehicle body of the vehicle 1 may be visible in the rear portion of the sub image 951.

Figure 9D:
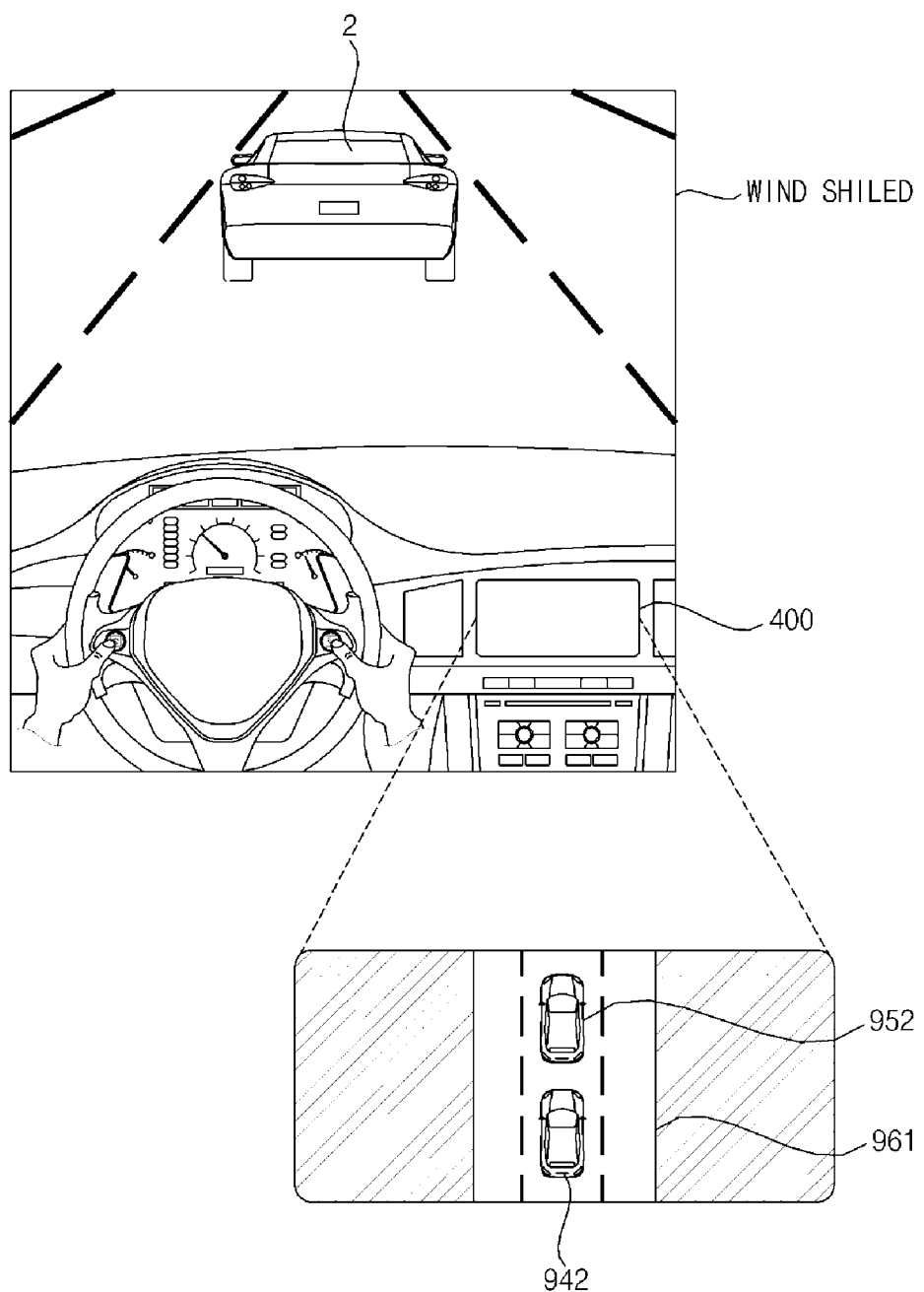

FIG. 9D is a view illustrating the indoor state of the vehicle 1 in the state illustrated in FIG. 9A. Referring to FIG. 9D, the driver of the vehicle 1 may keep his/her eyes on the other vehicle 2, which is located in front thereof, through the windshield.

The processor 170 may generate an expanded image 961 using the main image 941 illustrated in FIG. 9B and the sub image 951 illustrated in FIG. 9C when entering an image expansion mode. For example, the processor 170 may generate the expanded image 961 by composing the main image 941 and the sub image 951 after changing, for example, the direction and size of at least one of the main image 941 and the sub image 951 such that an image portion within the main image 941 corresponding to the overlapping area 931 illustrated in FIG. 9A and an image portion within the sub image 951 corresponding to the overlapping area 931 coincide with each other. That is, the driver assistance apparatus 100 may provide the driver with an image acquired by expanding the range of the main image 941 forward. In this case, the expanded image 961 may be an around-view image that seems to capture images of the vehicle 1 and the other vehicle 2 from above.

In addition, the processor 170 may generate a control signal for the display of the expanded image 961 and transmit the corresponding control signal to at least one of the AVN apparatus 400 equipped in the vehicle 1, the display unit 741 of the vehicle 1, and the display unit 180 of the driver assistance apparatus 100.

In this way, as exemplarily illustrated in FIG. 9D, the AVN apparatus 400 may display the expanded image 961 on a screen based on the control signal provided by the processor 170. Although not illustrated, the display unit 741 of the vehicle 1 and the display unit 180 of the driver assistance apparatus 100 may also display the expanded image 961 on a screen thereof based on the control signal provided by the processor 170. At this time, the processor 170 may control the expanded image 961 so as to be differently displayed on the display unit 741 of the vehicle 1, the display unit 180 of the driver assistance apparatus 100, and the AVN apparatus 400 based on the size and aspect ratio of each screen.

The driver may achieve a visual field of view that is widened forward, compared with the case where only the main image 941 is simply given, by visually checking the state around the vehicle 1 from the expanded image 961 which shows both the main image 941 and the sub image 951.

Meanwhile, the expanded image generated by the processor 170 may provide valuable information regarding blind spot areas of the driver occupying the vehicle 1, which will be described further below in more detail.

FIGS. 10A to 10D are views explaining the operation of the driver assistance apparatus 100 according to one embodiment of the present invention.

Figure 10A:
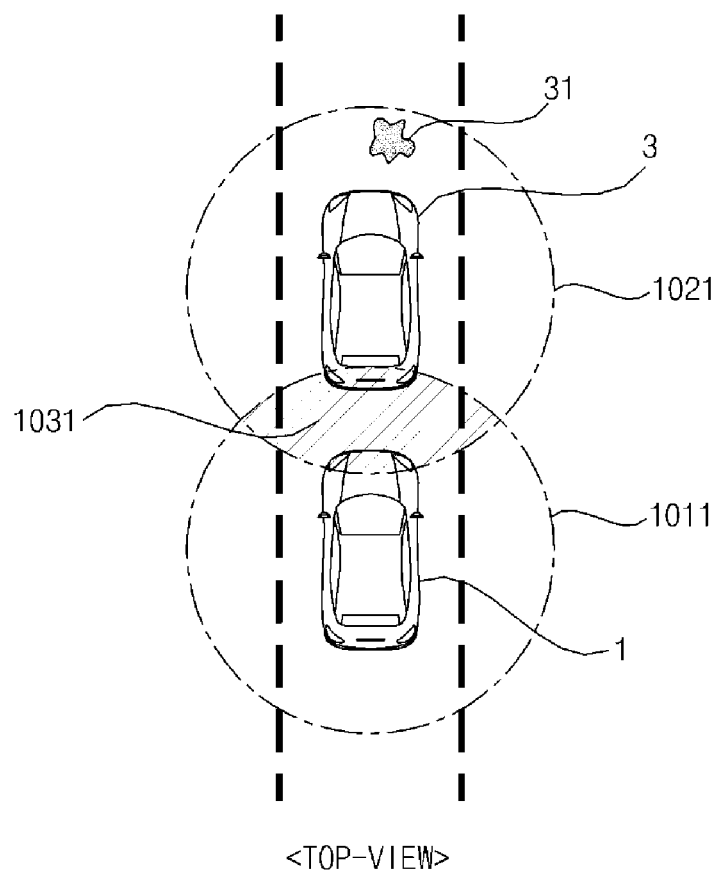
FIGS. 10A to 10D are views explaining the operation of the driver assistance apparatus according to one embodiment of the present invention.

First, FIG. 10A illustrates the top view of the state in which another vehicle 3 is in close proximity in front of the vehicle 1. It is assumed that both the vehicle and the other vehicle 3 are stationary or are traveling at the same speed in the same lane, and that an obstacle 31 is present in front of the other vehicle 3.

In FIG. 10A, the cameras 195 to 198 mounted to the vehicle 1 capture an image of a first range 1011 and cameras mounted to the other vehicle 3 capture an image of a second range 1021. In this case, as illustrated, there may be an overlapping area 1031 where the first range 1011 and the second range 1021 overlap. That is, the overlapping area 1031 may mean an area that commonly falls within the first range 1011 and the second range 1021 and is photographed by all of the cameras 195 to 198 mounted to the vehicle 1 and the cameras amounted to the other vehicle 3.

Figure 10B:
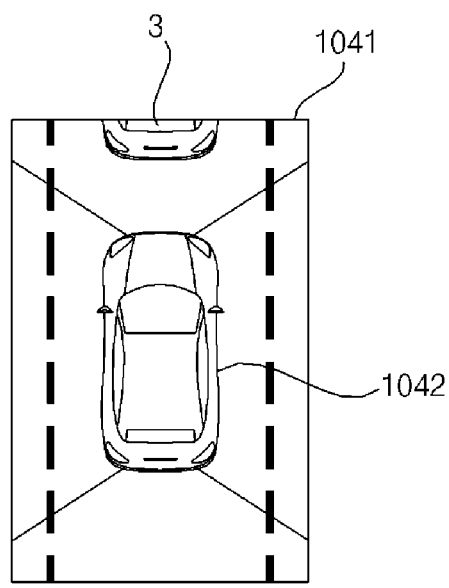

FIG. 10B illustrates a main image 1041 corresponding to the first range 1011 illustrated in FIG. 10A. The main image 1041, as illustrated, is assumed as being an around-view image. The processor 170 may generate the main image 1041 based on images of the traveling vehicle 1 (e.g., a forward image, a leftward image, a rightward image, and a rearward image) generated as the cameras 195 to 198 mounted to the vehicle 1 capture an image of the first range 1011.

The processor 170 may generate the main image 1041 in which an image 1042 corresponding to the vehicle 1 is centrally located. The image 1042 corresponding to the vehicle 1, for example, may be directly generated by the processor 170, or may be previously stored in the memory 140 of the driver assistance apparatus 100 or the memory 730 of the vehicle 1. In addition, since the overlapping area 1031 is located on the front side of the first range 1011 as illustrated in FIG. 10A, a rear portion of the vehicle body of the other vehicle 3 may be visible in the front portion of the main image 1041.

Figure 10C:
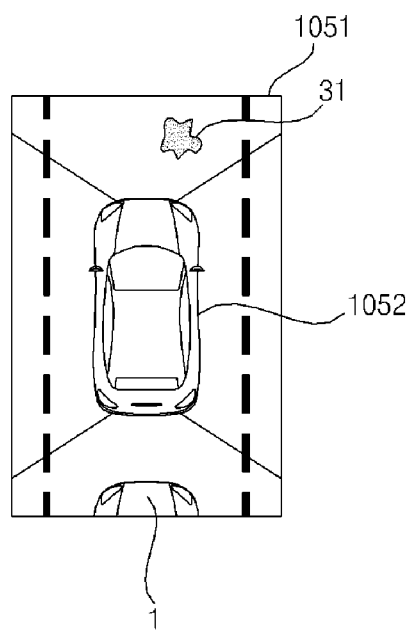

FIG. 10C illustrates a sub image 1051 corresponding to the second range 1021 illustrated in FIG. 10A. The sub image 1051, as illustrated, is assumed as being an around-view image like the main image 1041. The other vehicle 3 may generate the sub image 1051 based on images of the traveling vehicle 3 (e.g., a forward image, a leftward image, a rightward image, and a rearward image) generated by capturing an image of the second range 1021.

In addition, an image 1052 corresponding to the other vehicle 3 may be located at the center of the sub image 1051. In addition, referring again to FIG. 10A, since the overlapping area 1031 is located on the rear side of the second range 1021, a front portion of the vehicle body of the vehicle 1 may be visible in the rear portion of the sub image 1051.

Meanwhile, differently from the state illustrated in FIG. 9A, in FIG. 10A, the obstacle 31 is present in front of the other vehicle 3. The obstacle 31 falls within the second range 1021 that is the image capture range of the other vehicle 3. Thus, the obstacle 31 is shown in the front portion of the sub image 1051 generated by the other vehicle 3.

Figure 10D:
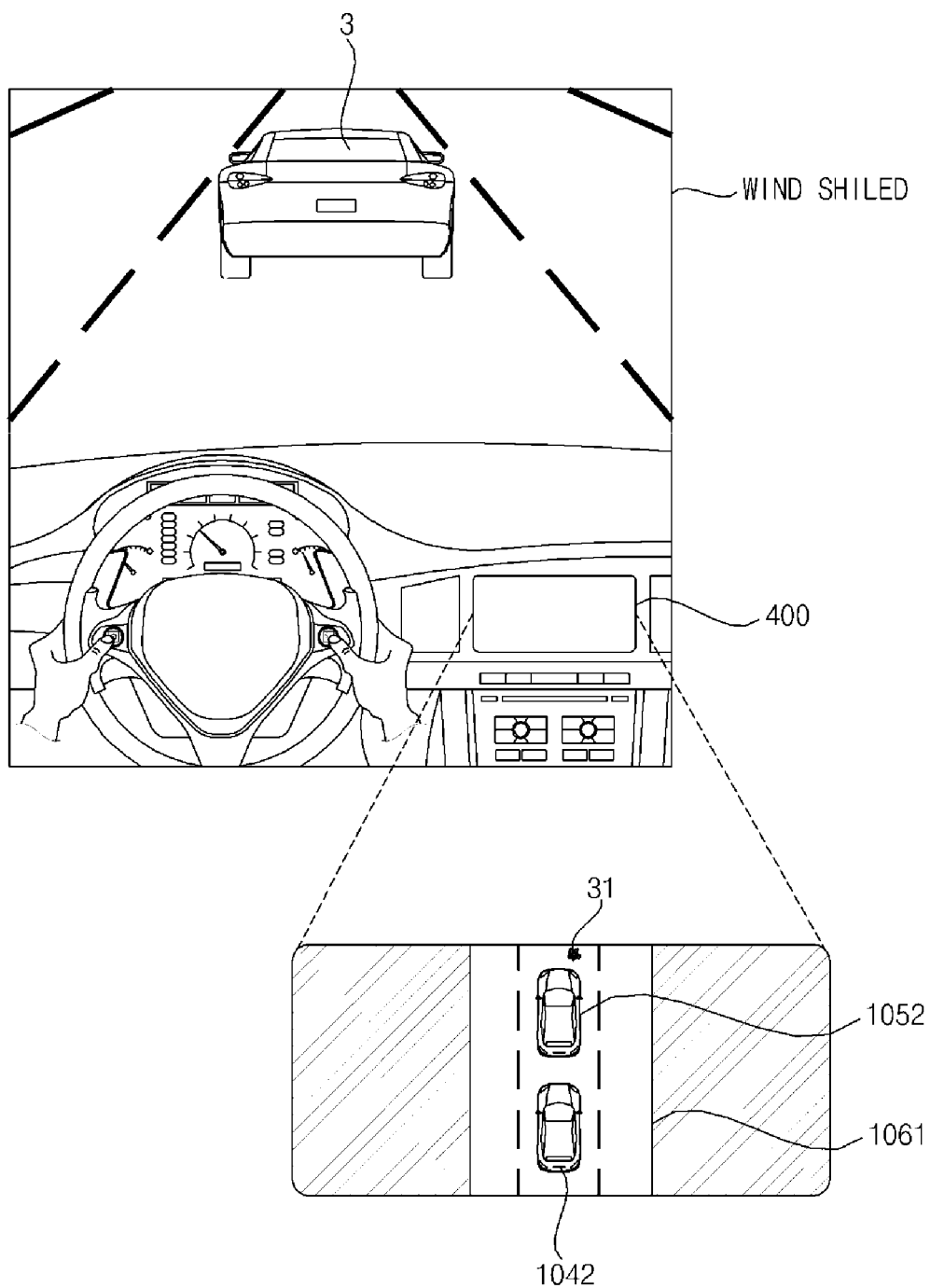

FIG. 10D is a view illustrating the indoor state of the vehicle 1 in the state illustrated in FIG. 10A. Referring to FIG. 10D, the driver of the vehicle 1 may keep his/her eyes on the other vehicle 3, which is located in front thereof, through the windshield. However, since the obstacle 31 is located in front of the other vehicle 3, the driver of the vehicle 1 can view only the other vehicle 3 through the windshield and cannot view the obstacle 31

The processor 170 may generate an expanded image 1061 using the main image 1041 illustrated in FIG. 10B and the sub image 1051 illustrated in FIG. 10C when entering an image expansion mode. For example, the processor 170 may generate the expanded image 1061 by composing the main image 1041 and the sub image 1051 after changing, for example, the direction and size of at least one of the main image 1041 and the sub image 1051 such that an image portion within the main image 1041 corresponding to the overlapping area 1031 illustrated in FIG. 10A and an image portion within the sub image 1051 corresponding to the overlapping area 1031 coincide with each other. That is, the driver assistance apparatus 100 may provide the driver with an image acquired by expanding the range of the main image 1041 forward and rearward. In this case, the expanded image 1061 may be an around-view image that seems to capture images of the vehicle 1 and the other vehicle 3 from above.

In addition, the processor 170 may generate a control signal that commands display of the expanded image 1061 and may transmit the corresponding control signal to at least one of the AVN apparatus 400 equipped in the vehicle 1, the display unit 741 of the vehicle 1, and the display unit 180 of the driver assistance apparatus 100.

In this way, as exemplarily illustrated in FIG. 10D, the AVN apparatus 400 may display the expanded image 1061 on a screen based on the control signal provided by the processor 170. Since the expanded image 1061 includes at least a portion of the sub image 1051 and at least a portion of the main image 1041, the driver of the vehicle 1 can check the obstacle 31, which is present at a location that the driver cannot check when viewing only the main image 1041, from the expanded image 1061 including the sub image 1051. As a result, the driver of the vehicle 1 can, in advance, recognize the obstacle 31, which is hidden by the other vehicle 3 and cannot be checked through the windshield, via the expanded image 1061. In this way, the driver can carefully perform, for example, the speed reduction, braking, and travel direction change of the vehicle 1, which results in a reduction in the risk of accidents.

Although not illustrated, the display unit 741 of the vehicle 1 and the display unit 180 of the driver assistance apparatus 100 may also display the expanded image 1061 on the screen thereof based on the control signal provided by the processor 170. At this time, the processor 170 may control the expanded image 1061 so as to be differently displayed on the display unit 741 of the vehicle 1, the display unit 180 of the driver assistance apparatus 100, and the AVN apparatus 400 based on the size and aspect ratio of each screen.

FIGS. 11A to 11D are views explaining the operation of the driver assistance apparatus 100 according to one embodiment of the present invention.

Figure 11A:
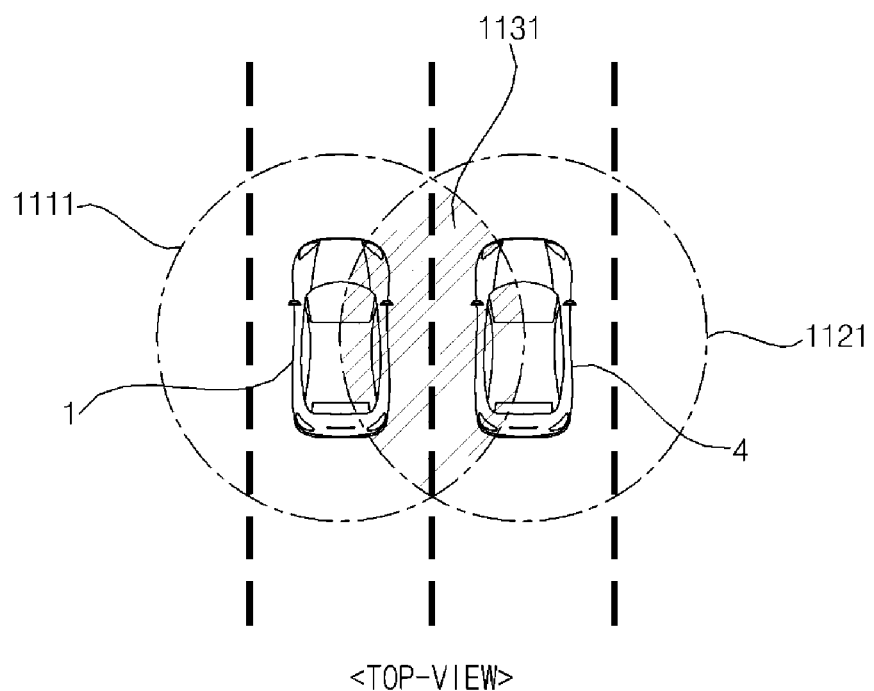
FIGS. 11A to 11D are views explaining the operation of the driver assistance apparatus according to one embodiment of the present invention.

First, FIG. 11A illustrates the top view of the state in which another vehicle 4 is in close proximity at the lateral side of the vehicle 1. For convenience of description, it is assumed that the other vehicle 4 is located at the right side of the vehicle 1, that both the vehicle 1 and the other vehicle are stationary or are traveling at the same speed in two lanes next to each other, and that no object is present in front of the vehicle 1.

In FIG. 11A, the cameras 195 to 198 mounted to the vehicle 1 capture an image of a first range 1111 and cameras mounted to the other vehicle 4 capture an image of a second range 1121. In this case, as illustrated, there may be an overlapping area 1131 where the first range 1111 and the second range 1121 overlap. That is, the overlapping area 1131 may mean an area that commonly falls within the first range 1111 and the second range 1121 and is photographed by all of the cameras 195 to 198 mounted to the vehicle 1 and the cameras amounted to the other vehicle 4.

Figure 11B:
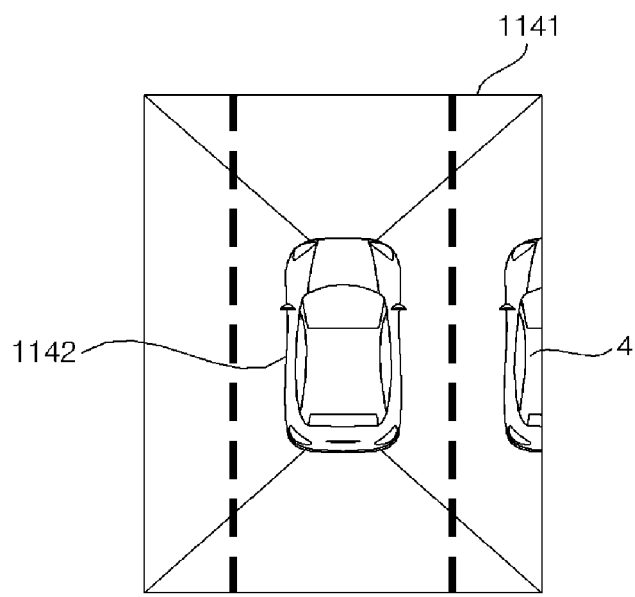

FIG. 11B illustrates a main image 1141 corresponding to the first range 1111 illustrated in FIG. 11A. The main image 1141, as illustrated, is assumed as being an around-view image. The processor 170 may generate the main image 1141 based on images of the traveling vehicle 1 (e.g., a forward image, a leftward image, a rightward image, and a rearward image) generated as the cameras 195 to 198 mounted to the vehicle 1 capture an image of the first range 1111.

The processor 170 may generate the main image 1141 in which an image 1142 corresponding to the vehicle 1 is centrally located. The image 1142 corresponding to the vehicle 1, for example, may be directly generated by the processor 170, or may be previously stored in the memory 140 of the driver assistance apparatus 100 or the memory 730 of the vehicle 1. In addition, since the overlapping area 1131 is located on the right side of the first range 1111 as illustrated in FIG. 11A, a left portion of the vehicle body of the other vehicle 4 may be visible in the right portion of the main image 1141.

Figure 11C:
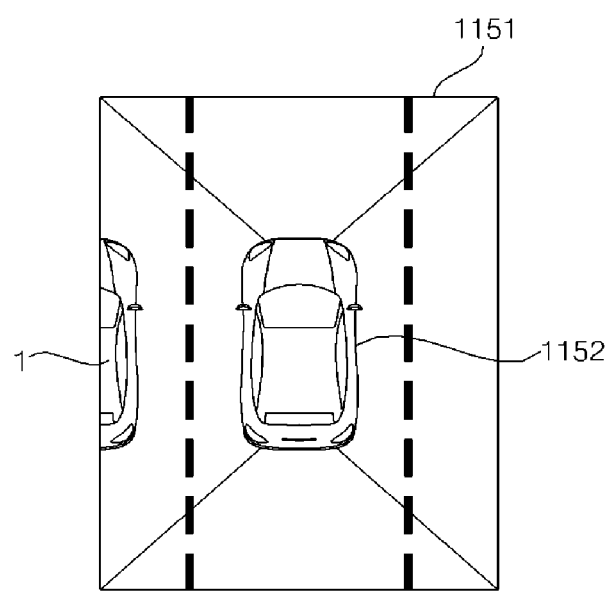

FIG. 11C illustrates a sub image 1151 corresponding to the second range 1121 illustrated in FIG. 11A. The sub image 1151, as illustrated, is assumed as being an around-view image like the main image 1141. The other vehicle 4 may generate the sub image 1151 based on images of the traveling vehicle 4 (e.g., a forward image, a leftward image, a rightward image, and a rearward image) generated by capturing an image of the second range 1121.

In addition, an image 1152 corresponding to the other vehicle 4 may be located at the center of the sub image 1151. In addition, referring again to FIG. 11A, since the overlapping area 1131 is located on the left side of the second range 1121, a right portion of the vehicle body of the vehicle 1 may be visible in the left portion of the sub image 1151.

Figure 11D:
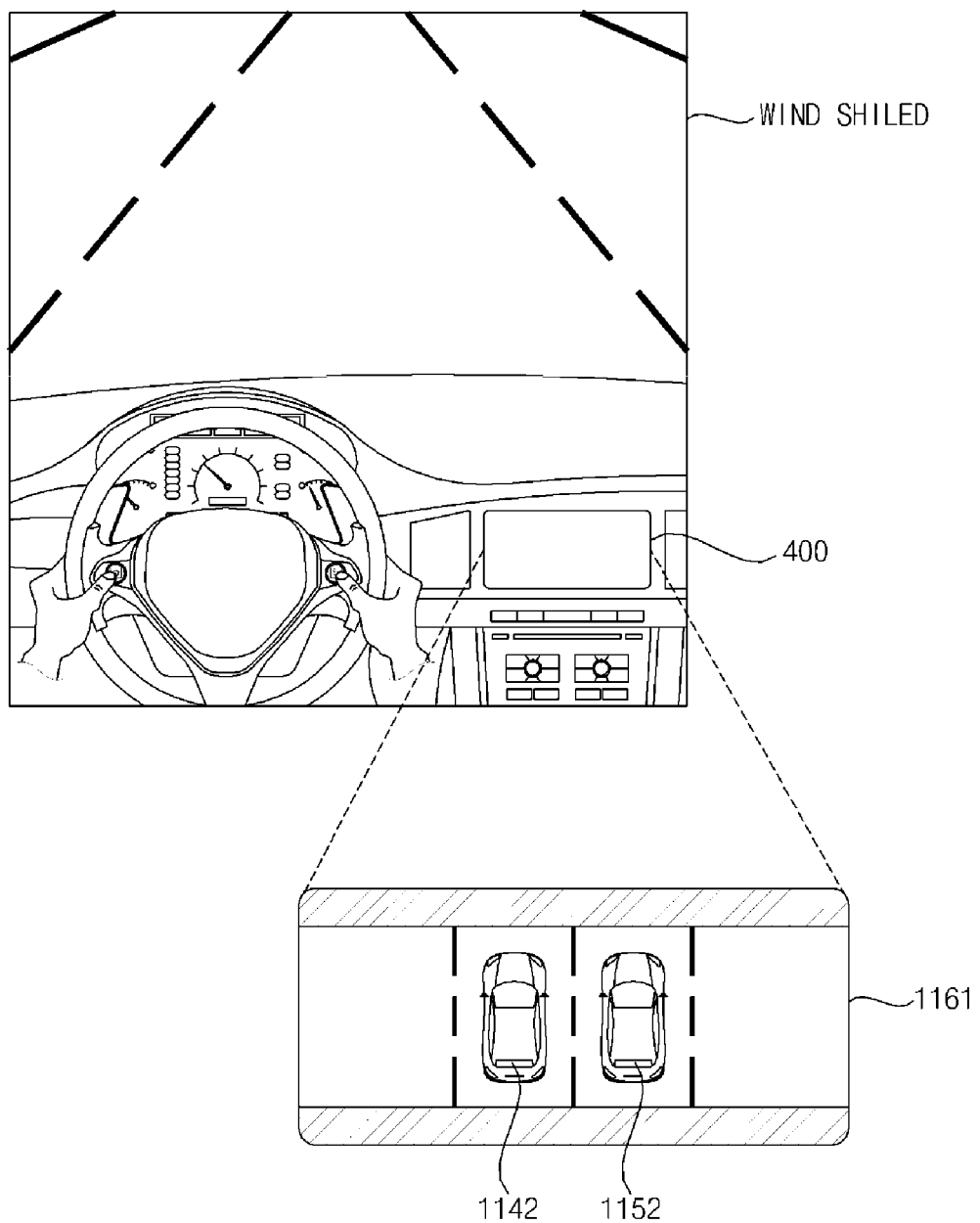

FIG. 11D is a view illustrating the indoor state of the vehicle 1 in the state illustrated in FIG. 11A. Referring to FIG. 11D, the driver of the vehicle 1 may keep his/her eyes on the other vehicle 4, which is located in front thereof, through the windshield. Referring again to FIG. 11A, the other vehicle 4 is located at the right side of the vehicle 1 and, therefore, the driver can check the other vehicle 4 through the windshield of the vehicle 1.

The processor 170 may generate an expanded image 1161 using the main image 1141 illustrated in FIG. 11B and the sub image 1151 illustrated in FIG. 11C when entering an image expansion mode. For example, the processor 170 may generate the expanded image 1161 by composing the main image 1141 and the sub image 1151 after changing, for example, the direction and size of at least one of the main image 1141 and the sub image 1151 such that an image portion within the main image 1141 corresponding to the overlapping area 1131 illustrated in FIG. 11A and an image portion within the sub image 1151 corresponding to the overlapping area 1131 coincide with each other. That is, the driver assistance apparatus 100 may provide the driver with an image acquired by expanding the range of the main image 1141 leftward and rightward. In this case, the expanded image 1161 may be an around-view image that seems to capture images of the vehicle 1 and the other vehicle 4 from above.

In addition, the processor 170 may generate a control signal for the display of the expanded image 1161 and transmit the corresponding control signal to at least one of the AVN apparatus 400 equipped in the vehicle 1, the display unit 741 of the vehicle 1, and the display unit 180 of the driver assistance apparatus 100. In this way, as exemplarily illustrated in FIG. 11D, the AVN apparatus 400 may display the expanded image 1161 on a screen based on the control signal provided by the processor 170. Although not illustrated, the display unit 741 of the vehicle 1 and the display unit 180 of the driver assistance apparatus 100 may also display the expanded image 1161 on a screen thereof based on the control signal provided by the processor 170. At this time, the processor 170 may control the expanded image 1161 so as to be differently displayed on the display unit 741 of the vehicle 1, the display unit 180 of the driver assistance apparatus 100, and the AVN apparatus 400 based on the size and aspect ratio of each screen.

The driver may achieve a visual field of view that is widened rightward, compared with the case where only the main image 1141 is simply given by visually checking the state around the vehicle 1 from the expanded image 1161 that shows both the main image 1141 and the sub image 1151.

Meanwhile, the expanded image generated by the processor 170 may provide valuable information regarding blind spot areas of the driver occupying the vehicle 1, which will be described further below in more detail.

FIGS. 12A to 12D are views explaining the operation of the driver assistance apparatus 100 according to one embodiment of the present invention.

Figure 12A:
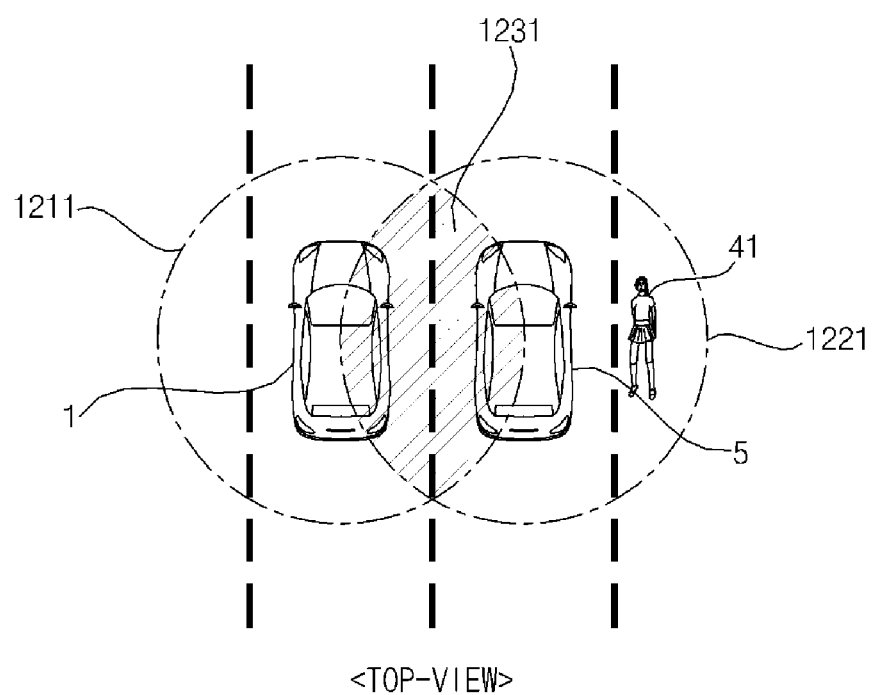
FIGS. 12A to 12D are views explaining the operation of the driver assistance apparatus according to one embodiment of the present invention.

First, FIG. 12A illustrates the top view of the state in which another vehicle 5 is in close proximity at the lateral side of the vehicle 1. For convenience of description, it is assumed that the other vehicle 5 is located at the right side of the vehicle 1, that both the vehicle 1 and the other vehicle 5 are stationary or are traveling at the same speed in two lanes next to each other, and that no object is present in front of the vehicle 1.

Meanwhile, differently from the state illustrated in FIG. 11A, a pedestrian 41 is present at the right side of the other vehicle 5. In this state, the driver of the vehicle 1 has difficulty in checking the pedestrian 41 hidden by the other vehicle 5.

In FIG. 12A, the cameras 195 to 198 mounted to the vehicle 1 capture an image of a first range 1211 and cameras mounted to the other vehicle 5 capture an image of a second range 1221. In this case, as illustrated, there may be an overlapping area 1231 where the first range 1211 and the second range 1221 overlap. That is, the overlapping area 1231 may mean an area that commonly falls within the first range 1211 and the second range 1221 and is photographed by all of the cameras 195 to 198 mounted to the vehicle 1 and the cameras amounted to the other vehicle 5.

Figure 12B:
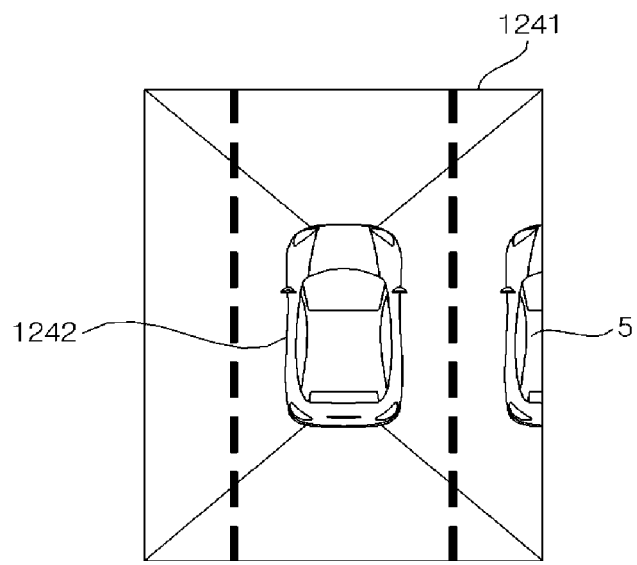

FIG. 12B illustrates a main image 1241 corresponding to the first range 1211 illustrated in FIG. 12A. The main image 1241, as illustrated, is assumed as being an around-view image. The processor 170 may generate the main image 1241 based on images of the traveling vehicle 1 (e.g., a forward image, a leftward image, a rightward image, and a rearward image) generated as the cameras 195 to 198 mounted to the vehicle 1 capture an image of the first range 1211.

The processor 170 may generate the main image 1241 in which an image 1242 corresponding to the vehicle 1 is centrally located. The image 1242 corresponding to the vehicle 1, for example, may be directly generated by the processor 170, or may be previously stored in the memory 140 of the driver assistance apparatus 100 or the memory 730 of the vehicle 1. In addition, since the overlapping area 1231 is located on the right side of the first range 1211 as illustrated in FIG. 12A, a left portion of the vehicle body of the other vehicle 5 may be visible in the right portion of the main image 1241.

Figure 12C:
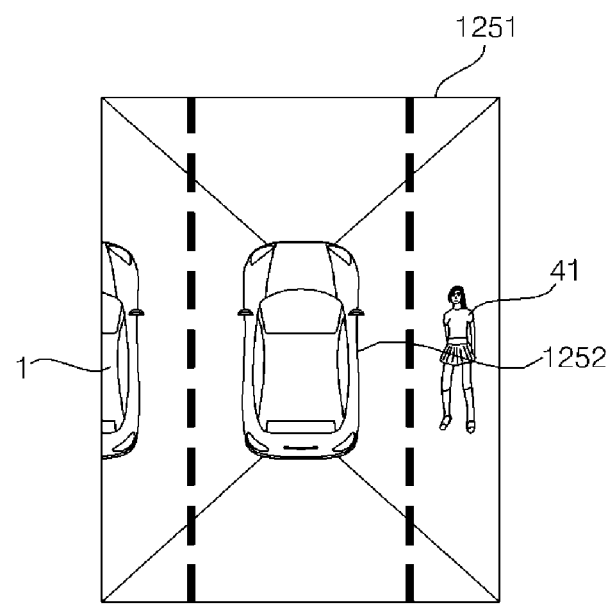

FIG. 12C illustrates a sub image 1251 corresponding to the second range 1221 illustrated in FIG. 12A. The sub image 1251, as illustrated, is assumed as being an around-view image like the main image 1241. The other vehicle 5 may generate the sub image 1251 based on images of the traveling vehicle 5 (e.g., a forward image, a leftward image, a rightward image, and a rearward image) generated by capturing an image of the second range 1221.

In addition, an image 1252 corresponding to the other vehicle 5 may be located at the center of the sub image 1251. In addition, referring again to FIG. 12A, since the overlapping area 1231 is located on the left side of the second range 1221, a right portion of the vehicle body of the vehicle 1 may be visible in the left portion of the sub image 1251.

Meanwhile, differently from the state illustrated in FIG. 11A, in FIG. 12A, the pedestrian 41 is present at the right side of the other vehicle 5 and the pedestrian 41 falls within the second range 1221 that is the image capture range of the other vehicle 5. Thus, the pedestrian 41 is shown in the right portion of the sub image 1251 generated by the other vehicle 5.

Figure 12D:
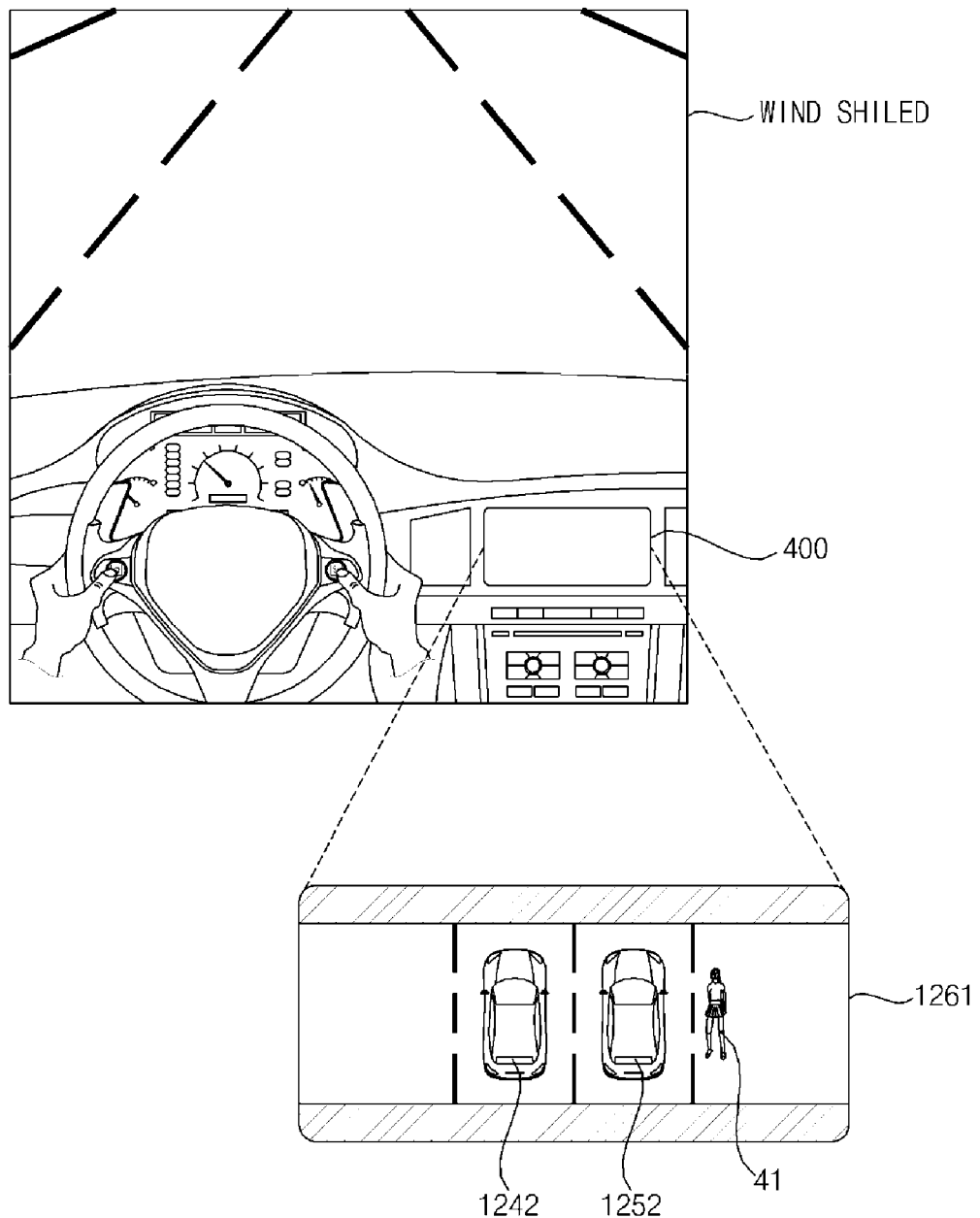

FIG. 12D is a view illustrating the indoor state of the vehicle 1 in the state illustrated in FIG. 12A. Referring to FIG. 12D, the driver of the vehicle 1 has difficulty in checking the pedestrian 41 as well as the other vehicle 5 through the windshield because the pedestrian 41 is located at the right side of the other vehicle 5.

The processor 170 may generate an expanded image 1261 using the main image 1241 illustrated in FIG. 12B and the sub image 1251 illustrated in FIG. 12C when entering an image expansion mode. For example, the processor 170 may generate the expanded image 1261 by composing the main image 1241 and the sub image 1251 after changing, for example, the direction and size of at least one of the main image 1241 and the sub image 1251 such that an image portion within the main image 1241 corresponding to the overlapping area 1231 illustrated in FIG. 12A and an image portion within the sub image 1251 corresponding to the overlapping area 1231 coincide with each other. That is, the driver assistance apparatus 100 may provide the driver with an image acquired by expanding the range of the main image 1241 forward and rearward. In this case, the expanded image 1261 may be an around-view image that seems to capture images of the vehicle 1 and the other vehicle 5 from above.

In addition, the processor 170 may generate a control signal for the display of the expanded image 1261 and transmit the corresponding control signal to at least one of the AVN apparatus 400 equipped in the vehicle 1, the display unit 741 of the vehicle 1, and the display unit 180 of the driver assistance apparatus 100.

In this way, as exemplarily illustrated in FIG. 12D, the AVN apparatus 400 may display the expanded image 1261 on a screen based on the control signal provided by the processor 170. Since the expanded image 1261 includes at least a portion of the sub image 1251 and at least a portion of the main image 1241, the driver of the vehicle 1 can check the pedestrian 41, who is present at a location that the driver cannot check when viewing only the main image 1241, from the expanded image 1261 including the sub image 1251. As a result, the driver of the vehicle 1 can, in advance, recognize the pedestrian 41, who is hidden by the other vehicle 5 and cannot be checked via the main image 1241, via the expanded image 1261. In this way, the driver can carefully perform, for example, the speed reduction, braking, and travel direction change of the vehicle 1, which results in a reduction in the risk of accidents.

Although not illustrated, the display unit 741 of the vehicle 1 and the display unit 180 of the driver assistance apparatus 100 may also display the expanded image 1261 on a screen thereof based on the control signal provided by the processor 170. At this time, the processor 170 may control the expanded image 1261 so as to be differently displayed on the display unit 741 of the vehicle 1, the display unit 180 of the driver assistance apparatus 100, and the AVN apparatus 400 based on the size and aspect ratio of each screen.

Meanwhile, although the above description of FIGS. 9A to 12D has focused on the case where a single vehicle (i.e. another vehicle that generates a sub image having a common portion with a main image of the vehicle 1) is present close to the vehicle 1, the present invention is not limited thereto. That is, the driver assistance apparatus 100 according to one embodiment of the present invention may generate an expanded image in the case where a plurality of vehicles is present close to the vehicle 1. This will be described below in detail.

FIGS. 13A to 13E are views explaining the operation of the driver assistance apparatus 100 according to one embodiment of the present invention.

Figure 13A:
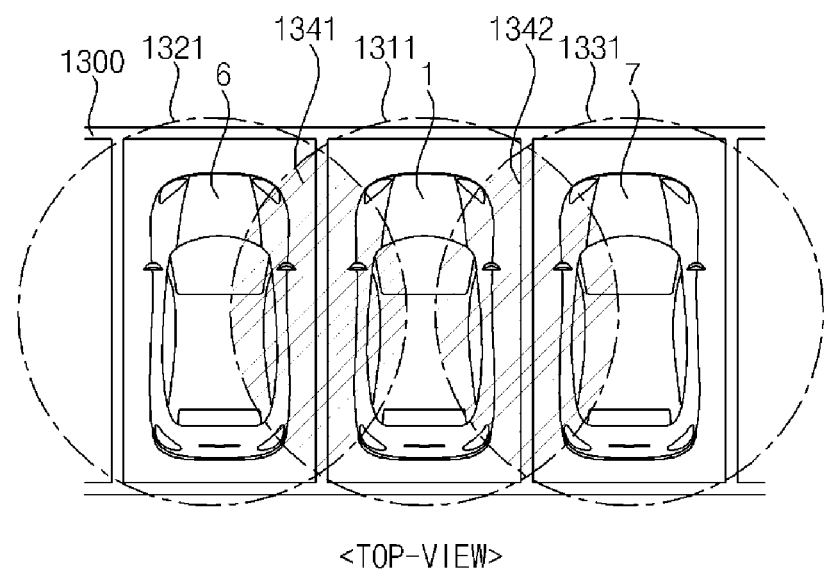
FIGS. 13A to 13E are views explaining the operation of the driver assistance apparatus according to one embodiment of the present invention.

First, FIG. 13A illustrates the top view of a parking lot 1300. As illustrated, it may be assumed that the vehicle 1, another vehicle 6 at the left side of the vehicle 1, and the other vehicle 7 at the right side of the vehicle 1 are located in the parking lot 1300.

In FIG. 13A, the cameras 195 to 198 mounted to the vehicle 1 capture an image of a first range 1311, cameras mounted to the another vehicle 6 capture an image of a second range 1321, and cameras mounted to the other vehicle 7 capture an image of a third range 1331.

In this case, as illustrated, there may be a first overlapping area 1341 of the first range 1311 and the second range 1321. In addition, there may be a second overlapping area 1342 of the first range 1311 and the third range 1331. That is, the first overlapping area 1341 may mean an area that commonly falls within the first range 1311 and the second range 1321 and is photographed by all of the cameras 195 to 198 mounted to the vehicle 1 and the cameras amounted to the another vehicle 6. In addition, the second overlapping area 1342 may mean an area that commonly falls within the first range 1311 and the third range 1331 and is photographed by all of the cameras 195 to 198 mounted to the vehicle 1 and the cameras amounted to the other vehicle 7.

Figure 13B:
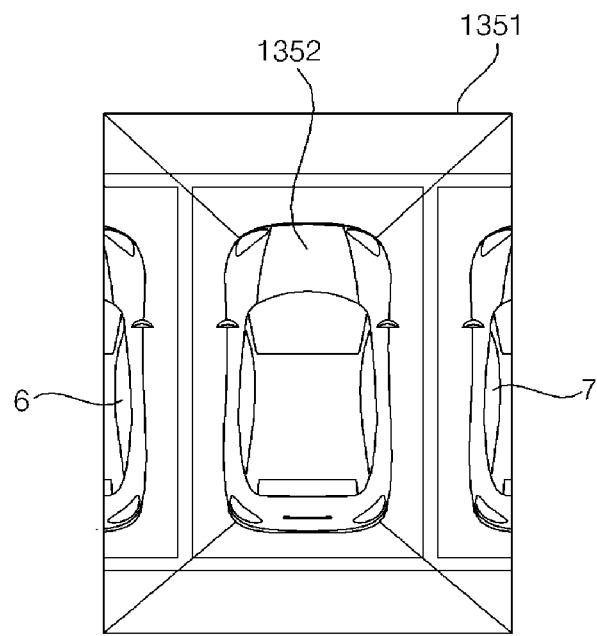

FIG. 13B illustrates a main image 1351 corresponding to the first range 1311 illustrated in FIG. 13A. The main image 1351, as illustrated, is assumed as being an around-view image. The processor 170 may generate the main image 1351 based on images of the traveling vehicle 1 (e.g., a forward image, a leftward image, a rightward image, and a rearward image) generated as the cameras 195 to 198 mounted to the vehicle 1 capture an image of the first range 1311.

The processor 170 may generate the main image 1351 in which an image 1352 corresponding to the vehicle 1 is centrally located. The image 1352 corresponding to the vehicle 1, for example, may be directly generated by the processor 170, or may be previously stored in the memory 140 of the driver assistance apparatus 100 or the memory 730 of the vehicle 1.

In addition, as illustrated in FIG. 13A, the first overlapping area 1341 is located on the left side of the first range 1311. Thus, as illustrated in FIG. 13B, a right portion of the vehicle body of the another vehicle 6 may be visible in the left portion of the main image 1351. In addition, since the second overlapping area 1342 is located on the right side of the first range 1311, a left portion of the vehicle body of the other vehicle 7 may be visible in the right portion of the main image 1351.

Figure 13C:
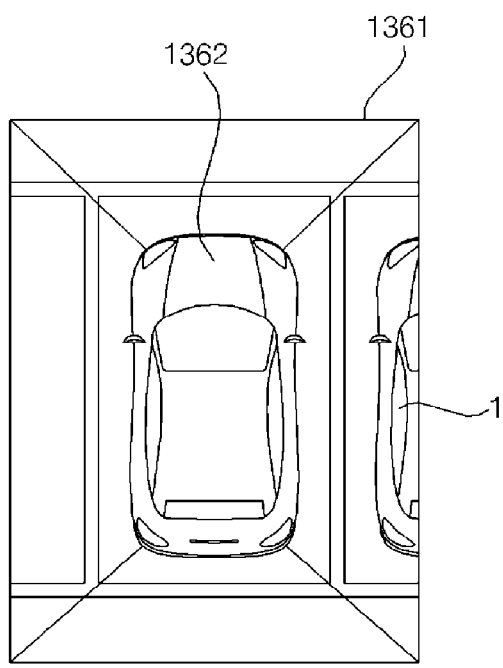

FIG. 13C illustrates a first sub image 1361 corresponding to the second range 1321 illustrated in FIG. 13A. The first sub image 1361, as illustrated, is assumed as being an around-view image like the main image 1351. The another vehicle 6 may generate the first sub image 1361 based on images of the traveling vehicle 6 (e.g., a forward image, a leftward image, a rightward image, and a rearward image) generated by capturing an image of the second range 1321.

In addition, an image 1362 corresponding to the another vehicle 6 may be located at the center of the sub image 1361. In addition, as illustrated in FIG. 13A, since the first overlapping area 1341 is located on the right side of the second range 1321, a left portion of the vehicle body of the vehicle 1 may be visible in the right portion of the first sub image 1361.

Figure 13D:
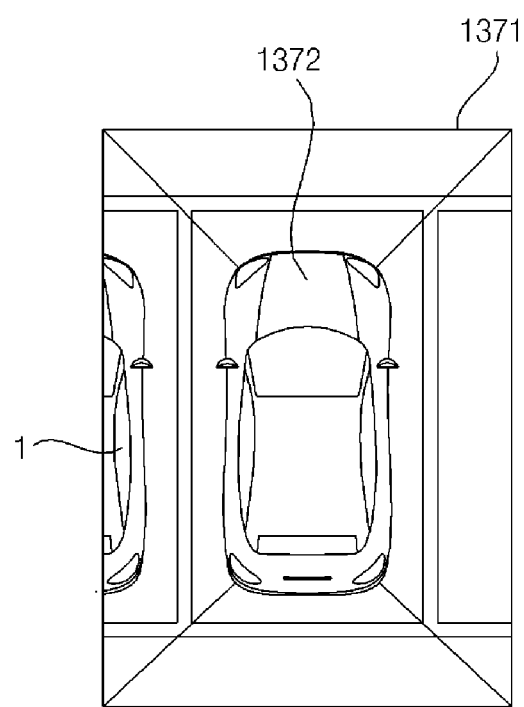

FIG. 13D illustrates a second sub image 1371 corresponding to the third range 1331 illustrated in FIG. 13A. The second sub image 1371, as illustrated, is assumed as being an around-view image like the main image 1351. The other vehicle 7 may generate the second sub image 1371 based on images of the traveling vehicle 7 (e.g., a forward image, a leftward image, a rightward image, and a rearward image) generated by capturing an image of the third range 1331.

In addition, an image 1372 corresponding to the other vehicle 7 may be located at the center of the second sub image 1371. In addition, as illustrated in FIG. 13A, since the second overlapping area 1342 is located on the left side of the third range 1331, a right portion of the vehicle body of the vehicle 1 may be visible in the left portion of the second sub image 1371.

Figure 13E:
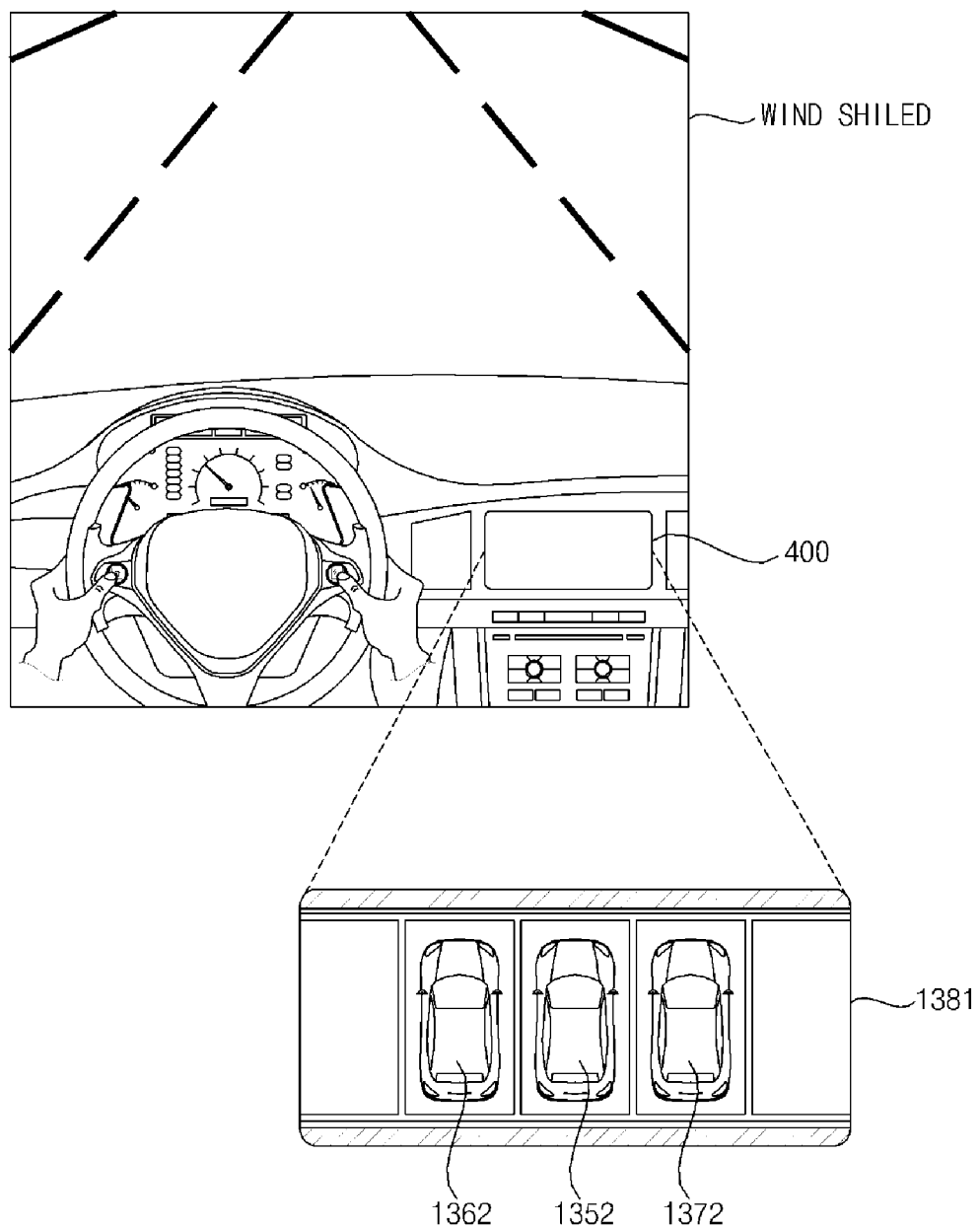

FIG. 13E is a view illustrating the indoor state of the vehicle 1 in the state illustrated in FIG. 13A. The processor 170 may generate an expanded image 1381 using the main image 1351 illustrated in FIG. 13B, the first sub image 1361 illustrated in FIG. 13C, and the second sub image 1371 illustrated in FIG. 13D when entering an image expansion mode.

For example, the processor 170 may compose the main image 1351 and the first sub image 1361 with each other after changing, for example, the direction and size of at least one of the main image 1351 and the first sub image 1361 such that an image portion within the main image 1351 corresponding to the first overlapping area 1341 illustrated in FIG. 13A and an image portion within the first sub image 1361 corresponding to the first overlapping area 1341 coincide with each other. In addition, the processor 170 may combine the main image 1351 and the second sub image 1371 with each other after changing, for example, the direction and size of at least one of the main image 1351 and the second sub image 1371 such that an image portion within the main image 1351 corresponding to the second overlapping area 1342 illustrated in FIG. 13A and an image portion within the second sub image 1371 corresponding to the second overlapping area 1342 coincide with each other.

In one example, assuming that a parking line delimiting the parking lot 1300 has a constant width and the width of a parking line shown in the main image 1351 is two times the width of a parking line shown in the first sub image 1361, the processor 170 may first reduce the size of the main image 1351 to a half, or may double the size of the first sub image 1361 and, thereafter, may combine the main image 1351 and the first sub image 1361 with each other. In addition, the processor 170 may also combine the second sub image 1371 with the main image 1351 with each other in the same manner. In this way, the processor 170 may generate the expanded image 1381 by combining images generated by different vehicles without any sense of discontinuity.

Consequently, the driver assistance apparatus 100 may provide the driver with an expanded image acquired by expanding the range of the main image 1351 leftward and rightward. In this case, the expanded image 1381 may be an around-view image that seems to capture images of the vehicle 1 and the other two vehicles 6 and 7 from above.

In addition, the processor 170 may generate a control signal for the display of the expanded image 1381 and transmit the corresponding control signal to at least one of the AVN apparatus 400 equipped in the vehicle 1, the display unit 741 of the vehicle 1, and the display unit 180 of the driver assistance apparatus 100. In this way, as exemplarily illustrated in FIG. 13E, the AVN apparatus 400 may display the expanded image 1381 on a screen based on the control signal provided by the processor 170. Although not illustrated, the display unit 741 of the vehicle 1 and the display unit 180 of the driver assistance apparatus 100 may also display the expanded image 1381 on a screen thereof based on the control signal provided by the processor 170. At this time, the processor 170 may control the expanded image 1381 so as to be differently displayed on the display unit 741 of the vehicle 1, the display unit 180 of the driver assistance apparatus 100, and the AVN apparatus 400 based on the size and aspect ratio of each screen.

The driver may achieve a visual field of view that is widened leftward and rightward, compared with the case where only the main image 1351 is simply given by visually checking the state around the vehicle 1 from the expanded image 1381 that shows the main image 1351, the first sub image 1361, and the second sub image 1371.

Meanwhile, although the above description of FIGS. 13A to 13E has focused on the case where the two vehicles 6 and 7 are located at the left and right sides of the vehicle 1, this is given by way of example and is not intended to limit the scope of the present invention. For example, an expanded image may be generated using the above-described method even when the two vehicles 6 and 7 are located at the front and rear sides of the vehicle 1. In another example, an expanded image may be generated using the above-described method even when one vehicle 6 is located at the left side of the vehicle 1 and the other vehicle 7 is located at the rear side of the vehicle 1.

Meanwhile, the expanded image generated by the processor 170 may provide valuable information regarding blind spot areas of the driver occupying the vehicle 1, which will be described further below in more detail.

FIGS. 14A to 14E are views explaining the operation of the driver assistance apparatus 100 according to one embodiment of the present invention.

Figure 14A:
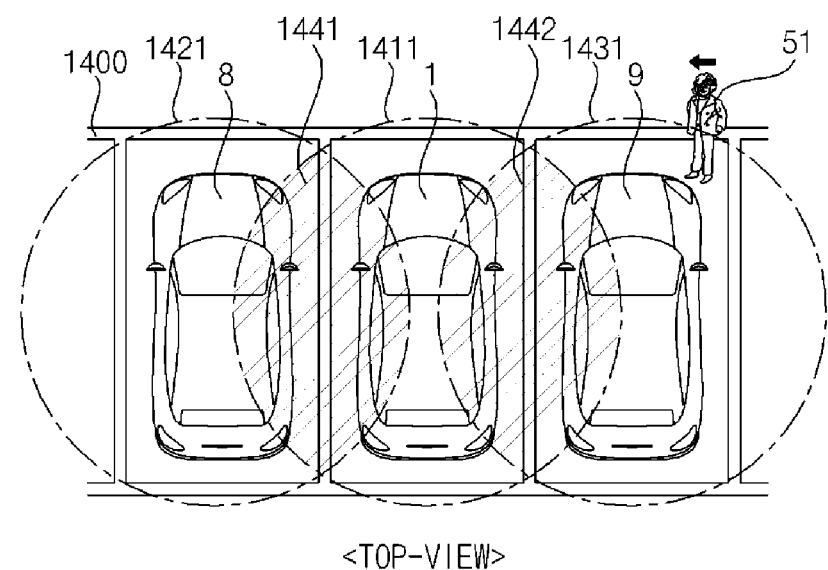
FIGS. 14A to 14E are views explaining the operation of the driver assistance apparatus according to one embodiment of the present invention.

First, FIG. 14A illustrates the top view of a parking lot 1400. As illustrated, it may be assumed that the vehicle 1, another vehicle 8 at the left side of the vehicle 1, and the other vehicle 9 at the right side of the vehicle 1 are located in the parking lot 1400. Comparing FIG. 14A with FIG. 13A, there is a difference in that a pedestrian 51 who is near the other vehicle 9 is moving toward the vehicle 1.

In FIG. 14A, the cameras 195 to 198 mounted to the vehicle 1 capture an image of a first range 1411, cameras mounted to the another vehicle 8 capture an image of a second range 1421, and cameras mounted to the other vehicle 9 capture an image of a third range 1431.

In this case, as illustrated, there may be a first overlapping area 1441 of the first range 1411 and the second range 1421. In addition, there may be a second overlapping area 1442 of the first range 1411 and the third range 1431. That is, the first overlapping area 1441 may mean an area that commonly falls within the first range 1411 and the second range 1421 and is photographed by all of the cameras 195 to 198 mounted to the vehicle 1 and the cameras amounted to the another vehicle 8. In addition, the second overlapping area 1442 may mean an area that commonly falls within the first range 1411 and the third range 1431 and is photographed by all of the cameras 195 to 198 mounted to the vehicle 1 and the cameras amounted to the other vehicle 9.

Figure 14B:
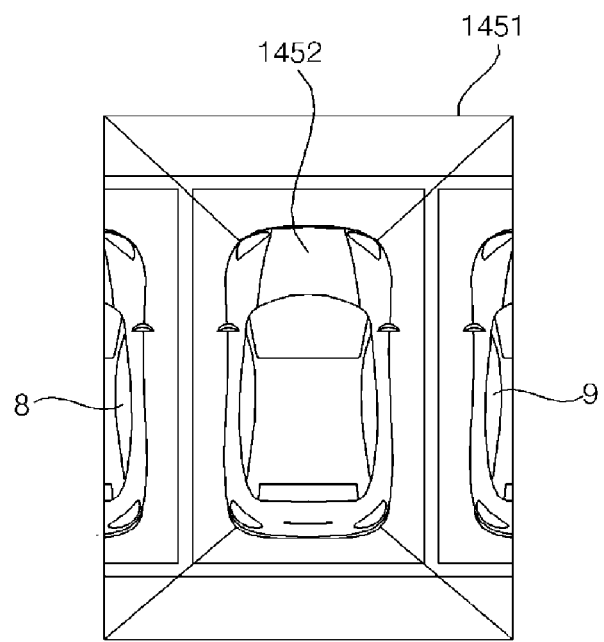

FIG. 14B illustrates a main image 1451 corresponding to the first range 1411 illustrated in FIG. 14A. The main image 1451, as illustrated, is assumed as being an around-view image. The processor 170 may generate the main image 1451 based on images of the traveling vehicle 1 (e.g., a forward image, a leftward image, a rightward image, and a rearward image) generated as the cameras 195 to 198 mounted to the vehicle 1 capture an image of the first range 1411.

The processor 170 may generate the main image 1451 in which an image 1452 corresponding to the vehicle 1 is centrally located. The image 1452 corresponding to the vehicle 1, for example, may be directly generated by the processor 170, or may be previously stored in the memory 140 of the driver assistance apparatus 100 or the memory 730 of the vehicle 1.

In addition, as illustrated in FIG. 14A, the first overlapping area 1441 is located on the left side of the first range 1411. Thus, as illustrated in FIG. 14B, a right portion of the vehicle body of the another vehicle 8 may be visible in the left portion of the main image 1451. In addition, since the second overlapping area 1442 is located on the right side of the first range 1411, a left portion of the vehicle body of the other vehicle 9 may be visible in the right portion of the main image 1451.

However, the pedestrian 51 is not shown in the main image 1451 and is hidden by the other vehicle 9. Thus, when the driver of the vehicle 1 attempts to get out the parking lot 1400 by depending on only the main image 1451, there is the risk of collision with the pedestrian 51 who is moving toward the vehicle 1.

Figure 14C:
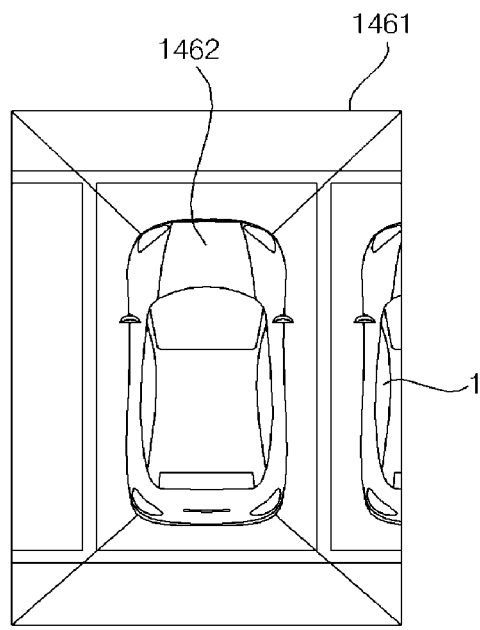

FIG. 14C illustrates a first sub image 1461 corresponding to the second range 1421 illustrated in FIG. 14A. The first sub image 1461, as illustrated, is assumed as being an around-view image like the main image 1451. The another vehicle 8 may generate the first sub image 1461 based on images of the traveling vehicle 8 (e.g., a forward image, a leftward image, a rightward image, and a rearward image) generated by capturing an image of the second range 1421.

In addition, an image 1462 corresponding to the another vehicle 8 may be located at the center of the first sub image 1461. In addition, as illustrated in FIG. 14A, since the first overlapping area 1441 is located on the right side of the second range 1421, a left portion of the vehicle body of the vehicle 1 may be visible in the right portion of the first sub image 1461.

Figure 14D:
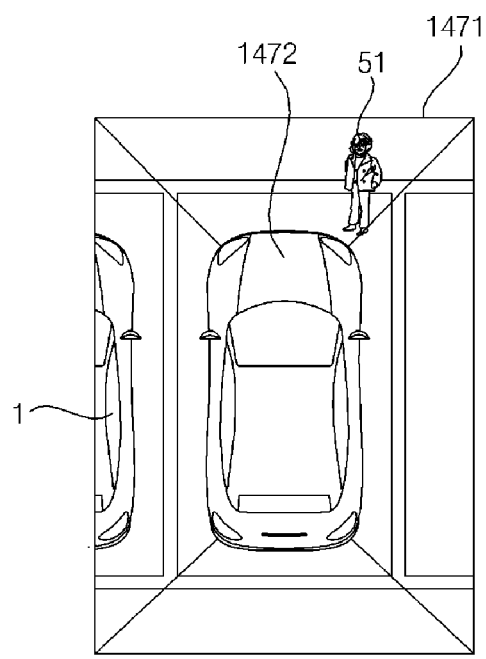

FIG. 14D illustrates a second sub image 1471 corresponding to the third range 1431 illustrated in FIG. 14A. The second sub image 1471, as illustrated, is assumed as being an around-view image like the main image 1451. The other vehicle 9 may generate the second sub image 1471 based on images of the traveling vehicle 9 (e.g., a forward image, a leftward image, a rightward image, and a rearward image) generated by capturing an image of the third range 1431.

In addition, an image 1472 corresponding to the other vehicle 9 may be located at the center of the second sub image 1471. In addition, as illustrated in FIG. 14A, since the second overlapping area 1442 is located on the left side of the third range 1431, a right portion of the vehicle body of the vehicle 1 may be visible in the left portion of the second sub image 1471.

Figure 14E:
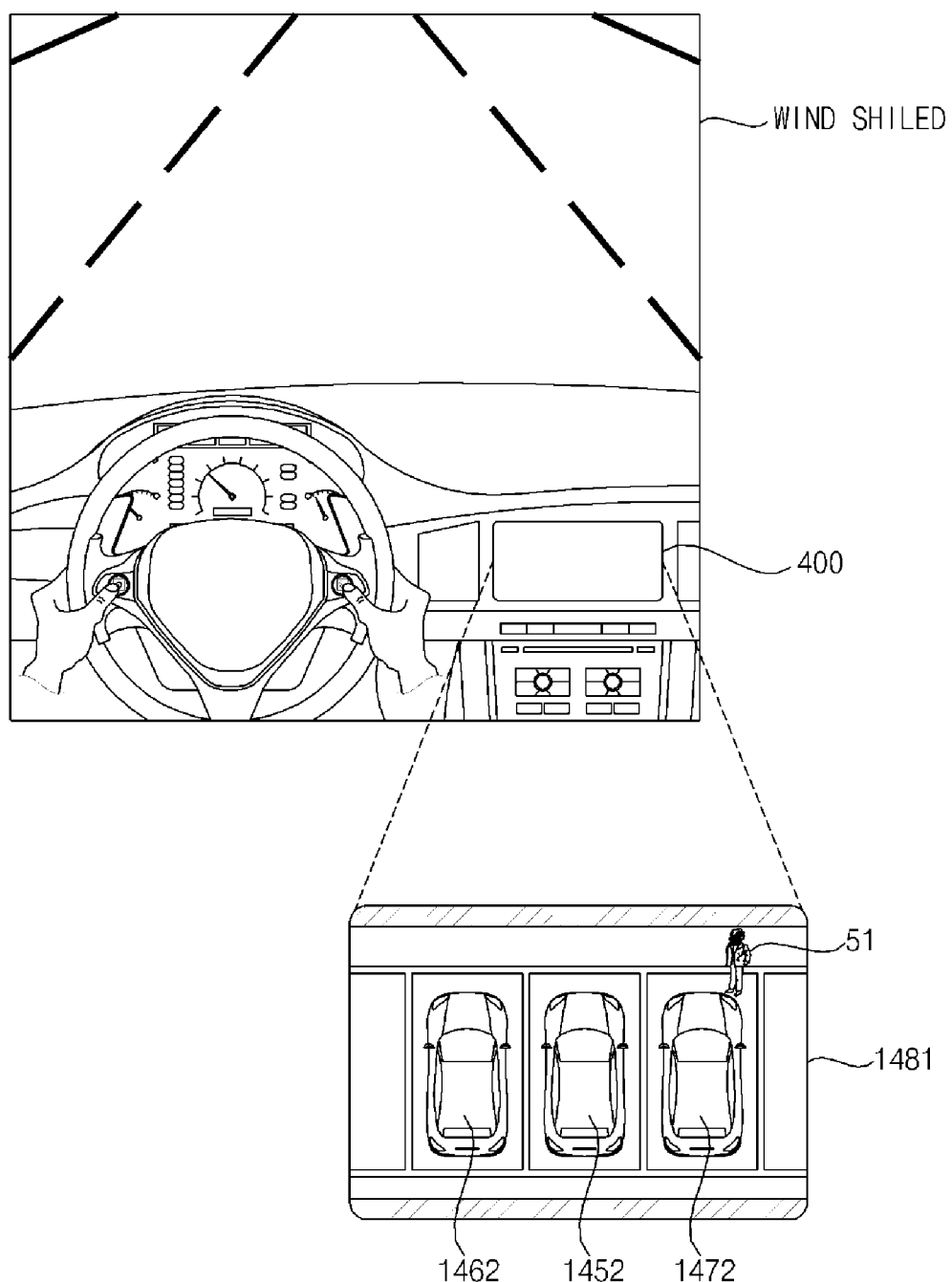

FIG. 14E is a view illustrating the indoor state of the vehicle 1 in the state illustrated in FIG. 14A. The processor 170 may generate an expanded image 1381 using the main image 1451 illustrated in FIG. 14B, the first sub image 1461 illustrated in FIG. 14C, and the second sub image 1471 illustrated in FIG. 14D when entering an image expansion mode.

For example, the processor 170 may compose the main image 1451 and the first sub image 1461 with each other after changing, for example, the direction and size of at least one of the main image 1451 and the first sub image 1461 such that an image portion within the main image 1451 corresponding to the first overlapping area 1441 illustrated in FIG. 14A and an image portion within the first sub image 1461 corresponding to the first overlapping area 1441 coincide with each other. In addition, the processor 170 may compose the main image 1451 and the second sub image 1471 with each other after changing, for example, the direction and size of at least one of the main image 1451 and the second sub image 1471 such that an image portion within the main image 1451 corresponding to the second overlapping area 1442 illustrated in FIG. 14A and an image portion within the second sub image 1471 corresponding to the second overlapping area 1442 coincide with each other.

In one example, assuming that a parking line delimiting the parking lot 1400 has a constant width and the width of a parking line shown in the main image 1451 is two times the width of a parking line shown in the first sub image 1461, the processor 170 may first reduce the size of the main image 1451 to a half, or may double the size of the first sub image 1461 and, thereafter, may combine the main image 1451 and the first sub image 1461 with each other. In addition, the processor 170 may also combine the second sub image 1471 with the main image 1451 in the same manner. In this way, the processor 170 may generate the expanded image 1481 by combining images generated by different vehicles without any sense of discontinuity.

Consequently, the driver assistance apparatus 100 may provide the driver with an expanded image acquired by expanding the range of the main image 1451 leftward and rightward. In this case, the expanded image 1481 may be an around-view image that seems to capture images of the vehicle 1 and the other two vehicles 8 and 9 from above.

In addition, the processor 170 may generate a control signal for the display of the expanded image 1481 and transmit the corresponding control signal to at least one of the AVN apparatus 400 equipped in the vehicle 1, the display unit 741 of the vehicle 1, and the display unit 180 of the driver assistance apparatus 100. In this way, as exemplarily illustrated in FIG. 14E, the AVN apparatus 400 may display the expanded image 1481 on a screen based on the control signal provided by the processor 170.

Although not illustrated, the display unit 741 of the vehicle 1 and the display unit 180 of the driver assistance apparatus 100 may also display the expanded image 1481 on a screen thereof based on the control signal provided by the processor 170. At this time, the processor 170 may control the expanded image 1481 so as to be differently displayed on the display unit 741 of the vehicle 1, the display unit 180 of the driver assistance apparatus 100, and the AVN apparatus 400 based on the size and aspect ratio of each screen.

The driver may achieve a visual field of view that is widened leftward and rightward, compared with the case where only the main image 1451 is simply given by visually checking the state around the vehicle 1 from the expanded image 1481 that shows the main image 1451, the first sub image 1461, and the second sub image 1471. In particular, the driver of the vehicle 1 can recognize, via the expanded image 1481 displayed on, for example, the AVN apparatus 400, an object such as, for example, the pedestrian 51, who is present at a location outside the visual field of view of the driver occupying the vehicle 1 or at a location that is invisible from the main image 1451.

Although the above description of FIGS. 13A to 14E has focused on the case where two vehicles are located close to the vehicle 1, it will be clearly understood by those skilled in the art that the driver assistance apparatus 100 may generate an expanded image in the above-described manner even when three or more vehicles are present close to the vehicle 1.

Meanwhile, the driver assistance apparatus 100 according to one embodiment of the present invention may generate an expanded image using a sub image generated by another vehicle that is not close to the vehicle 1. This will be described below in detail.

Figure 15A:
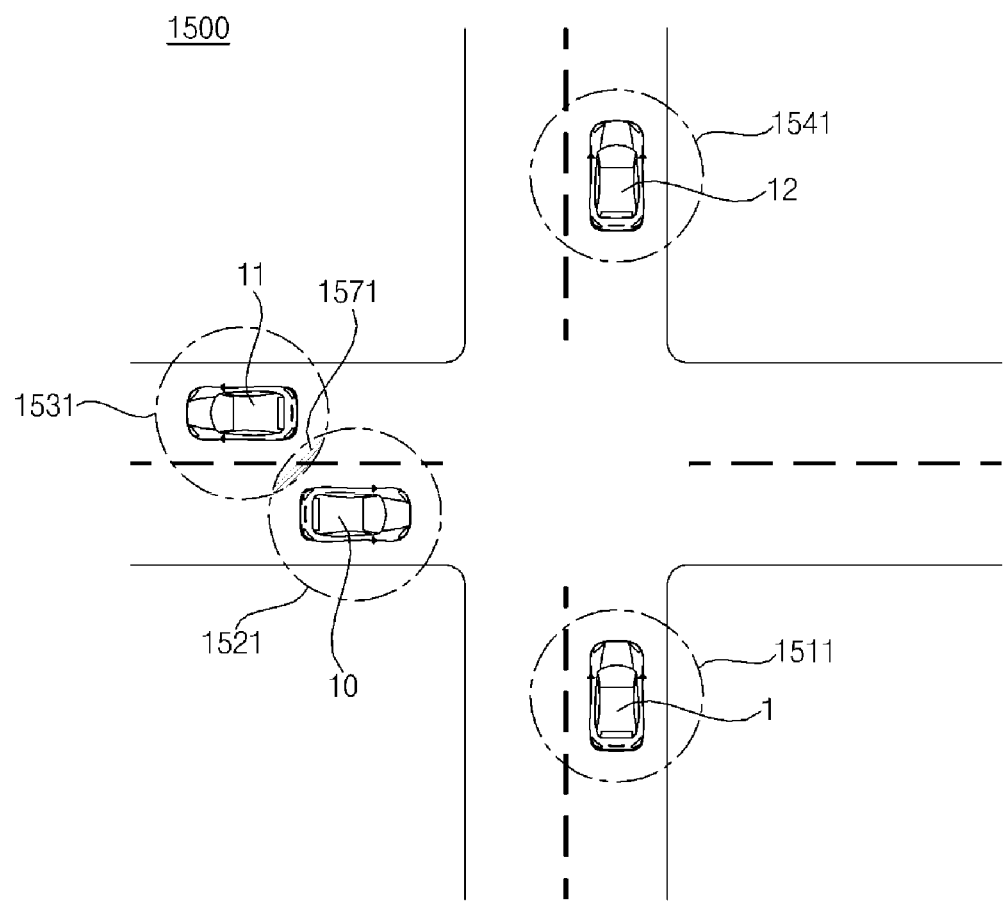
FIGS. 15A to 15C are views explaining the operation of the driver assistance apparatus according to one embodiment of the present invention.
Figure 15B:
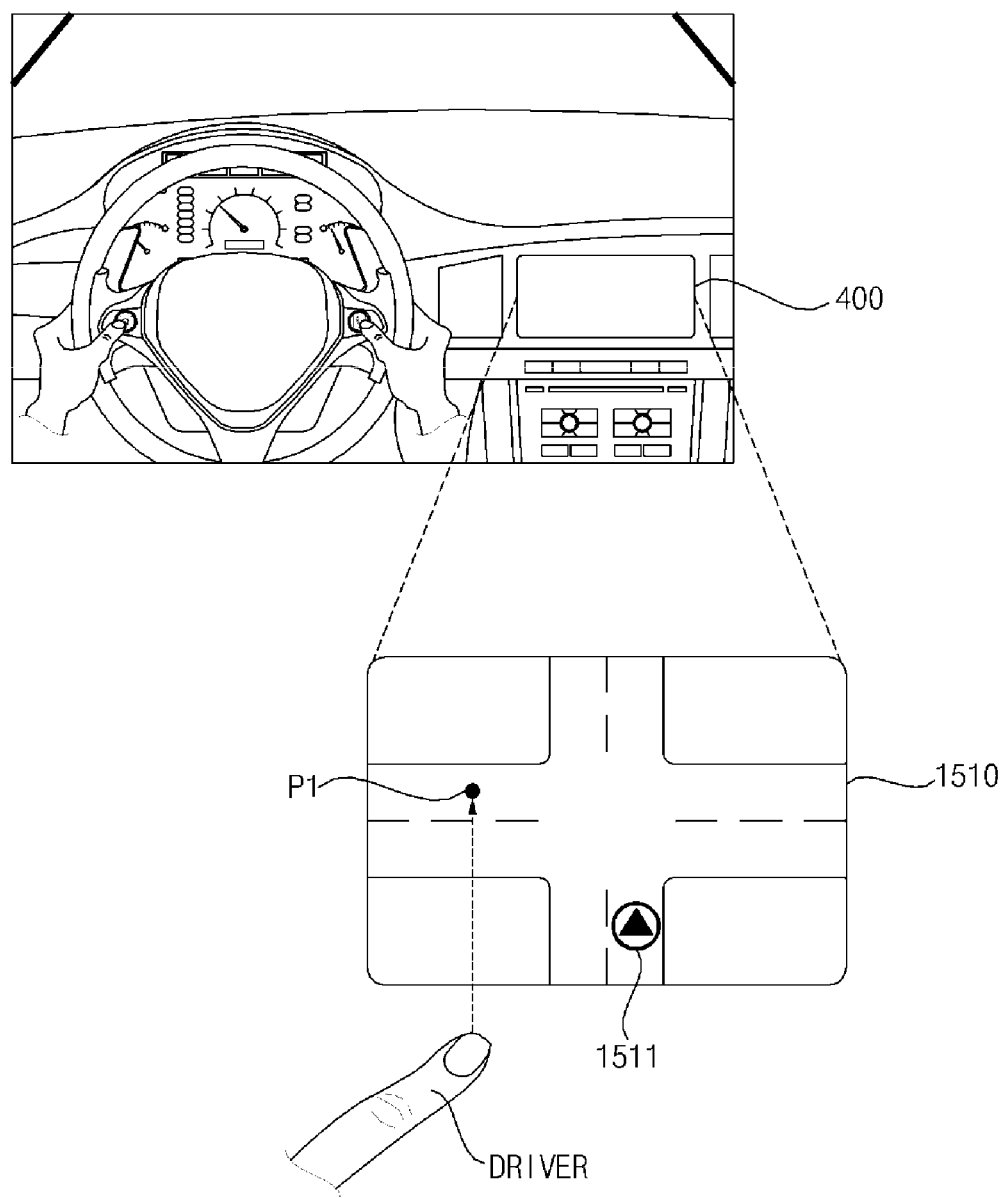
Figure 15C:
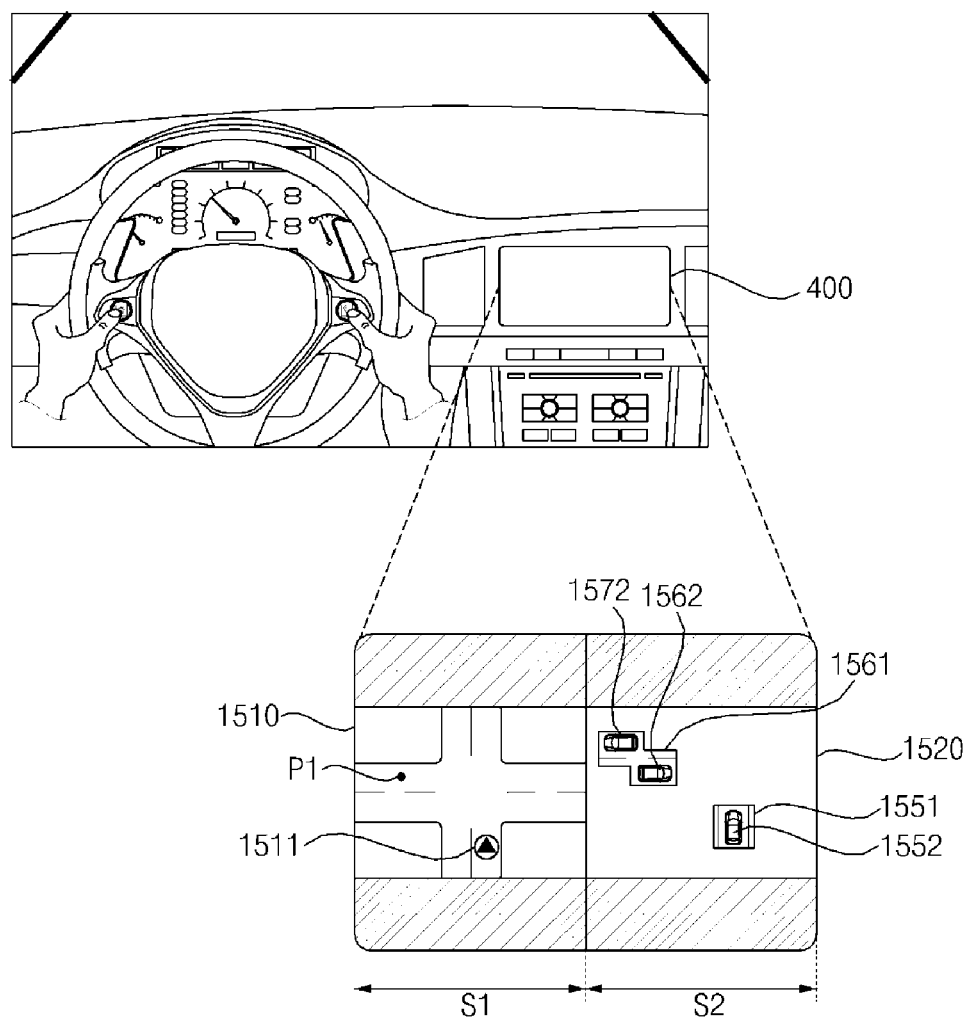

FIGS. 15A to 15C are views explaining the operation of the driver assistance apparatus 100 according to one embodiment of the present invention.

First, FIG. 15A illustrates the top view of an intersection 1500. As illustrated, it may be assumed that the vehicle 1 and three different vehicles 10, 11 and 12 are traveling in the vicinity of the intersection 1500.

In FIG. 15A, the cameras 195 to 198 mounted to the vehicle 1 capture an image of a first range 1511, cameras mounted to another vehicle 10 capture an image of a second range 1521, cameras mounted to still another vehicle 11 capture an image of a third range 1531, and cameras mounted to yet another vehicle 12 capture an image of a fourth range 1541.

In this case, as illustrated, the first range 1511 may have no overlapping area with the second to fourth ranges 1521, 1531 and 1541. On the other hand, the another vehicle 10 and the still another vehicle 11 are close to each other and there may be an overlapping area 1571 where the second range 1521 and the third range 1531 overlap.

FIG. 15B illustrates a screen of the AVN apparatus 400 provided at the vehicle 1 in the state illustrated in FIG. 15A. It is assumed that the screen of the AVN apparatus 400 is provided with a touch sensor to receive touch input of the driver.

A navigation image 1510 may be displayed in a section, corresponding to the current location of the vehicle 1, on the screen of the AVN apparatus 400. For example, the processor 170 may match location information of the vehicle 1, received by the communication unit 120 or 710 of the vehicle 1, with an electronic map stored in the memory 140 of the driver assistance apparatus 100 or the memory 730 of the vehicle 1, thereby providing the AVN apparatus 400 with a control signal to display the navigation image 1510 of the matched map portion. At this time, the navigation image 1510 may display an indicator 1511 which guides the current location of the vehicle 1.

Meanwhile, there is no vehicle close to the vehicle 1 in the intersection 1500 and, therefore, the driver assistance apparatus 100 cannot receive a sub image, which has a common portion with the main image 1551 corresponding to the first range 1511.

In this case, the driver assistance apparatus 100 may select at least one of other vehicles distant from the vehicle 1, i.e. the other vehicles 10, 11 and 12 which capture images of the second to fourth ranges 1521, 1531 and 1541 having no overlapping area with the first range 1511, and then receive a sub image generated by the selected vehicle.

The driver assistance apparatus 100 may select another vehicle which is located at a location distant from the vehicle 1 based on user input.

Referring again to FIG. 15B, the driver may touch a point P1 within the overall region of the navigation image 1510 displayed on the screen of the AVN apparatus 400. At this time, prescribed visual effects may occur on the navigation image 1510 as the point P1 is touched. The processor 170 may check the two other vehicles 10 and 11, which are traveling in an area of the intersection 1500 corresponding to a region including the touched point P1 within the overall region of the navigation image 1510.

For example, the processor 170 may acquire GPS coordinate values within the electronic map, which match with the touched point P1. Subsequently, the processor 170 may transmit an image request signal to the two other vehicles 10 and 11 traveling at the actual location of the intersection 1500 which corresponds to the GPS coordinate values, through the use of the communication unit 120 or 710. In addition, the processor 170 may receive sub images transmitted by the two other vehicles 10 and 11 in response to the image request signal, through the use of the communication unit 120 or 710.

FIG. 15C illustrates the screen of the AVN apparatus 400 displaying an expanded image 1520. The processor 170 may divide the screen of the AVN apparatus 400 into two or more sub screens, and display different pieces of information on a per sub screen basis. As illustrated, the processor 170 may divide the screen of the AVN apparatus 400 into a first sub screen S1 and a second sub screen S2 and generate a control signal to display the navigation image 1510 on the first sub screen S1 and the expanded image 1520 on the second sub screen S2. Although FIG. 15C illustrates only the AVN apparatus 400, it will be clearly understood by those skilled in the art that the display unit 741 of the vehicle 1 and the display unit 180 of the driver assistance apparatus 100 may also undergo screen division into a plurality of sub screens based on a control signal provided by the processor 170.

Meanwhile, since the image capture ranges 1521 and 1531 of the two other vehicles 10 and 11 have the overlapping area 1571, a sub image 1561 included in the expanded image 1520 may show an image 1562 corresponding to the another vehicle 10 and an image 1572 corresponding to the still another vehicle 11.

In addition, the second range 1521 and the third range 1531, which are the image capture ranges of the two other vehicles 10 and 11, have no overlapping area with the first range 1511. Thus, the main image 1551 and the sub image 1561 may be shown in the expanded image 1520 as being separate from each other.

Specifically, the processor 170 may judge the direction of the two other vehicles 10 and 11 relative to the vehicle 1 and the distance from the two other vehicles 10 and 11 to the vehicle 1 based on location information of the vehicle 1 and location information of the two other vehicles 10 and 11. In addition, the processor 170 may generate the expanded image 1520 in which the main image 1551 and the sub image 1561 are spaced apart from each other by a prescribed distance in a prescribed direction based on the judged results.

FIGS. 16A to 16D are views explaining the operation of the driver assistance apparatus 100 according to one embodiment of the present invention.

The driver assistance apparatus 100 according to the present invention may judge whether a caution zone is present within a predetermined distance (e.g., 300 m) from the vehicle 1, and generate an expanded image using a sub image generated by at least one vehicle located in the caution zone.

Specifically, when the communication unit 120 or 710 receives location information of the vehicle 1 (e.g., GPS coordinate values), the processor 170 may judge whether a caution zone is present within a predetermined distance from the vehicle 1 based on corresponding location information and an electronic map stored in the memory 140 or 730. For example, the electronic map may include various pieces of formation related to routes, along which the vehicle 1 can travel, such as, for example, road information (e.g., speed bumps, road width, and traffic signs) and information regarding facilities (e.g., hospitals, country clubs, and parks). As such, the processor 170 may recognize a caution zone within a predetermined distance from the GPS coordinate values of the vehicle 1 among various pieces of information included in the electronic map.

Here, the caution zone may mean a zone where the driver of the vehicle 1 has to pay more attention than during ordinary driving. Examples of caution zones may include an intersection, an uphill road, a downhill road, a crosswalk, a parking lot, a tunnel, a narrow road, a curved road, and a pothole. The processor 170 may change the number, the kind, and the order of priority of caution zones according to user input.

When a plurality of caution zones is present within a prescribed distance from the vehicle 1, the processor 170 may make known only a prescribed number of high-rank caution zones in the order of priority.

In addition, when a plurality of caution zones is present within a prescribed distance from the vehicle 1, under the control of the processor 170, the caution zones may be visually differently displayed on, for example, a navigation system screen based on the order of priority. For example, the highest priority caution zone may be displayed in red, and the lowest priority caution zone may be displayed in blue.

In addition, the processor 170 may automatically enter an image expansion mode when at least one caution zone is present within a prescribed distance from the vehicle 1.

Figure 16A:
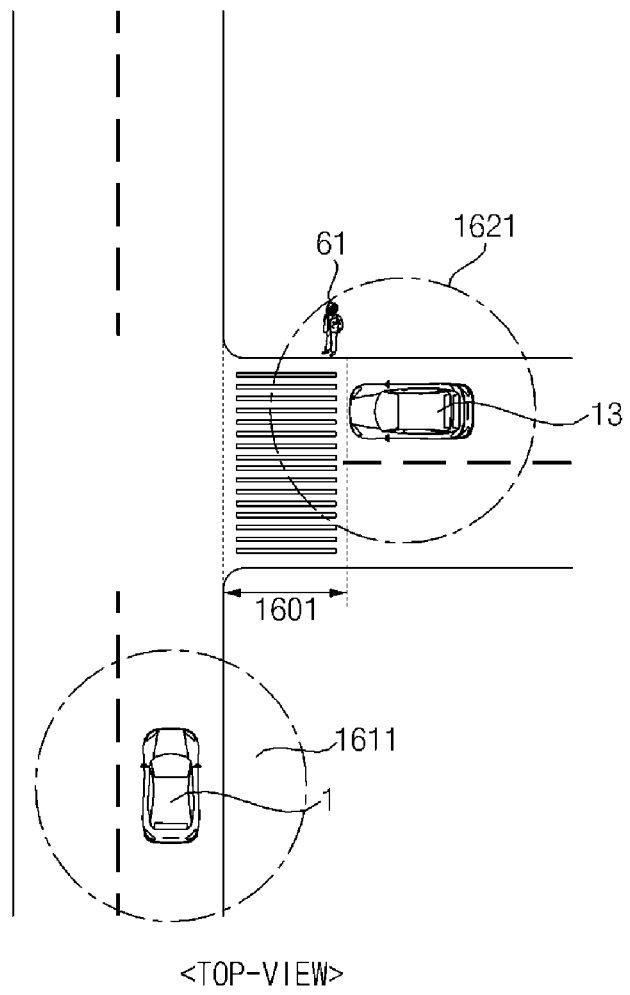
FIGS. 16A to 16D are views explaining the operation of the driver assistance apparatus according to one embodiment of the present invention.

FIG. 16A illustrates one crosswalk 1601 as one exemplary caution zone. The crosswalk 1601 is a road area where a pedestrian crosses. In FIG. 16A, the vehicle 1 may generate a main image corresponding to a first range 1611 and another vehicle 13 may generate a sub image corresponding to a second range 1621.

Since the crosswalk 1601 is not included in the first range 1611, the driver cannot check the real-time state of the crosswalk 1601 only using the main image corresponding to the first range 1611. On the other hand, since the second range 1621 includes at least a portion of the crosswalk 1601 and a pedestrian 61 near the crosswalk 1601, the pedestrian 61 who waits to cross the crosswalk 1601 is shown in the sub image corresponding to the second range 1621.

The processor 170 may generate an expanded image including the main image corresponding to the first range 1611 and the sub image corresponding to the second range 1621, thereby assisting the driver of the vehicle 1 in checking the pedestrian 61 in advance even at a location distant from the crosswalk 1601.

Figure 16B:
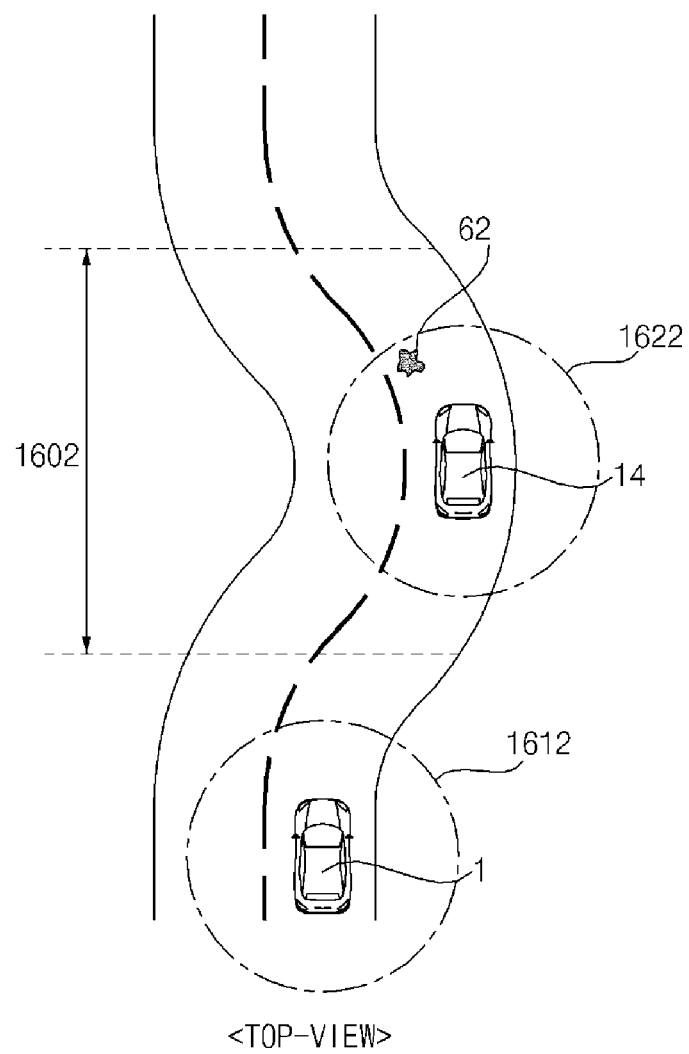

FIG. 16B illustrates a curved road 1602 as another exemplary caution zone. The curved road 1602 may be a road area, the curvature of which is a prescribed value or more. The curved road 1602 may cause blind spots that are invisible to the driver of the vehicle 1 according to the magnitude of curvature. In FIG. 16B, the vehicle 1 may generate a main image corresponding to a first range 1612 and another vehicle 13 may generate a sub image corresponding to a second range 1622.

Since the curved road 1602 is not included in the first range 1612, the driver cannot check the real-time state of the curved road 1602 only using the main image corresponding to the first range 1612. On the other hand, since the second range 1622 includes at least a portion of the curved road 1602 and an obstacle 62 on the curved road 1602, the obstacle 62 which has the possibility of collision with the vehicle 1 is shown in the sub image corresponding to the second range 1622.

The processor 170 may generate an expanded image including the main image corresponding to the first range 1612 and the sub image corresponding to the second range 1622, thereby assisting the driver of the vehicle 1 in checking the obstacle 62 in advance even at a location distant from the curved road 1602.

Figure 16C:
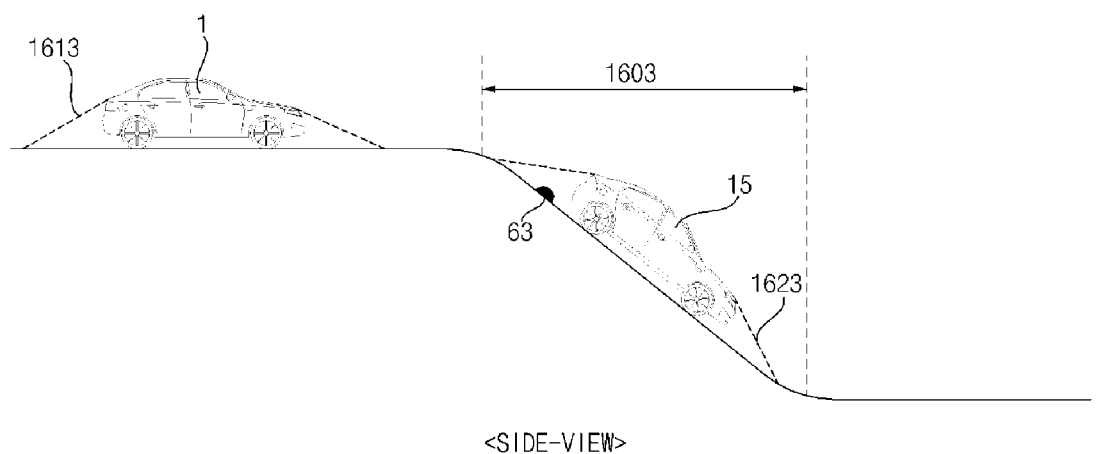

FIG. 16C illustrates a downhill road 1603 as one exemplary caution zone. The downhill road 1603 is a steep road extending from a high altitude to a low altitude. In FIG. 16C, the vehicle 1 may generate a main image corresponding to a first range 1613 and another vehicle 13 may generate a sub image corresponding to a second range 1623.

Since the downhill road 1603 is not included in the first range 1613, the driver cannot check the real-time state of the downhill road 1603 only using the main image corresponding to the first range 1613. On the other hand, since the second range 1623 includes at least a portion of the downhill road 1603 and an obstacle 63 on the downhill road 1603, the obstacle 63 which has the possibility of collision with the vehicle 1 is shown in the sub image corresponding to the second range 1623.

The processor 170 may generate an expanded image including the main image corresponding to the first range 1613 and the sub image corresponding to the second range 1623, thereby assisting the driver of the vehicle 1 in checking the obstacle 63 in advance even at a location distant from the downhill road 1603.

Figure 16D:
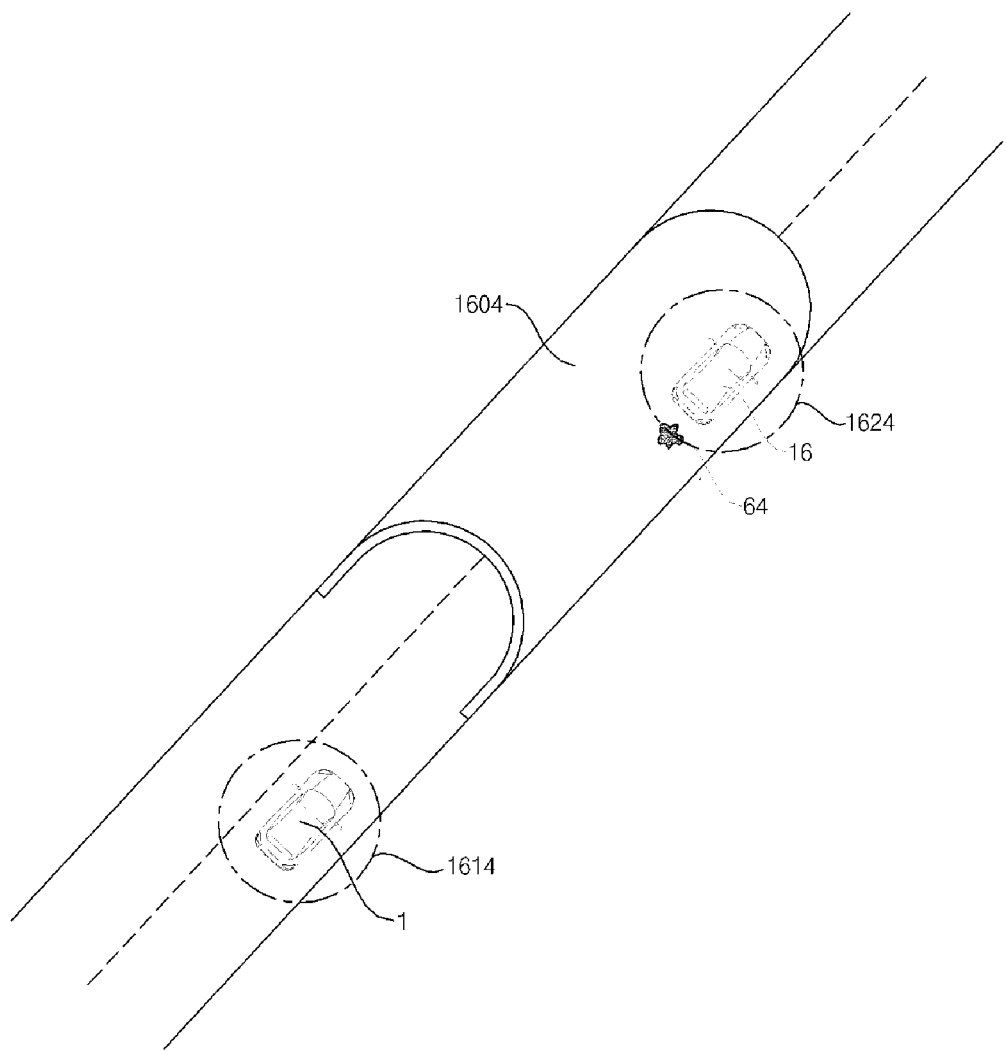

FIG. 16D illustrates a tunnel 1604 as one exemplary caution zone. In FIG. 16D, the vehicle 1 may generate a main image corresponding to a first range 1614 and another vehicle may generate a sub image corresponding to a second range 1624.

Since the tunnel 1604 is not included in the first range 1614, the driver cannot check the real-time state of the tunnel 1604 via only the main image corresponding to the first range 1614. On the other hand, since the second range 1624 includes at least a portion of the tunnel 1604 and a pothole 64 present in the tunnel 1604, the pothole 64 which may impair the vehicle 1 is shown in the sub image corresponding to the second range 1624.

The processor 170 may generate an expanded image including the main image corresponding to the first range 1614 and the sub image corresponding to the second range 1624, thereby assisting the driver of the vehicle 1 in checking the pothole 64 in advance even at a location distant from the tunnel 1604.

Figure 17A:
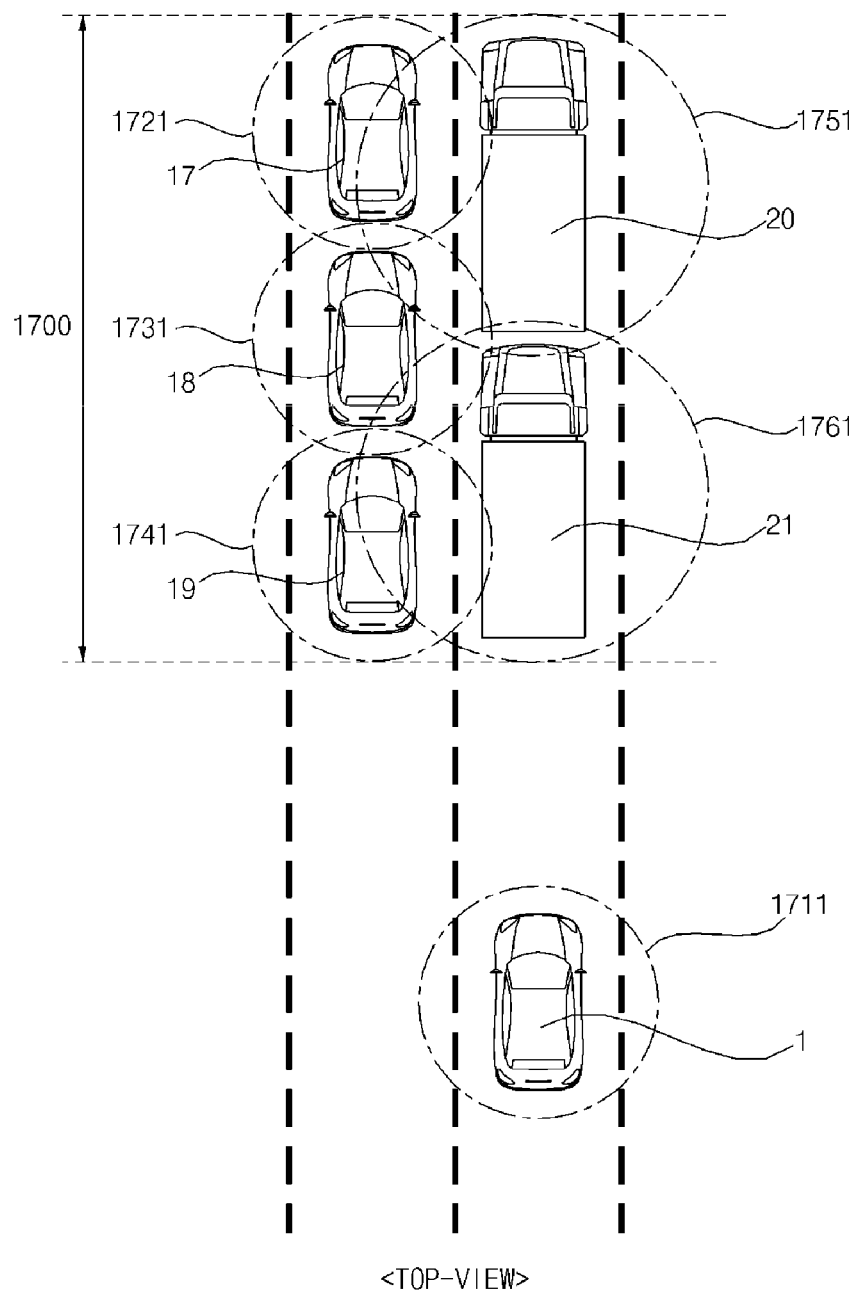
FIGS. 17A and 17B are views explaining the operation of the driver assistance apparatus according to one embodiment of the present invention.
Figure 17B:
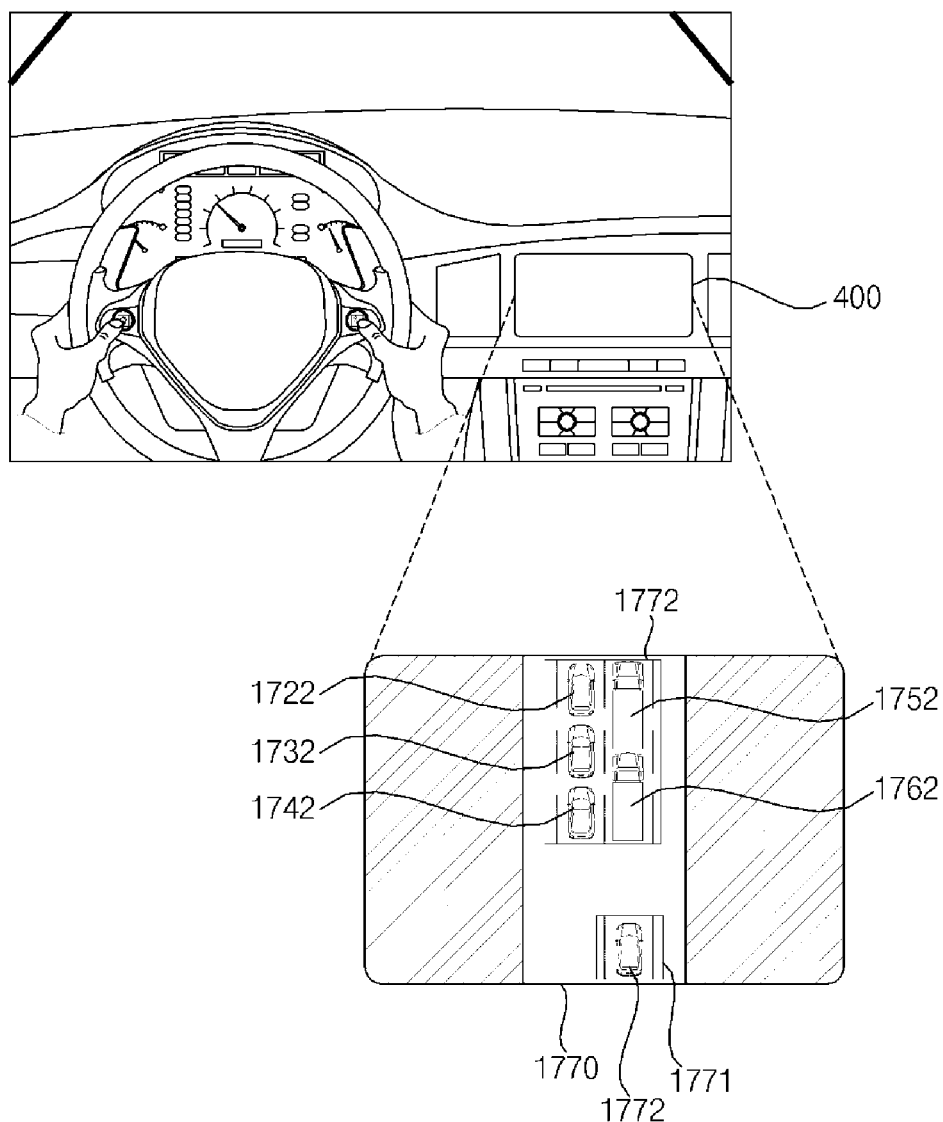

FIGS. 17A and 17B are views explaining the operation of the driver assistance apparatus 100 according to one embodiment of the present invention.

The driver assistance apparatus 100 according to the present invention may judge whether a congested zone 1700 is present within a predetermined distance (e.g., 300 m) from the vehicle 1 or within an area selected by the driver, and generate an expanded image using a sub image generated by at least one vehicle located in the congested zone 1700.

Specifically, when the communication unit 120 or 710 receives traffic information related to the current location of the vehicle 1, the processor 170 may judge whether the congested zone 1700 is present within a predetermined distance (e.g., 300 m) from the vehicle 1 or within an area selected by the driver based on traffic information. The traffic information may include information regarding various factors which have an effect on traffic such as, for example, the state of traffic on particular road section, accidents, and roadwork. For example, the processor 170 may set a zone where the vehicle cannot travel at a prescribed speed (60 kim/h) or more to the congested zone 1700.

In addition, the processor 170 may automatically enter an image expansion mode when the congested zone 1700 is present within the predetermined distance (e.g., 300 m) from the vehicle 1 or within the area selected by the driver.

FIG. 17A illustrates the top view of a four-lane road. In FIG. 17A, the vehicle 1 is about to enter the congested zone 1700 and a plurality of other vehicles 17 to 21 is present in the congested zone 1700.

The vehicle 1 generates a main image corresponding to a first range 1711. In addition, cameras mounted to another vehicle 17 capture an image of a second range 1721, cameras mounted to still another vehicle 18 capture an image of a third range 1731, cameras mounted to yet another vehicle 19 capture an image of a fourth range 1741, cameras mounted to still yet another vehicle 20 capture an image of a fifth range 1751, and cameras mounted to still yet a further vehicle 20 capture an image of a sixth range 1761.

In this way, the other vehicles 17 to 21 in the congested zone 1700 may generate first to sixth sub images respectively corresponding to the second to sixth ranges 1721, 1731, 1741, 1751 and 1761. The driver assistance apparatus 100 may transmit image request signals to the other vehicles 17 to 21, and the other vehicles 17 to 21 may transmit the first to sixth sub images to the driver assistance apparatus 100 in response to the image request signals.

FIG. 17B illustrates the screen of the AVN apparatus 400 equipped in the vehicle 1 in the state illustrated in FIG. 17A.

The processor 170 may generate a main image 1771 corresponding to the first range 1711. The main image 1771 may include an image 1772 corresponding to the vehicle 1. In addition, the processor 170 may generate a new sub image 1772 by combining the first to sixth sub images based on overlapping portions between the first to sixth sub images. In this case, the sub image 1772 may include images 1722, 1732, 1742, 1752 and 1762 respectively corresponding to the other vehicles 17 to 21 in the congested zone 1700.

The driver can visually check the real-time state of the congested zone 1700 via an expanded image 1770 that shows both the main image 1771 and the sub image 1772, which may assist the driver in, for example, reducing travel time to a destination compared to the case where only the main image 1771 is provided to the driver or where the driver simply references traffic information.

Figure 18A:
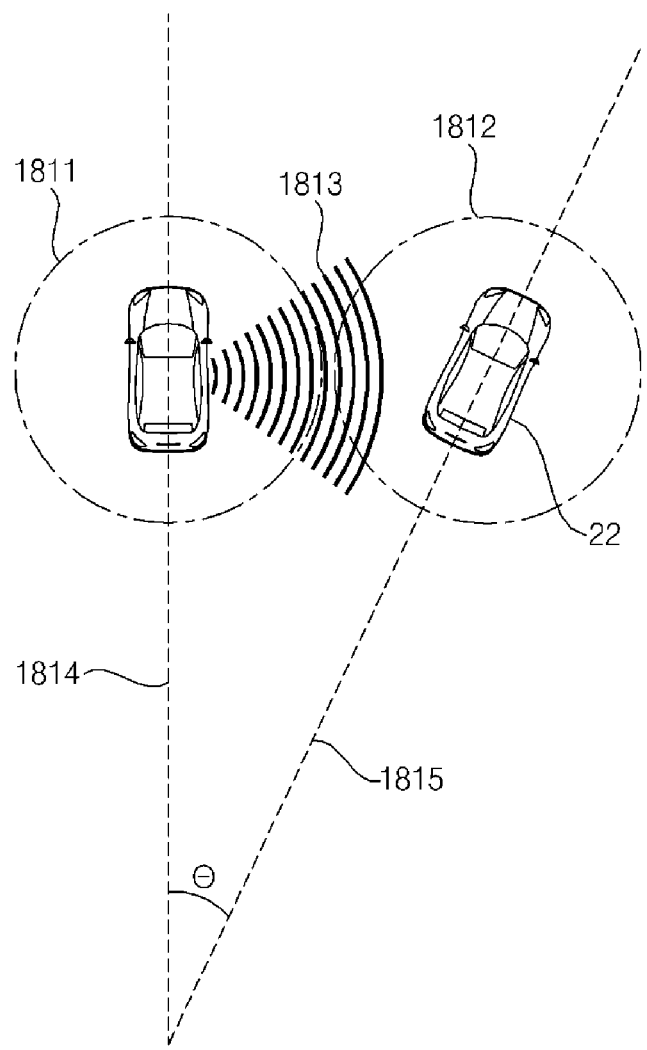
FIGS. 18A and 18B are views explaining the operation of the driver assistance apparatus according to one embodiment of the present invention.
Figure 18B:
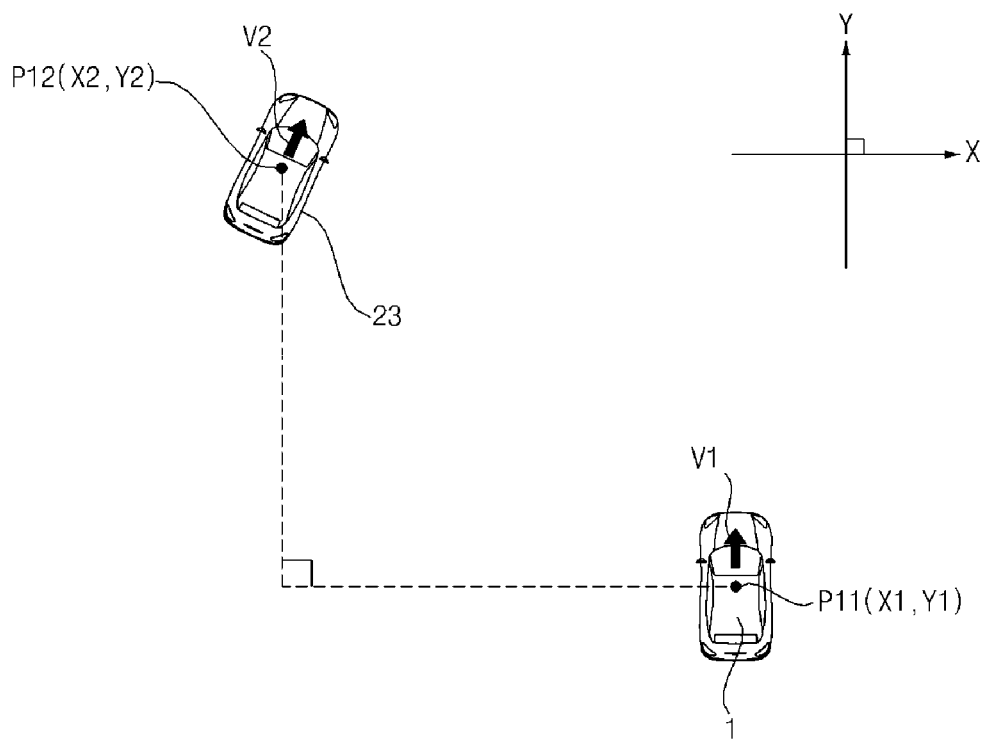

FIGS. 18A and 18B are views explaining the operation of the driver assistance apparatus 100 according to one embodiment of the present invention.

In FIG. 18A, when there is no overlapping portion where a main image corresponding to a first range 1811 of the vehicle 1 and a sub image corresponding to a second range 1812 of another vehicle 22 overlap, the driver assistance apparatus 100 may judge the positional relationship between the main image and the sub image based on information acquired by the sensing unit 760.

Specifically, the sensing unit 760 may acquire information regarding the position of the other vehicle 22 relative to the vehicle 1 using a prescribed signal 1813 (e.g., ultrasonic waves, infrared light, or laser).

The processor 170 may judge the distance between the vehicle 1 and the other vehicle 22, the angle θ between a center axis 1814 of the vehicle 1 and a center axis 1815 of the other vehicle 22, and the positional relationship between the vehicle 1 and the other vehicle 22 based on information acquired by the sensing unit 760.

The processor 170 may change (e.g., rotate or move) at least one of the main image and the sub image based on the positional relationship between the vehicle 1 and the other vehicle 22 upon the generation of an expanded image using the main image and the sub image. For example, the processor 170 may rotate the sub image clockwise by the angle θ on the basis of the main image and, thereafter, generate an expanded image using the rotated sub image.

FIG. 18B illustrates the state in which another vehicle 23 is located outside the sensing distance of the sensing unit 760.

In this case, the processor 170 may judge the positional relationship between a main image and a sub image based on location information of the vehicle 1 and location information of the other vehicle 23 received by the communication unit 120 or 710. In addition, the processor 170 may generate an expanded image by combining the main image and the sub image with each other based on the positional relationship between the main image and the sub image.

In addition, upon the generation of the expanded image, the processor 170 may combine the main image and the sub image with each other based on vehicle body direction information of the vehicle 1 and vehicle body direction information of the other vehicle 23. The vehicle body direction information V1 of the vehicle 1 may be acquired by the sensing unit 760 and the vehicle body direction information V2 of the other vehicle 23 may be received by the communication unit 120 or 710. For example, the vehicle 1 and the other vehicle 23 may respectively include at least one sensor which senses the direction in which the vehicle body faces such as, for example, a geomagnetic sensor or a direction sensor.

Referring to FIG. 18B, the processor 170 may judge the distance and direction from the vehicle 1 to the other vehicle 23 by comparing the GPS coordinates P11 of the vehicle 1 with the GPS coordinates P12 of the other vehicle 23. That is, the processor 170 may judge that the other vehicle 23 is located at a distance X2-X1 from the vehicle 1 along the X-axis and is located at a distance Y2-Y1 from the vehicle 1 along the Y-axis.

In addition, the processor 170 may judge the angle between the center axis of the vehicle 1 and the center axis of the other vehicle 23 by comparing the vehicle body direction information V1 of the vehicle 1 with the vehicle body direction information V2 of the other vehicle 23.

The processor 170 may generate an expanded image that is more representative of the actual state by changing at least one of a main image and a sub image based on the distance and direction from the vehicle 1 to the other vehicle 23 and the angle between the center axis of the vehicle 1 and the center axis of the other vehicle 23.

Figure 19:
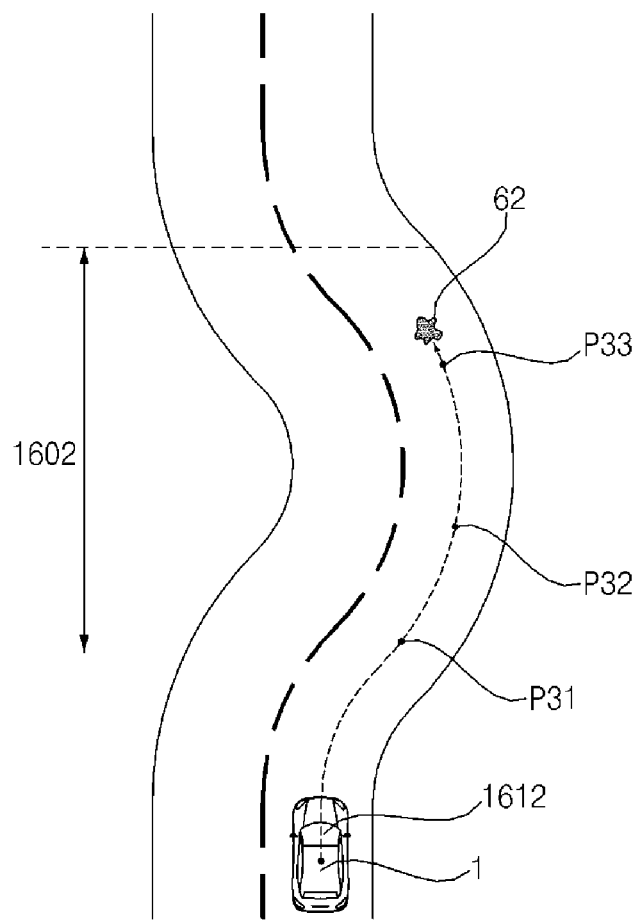
FIG. 19 is a view explaining the operation of the driver assistance apparatus according to one embodiment of the present invention.

FIG. 19 is a view explaining the operation of the driver assistance apparatus 100 according to one embodiment of the present invention.

Specifically, FIG. 19 illustrates the operation of the driver assistance apparatus 100 for controlling movement of the vehicle 1 based on the expanded image. For convenience of description, the vehicle 1 is assumed to correspond to the state illustrated in FIG. 16B. To facilitate understanding, the other vehicle 14 illustrated in FIG. 16B is omitted.

Referring to FIG. 19, the driver assistance apparatus 100 may generate a control signal that commands change of at least one of the speed and direction of the vehicle 1 based on information regarding the obstacle 62 shown in the expanded image. The information regarding the obstacle 62 may include various pieces of information such as, for example, the size of the obstacle 62 and the distance to the obstacle 62.

For example, the vehicle 1 may move from the current location P30 to enter the curved road 1602 and then sequentially pass through first to third points P31 to P33. In this case, the processor 170 may generate a control signal that commands for the vehicle 1 speed reduction to a first value or less prior to passing through the first point P31. Subsequently, the processor 170 may generate a control signal that commands for the vehicle 1, having passed through the first point P31, speed reduction to a second value or less, which is smaller than the first value, prior to passing through the second point P32. Subsequently, the processor 170 may generate a control signal that commands for the vehicle 1, having passed through the second point P32, speed reduction to a third value prior, which is smaller than the second value, prior to passing through the third point P33.

As illustrated in FIG. 19, as the drive unit 750 of the vehicle 1 previously reduces the speed of the vehicle 1 starting from a location at which the vehicle 1 is distant from the obstacle 62 based on a control signal provided from the processor 170, the risk of collision between the vehicle 1 and the obstacle 62 may be reduced.

Figure 20A:
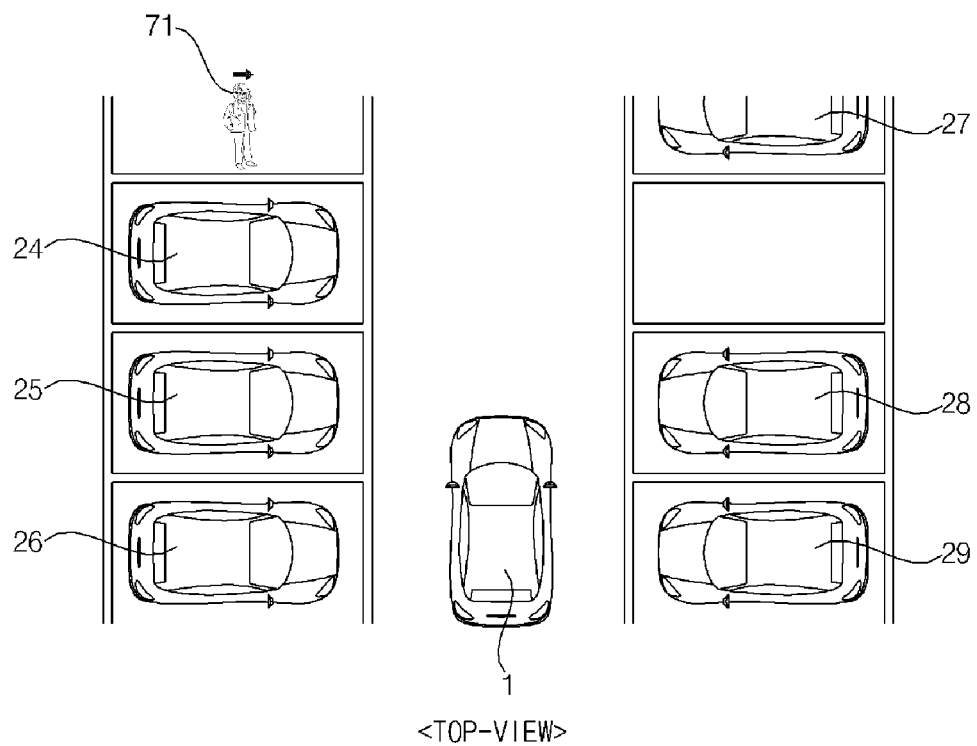
FIGS. 20A and 20B are views explaining the operation of the driver assistance apparatus according to one embodiment of the present invention.
Figure 20B:
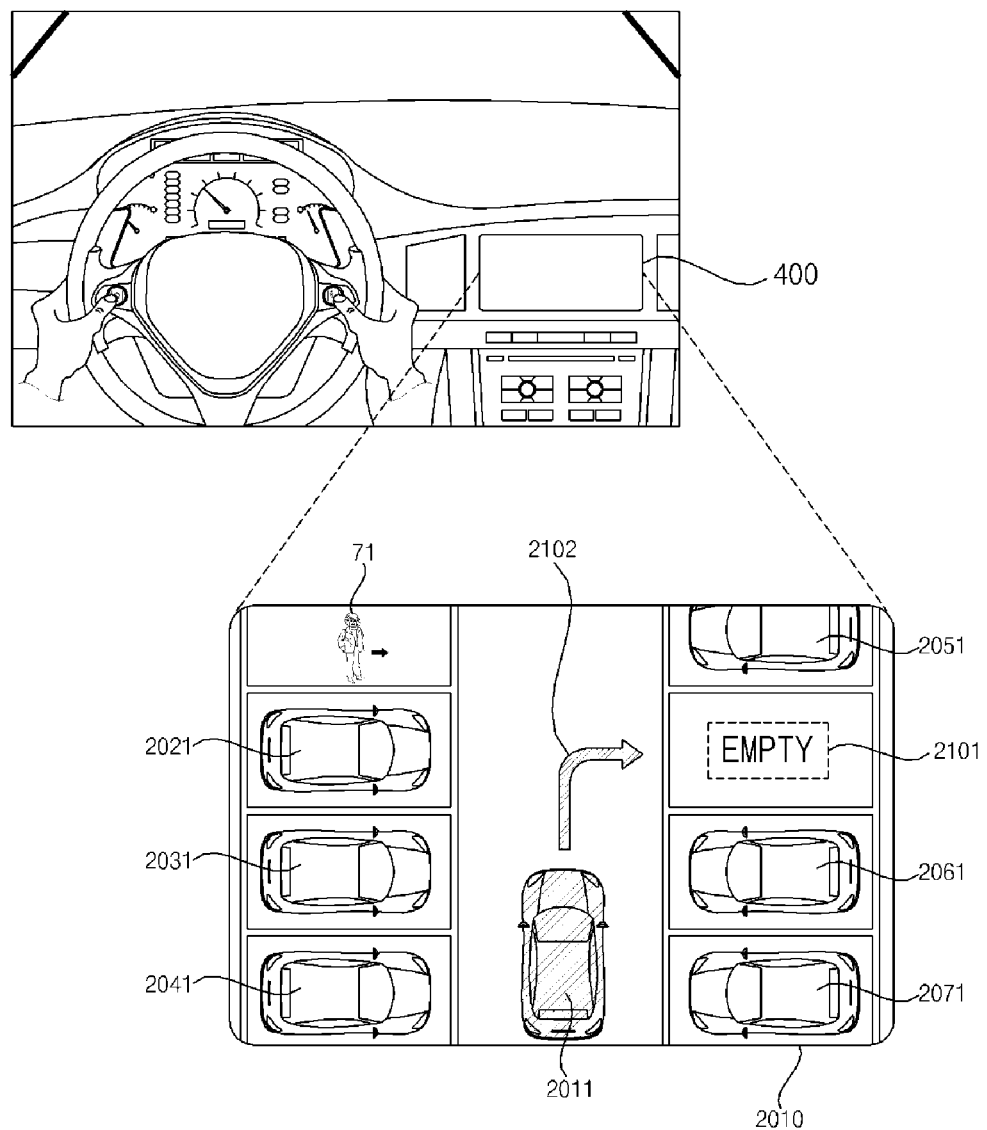

FIGS. 20A and 20B are views explaining the operation of the driver assistance apparatus 100 according to one embodiment of the present invention.

First, FIG. 20A illustrates the top view of a parking lot 2000 into which the vehicle 1 has entered. Referring to FIG. 20A, three vehicles 24 to 26 are located in the left side of the parking lot 2000 and three vehicles 27 to 29 are located in the right side of the parking lot 2000. For convenience of description, the entire parking lot 2000 is assumed as falling within the total range of the image capture range of the vehicle 1 and the image capture range of the six vehicles 24 to 29.

Meanwhile, a pedestrian 71 is present at the left side of the other vehicle 24. In this case, the driver of the vehicle 1 has difficulty in visually checking the pedestrian 71 who is hidden by the other vehicle 24.

However, assuming that the pedestrian 71 falls within the image capture range of the other vehicle 24, the pedestrian 71 is shown in a sub image corresponding to the image capture range of the other vehicle 24. The processor 170 may generate an expanded image using the sub image generated by the other vehicle 24.

FIG. 20B illustrates an expanded image 2010 displayed on the screen of the AVN apparatus 400 of the vehicle 1 when the vehicle 1 has entered the parking lot 2000. For convenience of description, it is assumed that the entire parking lot 2000 illustrated in FIG. 20A is shown in the expanded image 2010. As illustrated, the expanded image 2010 may include a first image 2011 corresponding to the vehicle 1 and second to seventh images 2021, 2031, 2041, 2051, 2061, and 2071 respectively corresponding to the second to seventh vehicles 24 to 29.

In addition, since the pedestrian 71 is shown in the sub image generated by the other vehicle 24, the driver can check the pedestrian 71 hidden by the other vehicle 24 via the expanded image 2010.

Meanwhile, the processor 170 may generate at least one route, along which the vehicle 1 can travel, based on the expanded image 2010. For example, the processor 170 may judge whether a space having a width greater than the full width of the vehicle 1 is present in the parking lot 2000 by analyzing the expanded image 2010.

Referring to FIG. 20B, the processor 170 may calculate the distance from the left end of the fifth image 2051 to the right end of the sixth image 2061 within the expanded image 2010, change the calculated distance into an actual distance, and compare the actual distance with the full width of the vehicle 1. That is, the processor 170 may judge whether the vehicle 1 can enter the space between the fifth vehicle 27 and the sixth vehicle 28.

In addition, the processor 170 may detect a parking line of the parking lot 2000 to judge that the vehicle 1 has entered the parking lot 2000 at present and generate information 2101 to guide the driver to park the vehicle 1 between the fifth vehicle 27 and the sixth vehicle 28.

In this way, an indicator 2101, which indicates that the parking space between the fifth vehicle 27 and the sixth vehicle 28 is empty may be displayed on the screen of the AVN apparatus 400.

In addition, upon generation of at least one route, along which the vehicle 1 can travel, based on the expanded image 2010, the processor 170 may generate a control signal that commands display of an indicator 2102 that guides the generated route. For example, as illustrated, the indicator 2102 may indicate a route that guides the vehicle 1 to the parking space between the fifth vehicle 27 and the sixth vehicle 28. At this time, the indicators 2101 and 2102 may be displayed to be overlaid on the expanded image 2010.

In addition, the processor 170 may generate a control signal to command that the first image 2011 corresponding to the vehicle 1 included in the expanded image 2010 is displayed to be distinguished from the second to seventh images 2021, 2031, 2041, 2051, 2061 and 2071. For example, the AVN apparatus 400 may display the second to seventh images 2021, 2031, 2041, 2051, 2061 and 2071 more thickly than the first image 2011 based on a control signal provided from the processor 170 as illustrated in FIG. 20B.

Figure 21:
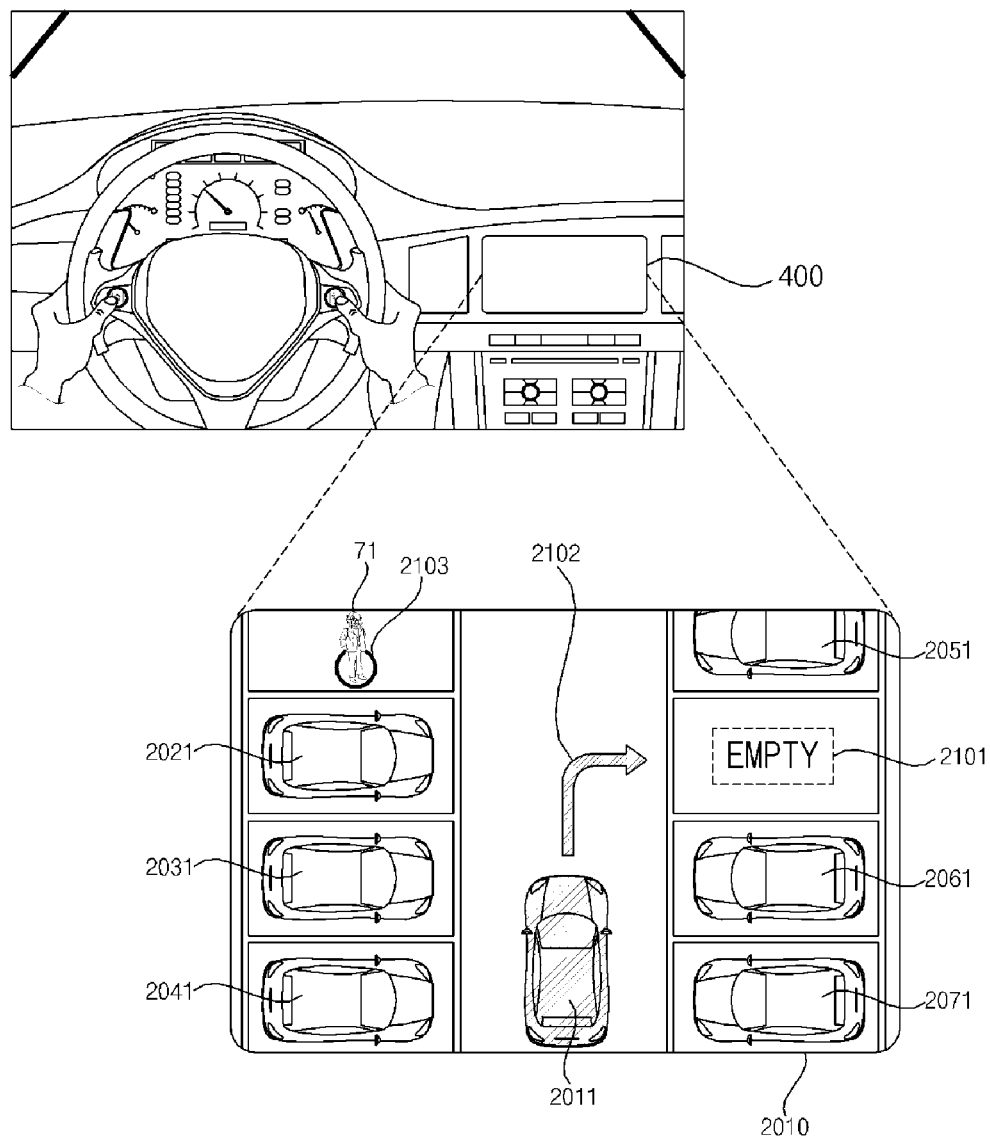
FIG. 21 is a view explaining the operation of the driver assistance apparatus according to one embodiment of the present invention.

FIG. 21 is a view explaining the operation of the driver assistance apparatus 100 according to one embodiment of the present invention.

The processor 170 may generate a control signal that commands the provision of visual effects to a region, where an obstacle is present, within an expanded image. Upon display of an expanded image, the display unit 741 of the vehicle 1, the display unit 180 of the driver assistance apparatus 100, and/or the AVN apparatus 400 may provide visual effects to the region, where an obstacle is present, within the expanded image in response to a control signal provided from the processor 170. For example, the processor 170 may provide the AVN apparatus 400 with a control signal to generate effects such as, for example, coloring, styling, flickering, or highlighting, on an obstacle or in a region close to the obstacle within the entire expanded image.

Referring to FIG. 21, an indicator 2103 that indicates the presence of the pedestrian 71 may be displayed in a region, where the pedestrian 71 is shown, within the expanded image 2010 illustrated in FIG. 20B. When the range of the expanded image 2010 is wide, the driver may fail to recognize the pedestrian 71 shown in the expanded image 2010. In such a case, displaying the pedestrian 71 so that it is emphasized more than the remainder of the expanded image 2010 through the use of the indicator 2103 may assist the driver of the vehicle 1 in rapidly recognizing the pedestrian 71.

Figure 22A:
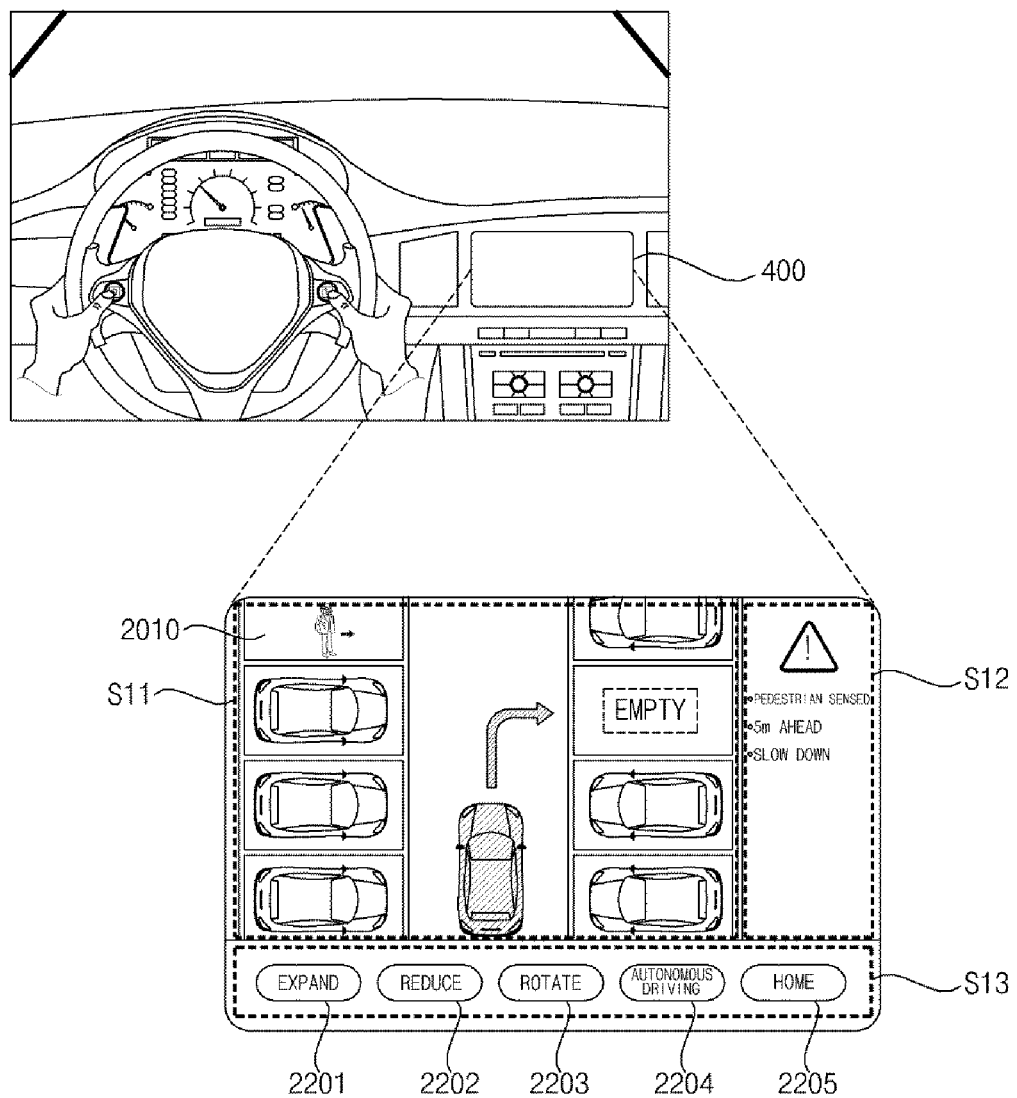
FIGS. 22A and 22B are views explaining the operation of the driver assistance apparatus to control the display state of an expanded image according to one embodiment of the present invention.
Figure 22B:
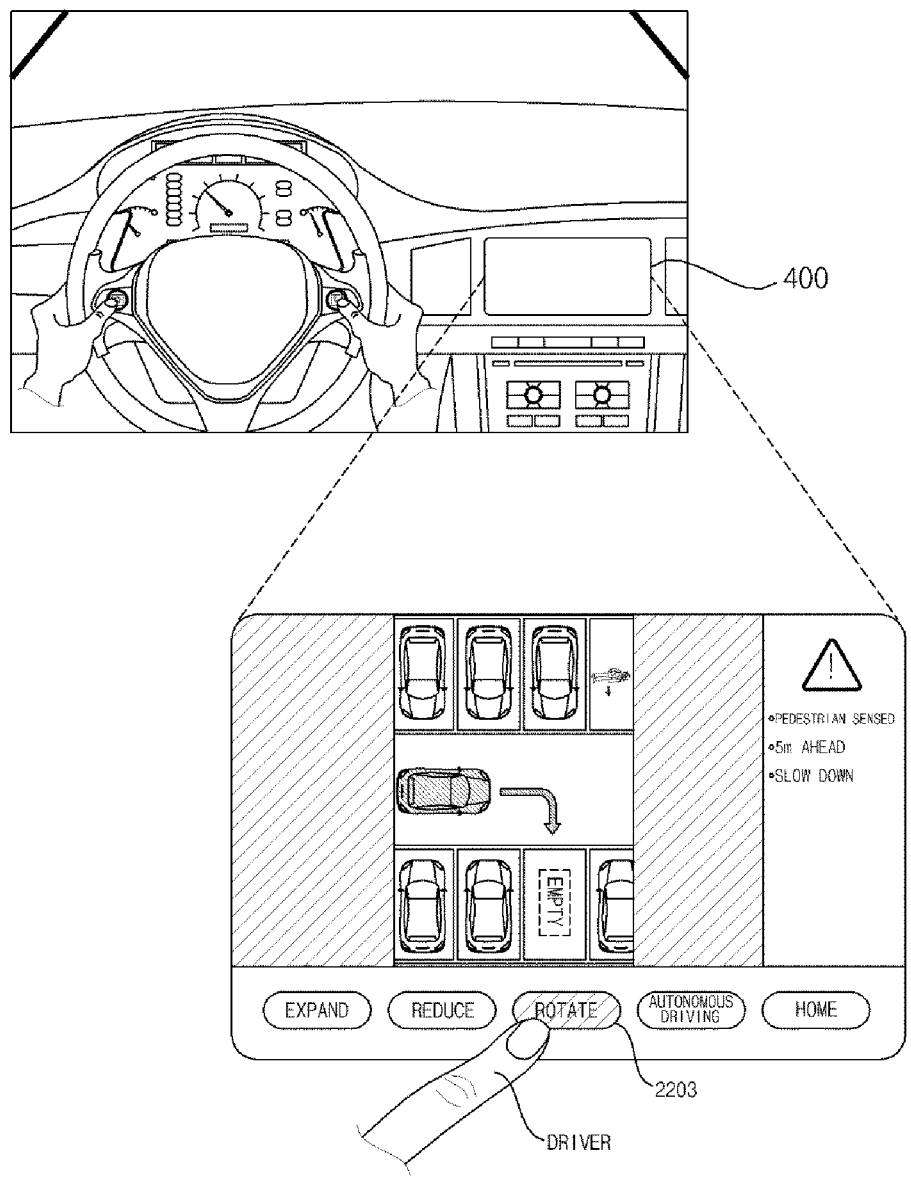

FIGS. 22A and 22B are views explaining the operation of the driver assistance apparatus 100 to control the display state of an expanded image according to one embodiment of the present invention. For convenience of description, the case where the expanded image 2010 is displayed on the screen of the AVN apparatus 400 as illustrated in FIG. 20 will be described below.

First, referring to FIG. 22A, the processor 170 may divide the screen of the AVN apparatus 400 into a plurality of sub screens S11, S12 and S13. In addition, the AVN apparatus 400 may display different pieces of information on the respective sub screens S11, S12 and S13 under the control of the processor 170.

For example, the AVN apparatus 400 may display the expanded image 2010 on the first sub screen S11, display information regarding an obstacle such as, for example, the pedestrian 71 shown in the expanded image 2010 on the second sub screen S12, and icons 2201 to 2205 corresponding to various functions on the third sub screen S13.

The information regarding the obstacle, displayed on the second sub screen S12, may include, for example, a warning image or message that guides detection of an obstacle (e.g., "Pedestrian Sensed"), a message that guides the distance to the obstacle (e.g., "5 m ahead"), and a message that guides action that the driver has to perform in order to prevent a collision with the obstacle (e.g., "Slow Down").

In addition, the driver may execute a function corresponding to the touched icon by touching at least one of the icons 2201 to 2205 displayed on the screen of the AVN apparatus 400.

For example, the first icon 2201 may correspond to the function to expand the expanded image 2010, the second icon 2202 may correspond to the function to reduce the expanded image 2010, the third icon 2203 may correspond to the function to rotate the expanded image 2010, the fourth icon 2204 may correspond to the function to perform autonomous driving with respect to a route generated based on the expanded image 2010, and the fifth icon 2205 may correspond to the function to stop the display of the expanded image 2010 and to move to a home screen.

Next, FIG. 22B illustrates one example in which the driver assistance apparatus 100 changes the display of an expanded image based on user input.

In FIG. 22B, when the driver touches the third icon 2203 on the third sub screen S13 illustrated in FIG. 22A, the processor 170 may rotate the expanded image 2010 by a prescribed angle. For example, whenever the driver touches the third icon 2203 once, the processor 170 may generate a control signal that commands display of the expanded image 2010 after rotating it clockwise by 90 degrees. FIG. 22B illustrates the state in which the expanded image 2010 has been rotated clockwise by 90 degrees as the third icon 2203 is touched once. When the driver touches the third icon 2203 once again, the AVN apparatus 400 may display the expanded image 2010 rotated by 180 degrees. Of course, it will be apparent by those skilled in the art that, when the driver touches the third icon 2203 a total of four times, the expanded image 2010 is rotated by 360 degrees to thereby be displayed in the same manner as illustrated in FIG. 22A.

Although the above description with reference to FIGS. 8 to 22B has focused on the operation of the driver assistance apparatus 100 which receives a sub image generated by another vehicle to generate an expanded image, the driver assistance apparatus 100 may provide the other vehicle with a main image, i.e. an image corresponding to the image capture range of the vehicle 1. Hereinafter, the operation of the driver assistance apparatus 100 to provide the other vehicle with the main image will be described in more detail.

Figure 23:
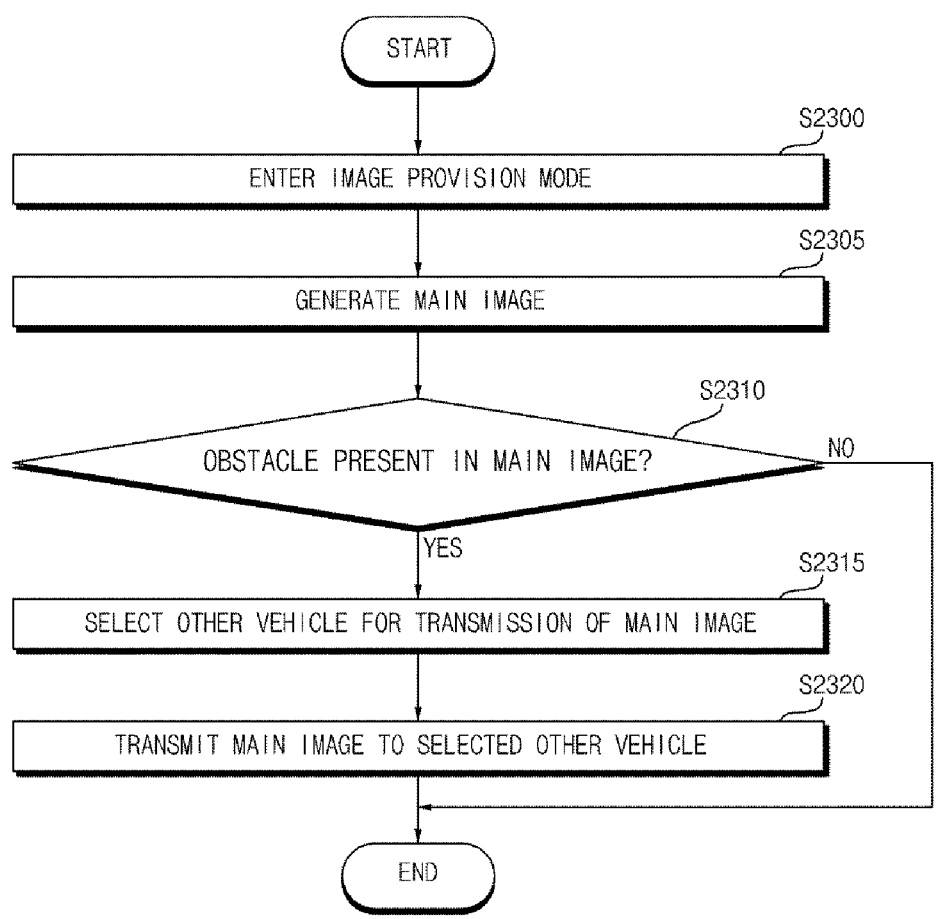
FIG. 23 is a flowchart illustrating a control method of the driver assistance apparatus according to one embodiment of the present invention.

FIG. 23 is a flowchart illustrating a control method of the driver assistance apparatus 100 according to one embodiment of the present invention.

Referring to FIG. 23, the processor 170 enters an image provision mode (S2300). In the present invention, the image provision mode means a mode in which at least a portion of a main image of the vehicle 1 and information regarding the main image is provided to another vehicle.

The processor 170 may enter the image provision mode when a predetermined condition is satisfied.

For example, when the input unit 110 receives user input that commands entry to the image provision mode, the processor 170 may enter the image provision mode. In this case, the user input may be at least one selected from among various inputs such as, for example, touch, voice, button push, and a gesture.

In another example, the processor 170 may enter the image provision mode when the communication unit 120 or 710 receives an image request signal from another vehicle.

Subsequently, the processor 170 generates a main image using one or more cameras 195 to 198 (S2305). For example, the processor 170 may turn on at least one of the cameras 195 to 198 illustrated in FIG. 2B when entering the image provision mode, to generate a main image. That is, the main image may include at least one of a forward image, a leftward image, a rightward image, and a rearward image.

At this time, the main image may have various forms. In one example, the main image may be a still image or a moving image. In another example, the main image may have an around-view form as illustrated in FIG. 2C. Hereinafter, for convenience of description, the main image is assumed as being an around-view image including all of a forward image, a leftward image, a rightward image, and a rearward image of the vehicle 1.

Subsequently, the processor 170 judges whether an obstacle is present in the main image generated in Step S2305 (S2310). For example, the processor 170 may perform object detection for the main image of the vehicle 1, and judge, based on the object detection results, whether any one of objects near the vehicle 1 approaches within a reference distance (e.g., 2 m) from the vehicle 1, thus carrying the risk of accidents beyond a reference value.

Subsequently, upon judging that the obstacle is present within the main image in Step S2310, the processor 170 may select another vehicle to which the main image will be transmitted (S2315), and transmit the main image to the selected vehicle (S2320). At this time, the processor 170 may select some of a plurality of other vehicles located near the vehicle 1 according to a predetermined reference, and transmit the main image to the selected vehicle(s).

Specifically, the processor 170 may select the other vehicle, to which the main image will be transmitted, based on the positional relationship between the vehicle 1 and the obstacle. For example, when two other vehicles are traveling respectively in the front and the rear of the vehicle 1 and the obstacle present within the main image is located in the rear of the vehicle 1, the processor 170 may provide the main image only to the other vehicle which is traveling in the rear of the vehicle 1.

The processor 170 may select the other vehicle, to which the main image will be transmitted, based on the risk degree of the obstacle shown in the main image. For example, when ten other vehicles are present near the vehicle 1, the processor 170 may transmit the main image to only five vehicles among the ten other vehicles when the risk degree of the obstacle detected from the main image has a first value, and may transmit the main image to all of the ten other vehicles when the risk degree of the obstacle has a second value which is greater than the first value. That is, the processor 170 may increase the number of other vehicles, to which the main image will be transmitted, as the risk degree of the obstacle detected in the main image increases. Here, the risk degree may be a value calculated based on, for example, the distance between the vehicle 1 and the obstacle, the size of the obstacle, and the kind of the obstacle.

In addition, the processor 170 may select the other vehicle, to which the main image will be transmitted, based on an image request signal received by the communication unit 120 or 710. For example, the processor 170 may control the communication unit 120 or 710 so as to transmit the main image only to vehicles that sends an image request signal.

In this case, the communication unit 120 or 710 may directly transmit the main image to the other vehicle. That is, the communication unit 120 or 710 may directly transmit the main image to the other vehicle based on a vehicle-to-vehicle communication network.

Alternatively, the communication unit 120 or 710 may transmit the main image to the other vehicle via the mediation of at least one external device. For example, the driver assistance apparatus 100 may transmit the main image to an external server, and the external server may transmit the main image, received from the driver assistance apparatus 100, to the other vehicle.

Meanwhile, although the above description of FIGS. 8 to 23 has distinguished the image expansion mode and the image provision mode from each other, this is given by way of example and the scope of the present invention is not limited thereto. The driver assistance apparatus 100 according to the embodiment of the present invention may simultaneously enter the image expansion mode and the image provision mode. That is, the driver assistance apparatus 100 may provide another vehicle with a main image in the image expansion mode and may generate an expanded image in the image provision mode. Alternatively, the driver assistance apparatus 100 may continuously generate an expanded image or provide other vehicles with a main image while the vehicle 1 is traveling.

As is apparent from the above description, the effects of a driver assistance apparatus and a control method for the same according to the present invention are as follows.

Through at least one of the embodiments of the present invention, an image (i.e. an expanded image) having a wider visual field of view than an existing around-view may be provided using an image generated by cameras mounted to a vehicle equipped with the driver assistance apparatus and an image generated by cameras mounted to another vehicle.

In addition, through at least one of the embodiments of the present invention, the expanded image may be automatically generated when the environment around the vehicle satisfies a predetermined condition, which may improve the convenience of a driver.

In addition, through at least one of the embodiments of the present invention, information related to an obstacle may be provided at the time of display of the expanded image, which may contribute to the safety of the driver.

In addition, through at least one of the embodiments of the present invention, an image of an area that is invisible to the driver occupying the vehicle may be provided, which may assist the driver in adjusting the traveling schedule of the vehicle.

In addition, through at least one of the embodiments of the present invention, the route, along which the vehicle can travel, may be calculated based on the expanded image, which may reduce the time taken to reach a destination through provision of information about the real-time road state.

Effects of the present invention should not be limited to the aforementioned effects and other not-mentioned effects will be clearly understood by those skilled in the art from the claims.

The embodiments of the present invention as described above are not limited to be implemented only via the apparatus and the method and may be implemented via a program that realizes a function corresponding to the configuration of each embodiment of the present invention or a recording medium in which the program is recorded. This implementation will be easily realized by experts in the art of the present invention from the above description of the embodiments.

In addition, it should be readily understood that the invention is not limited to the embodiments described above and the accompanying drawings. Rather, the invention can be modified to incorporate any number of variations, alterations, substitutions, or equivalent arrangements not heretofore described, but which are commensurate with the spirit and scope of the invention. Accordingly, the invention is not to be seen as limited by the foregoing description of the embodiments and the accompanying drawings, and some or all of the embodiments may be selectively combined with one another to achieve various alterations.

What is claimed is:

1. A driver assistance apparatus comprising:
   a display unit configured to display an electronic map and images; and
   at least one processor configured to:
   generate a main image using at least one camera;
   acquire, based on a user input, global positioning system (GPS) coordinate values that match a selected point within the electronic map;
   transmit, through a communication unit, an image request signal to at least one of other vehicles that travel a region including the GPS coordinate values of the selected point;
   receive, through the communication unit, one or more sub images generated by the at least one other vehicle; and
   generate, based on first feature points of the main image and second feature points of the sub images, an expanded image using the main image and at least one of the sub images.

2. The driver assistance apparatus according to claim 1, wherein the processor is configured to generate a route for the vehicle based on the expanded image.

3. The driver assistance apparatus according to claim 2, wherein the processor is configured to generate a control signal to enter an autonomous driving mode with respect to the route.

4. The driver assistance apparatus according to claim 1, wherein the display unit is configured to display the expanded image.

5. The driver assistance apparatus according to claim 4, wherein the processor is configured to divide a screen of the display unit into a plurality of sub screens, and
   wherein the processor is configured to display the expanded image on one of the sub screens and display information regarding the expanded image on another one of the sub screens.

6. The driver assistance apparatus according to claim 4, wherein the processor is configured to control the display unit to provide a visual effect to a region within the expanded image that includes an obstacle.

7. The driver assistance apparatus according to claim 4, wherein the processor is configured to control the display unit to rotate and display the expanded image by an angle corresponding to user input.

8. The driver assistance apparatus according to claim 4, wherein the processor is configured to:
   receive location information of the vehicle and location information of the at least one other vehicle, and
   generate the expanded image further based on the location information of the vehicle and the location information of the at least one other vehicle.

9. The driver assistance apparatus according to claim 8, wherein the processor is configured to:
   select at least one of the sub images based on a predetermined condition or user input;
   generate an expanded image using the main image and the selected at least one of the sub images; and
   change a generation period of the expanded image according to information of the vehicle.

10. The driver assistance apparatus according to claim 9, wherein the processor is configured to change a generation period of the expanded image according to speed information of the vehicle.

11. The driver assistance apparatus according to claim 9, wherein the processor is configured to receive, through the communication unit, at least one of sub images transmitted by the at least one of other vehicles in response to the image request signal.

12. The driver assistance apparatus according to claim 11, wherein the processor is configured to:
   display, through the display unit, the expanded image on a screen,
   divide the screen into at least one of sub screens, and
   display respectively information on at least one of sub screens.

13. The driver assistance apparatus according to claim 12, wherein the processor is configured to:
- divide the screen into a first sub screen and a second sub screen;
- generate a control signal to display a navigation image on the first sub screen and the expanded image on the second sub screen.

14. The driver assistance apparatus according to claim 13, wherein the processor is configured to display an image corresponding to the at least one of other vehicles on the expanded image.

15. The driver assistance apparatus according to claim 1, wherein the processor is configured to select a sub image showing an obstacle from a plurality of sub images.

16. The driver assistance apparatus according to claim 15, wherein the processor is configured to generate obstacle information regarding the obstacle; and
- wherein the obstacle information includes a position, a size, a color, a shape, a kind, and a movement of the obstacle.

17. The driver assistance apparatus according to claim 16, wherein the obstacle does not fall within a visual field of view of the vehicle; and
- wherein the obstacle falls within a visual field of view of at least one of the other vehicles that provides the sub image.

18. The driver assistance apparatus according to claim 1, wherein the main image is a moving image, and the sub images are moving images, and
- wherein the processor is configured to generate the expanded image as a moving image.

19. The driver assistance apparatus according to claim 1, further comprising a user input unit configured to receive the user input, and
- wherein the user input unit comprises at least one of a touch input unit or a mechanical input unit.

20. The driver assistance apparatus according to claim 1, wherein the display unit is a touch screen display unit and is configured to receive the user input, and
- wherein the selected point is a touched point within the electronic map.

* * * * *